(12) United States Patent
Lotti et al.

(10) Patent No.: US 12,118,821 B1
(45) Date of Patent: Oct. 15, 2024

(54) USING IMAGE PROCESSING, MACHINE LEARNING AND IMAGES OF A HUMAN FACE FOR PROMPT GENERATION RELATED TO FALSE EYELASHES

(71) Applicant: Lashify, Inc., North Hollywood, CA (US)

(72) Inventors: Sahara Lotti, North Hollywood, CA (US); Jesse Chang, Palo Alto, CA (US)

(73) Assignee: Lashify, Inc., North Hollywood, CA (US)

( * ) Notice: Subject to any disclaimer, the term of this patent is extended or adjusted under 35 U.S.C. 154(b) by 0 days.

(21) Appl. No.: 18/631,983

(22) Filed: Apr. 10, 2024

(51) Int. Cl.
*G06V 40/16* (2022.01)

(52) U.S. Cl.
CPC ................... *G06V 40/168* (2022.01)

(58) Field of Classification Search
CPC ...... G06V 40/168; G06V 40/16; G06V 10/82; G06V 40/18
See application file for complete search history.

(56) References Cited

U.S. PATENT DOCUMENTS

| 8,345,933 B2 * | 1/2013 | Cottard | G06V 40/18 382/218 |
|---|---|---|---|
| 2017/0337611 A1 | 11/2017 | Hsiao et al. | |
| 2018/0329892 A1 | 11/2018 | Lubbers et al. | |
| 2020/0081913 A1 | 3/2020 | Hussain et al. | |
| 2021/0224476 A1 | 7/2021 | Wang et al. | |
| 2022/0301214 A1 | 9/2022 | Znamenskiy et al. | |
| 2022/0386759 A1 * | 12/2022 | Fu | G06T 19/20 |
| 2022/0414959 A1 * | 12/2022 | Peng | G06V 10/82 |
| 2023/0129243 A1 | 4/2023 | Hunsmann et al. | |
| 2023/0252544 A1 | 8/2023 | Merkulov et al. | |
| 2023/0351473 A1 | 11/2023 | Baek et al. | |
| 2023/0385887 A1 | 11/2023 | Fuchs et al. | |
| 2024/0127312 A1 | 4/2024 | Engel et al. | |
| 2024/0177859 A1 | 5/2024 | Szamocki | |

OTHER PUBLICATIONS

Lingenfelter, B., "Face Captioning Using Prominent Feature Recognition," University of Nevada, Reno, 2021, 76 pages.

* cited by examiner

*Primary Examiner* — Phuoc Tran
(74) *Attorney, Agent, or Firm* — Lowenstein Sandler LLP

(57) ABSTRACT

A method includes receiving 2D image data corresponding to a 2D image of a human face of a subject. The method further includes determining a textual identifier that describes a facial feature of the human face represented by the 2D image. The method further includes providing, to a first generative machine learning model, a first prompt including information identifying the textual identifier that describes the facial feature of the human face. The method further includes obtaining, from the first generative machine learning model, a first output identifying, among a plurality of sets of false eyelashes, a set of false eyelashes selected to suit the human face of the subject based on the facial feature.

30 Claims, 17 Drawing Sheets

USING IMAGE PROCESSING, MACHINE LEARNING AND IMAGES OF A HUMAN FACE FOR PROMPT GENERATION RELATED TO FALSE EYELASHES

TECHNICAL FIELD

Aspects and embodiments of the disclosure relate to data processing, and more specifically, to using image processing, machine learning and images of the human face for prompt generation related to false eyelashes.

BACKGROUND

False eyelashes are commonly used to enhance beauty characteristics, especially of human eyes. Different eye and facial features can be enhanced using different types, subtypes, and configurations of false eyelashes.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

Some embodiments of the present disclosure are directed to a method. The method includes receiving 2D image data corresponding to a 2D image of a human face of a subject. The method further includes determining a textual identifier that describes a facial feature of the human face represented by the 2D image. The method further includes providing, to a first generative machine learning model, a first prompt comprising information identifying the textual identifier that describes the facial feature of the human face. The method further includes obtaining, from the first generative machine learning model, a first output identifying, among a plurality of sets of false eyelashes, a set of false eyelashes selected to suit the human face of the subject based on the facial feature.

In some embodiments, the textual identifier further describes a relationship between two or more facial features of the human face.

In some embodiments, the relationship between two or more facial features includes a relationship between an eye and an eyebrow of the eye.

In some embodiments, the method further includes identifying, from a database, information related to at least some of the plurality of sets of false eyelashes. The method further includes generating the first prompt comprising the information related to at least some of the plurality of false eyelashes and the information identifying the textual identifier that describes the facial feature of the human face.

In some embodiments, the set of false eyelashes include a set of false lash extensions designed for an application at an underside of natural eyelashes of the subject.

In some embodiments, the method further includes providing, to a first trained machine learning model, a second input including information identifying 2D image data corresponding to the 2D image of the human face. In some embodiments, determining the textual identifier that describes the facial feature of the human face includes obtaining, from the first trained machine learning model, a second output identifying the textual identifier that describes the facial feature of the human face.

In some embodiments, the first trained machine learning model is a second generative machine learning model.

In some embodiments, the second generative machine learning model includes a visual language model (VLM).

In some embodiments, the method further includes providing an indication of the set of false eyelashes for display at a graphical user interface (GUI) of a client device.

In some embodiments, the method further includes determining, using the 2D image data, a three-dimensional (3D) model of the human face. In some embodiments, the determining the textual identifier is based at least in part on the 3D model.

In some embodiments, the method further includes identifying a landmark on the 3D model, the landmark identifying the facial feature of the human face.

In some embodiments, determining the textual identifier that describes the facial feature of the human face based at least in part on the 3D model includes determining the textual identifier that corresponds to the landmark on the 3D model.

In some embodiments, determining the textual identifier that describes the facial feature of the human face based at least in part on the 3D model includes identifying a subset of a plurality of points of the 3D model, determining one or more relationships between the subset of points of the 3D model, identifying the landmark on the 3D model based on the one or more relationships, and measuring one or more geometric features represented in the 3D model to generate one or more geometric measurements. In some embodiments, the textual identifier is created based on the one or more geometric measurements.

In some embodiments, determining the textual identifier that describes the facial feature of the human face based at least in part on the 3D model includes providing, to a second trained machine learning model, a first input, the first input including information representing the 3D model of the human face. Determining the textual identifier that describes the facial feature of the human face based on the 3D model further includes obtaining, from the second trained machine learning model, one or more outputs identifying (i) an indication that the textual identifier that describes the facial feature of the human face corresponds to a landmark on the 3D model, and (ii) a level of confidence that the textual identifier corresponds to the landmark on the 3D model.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1A:
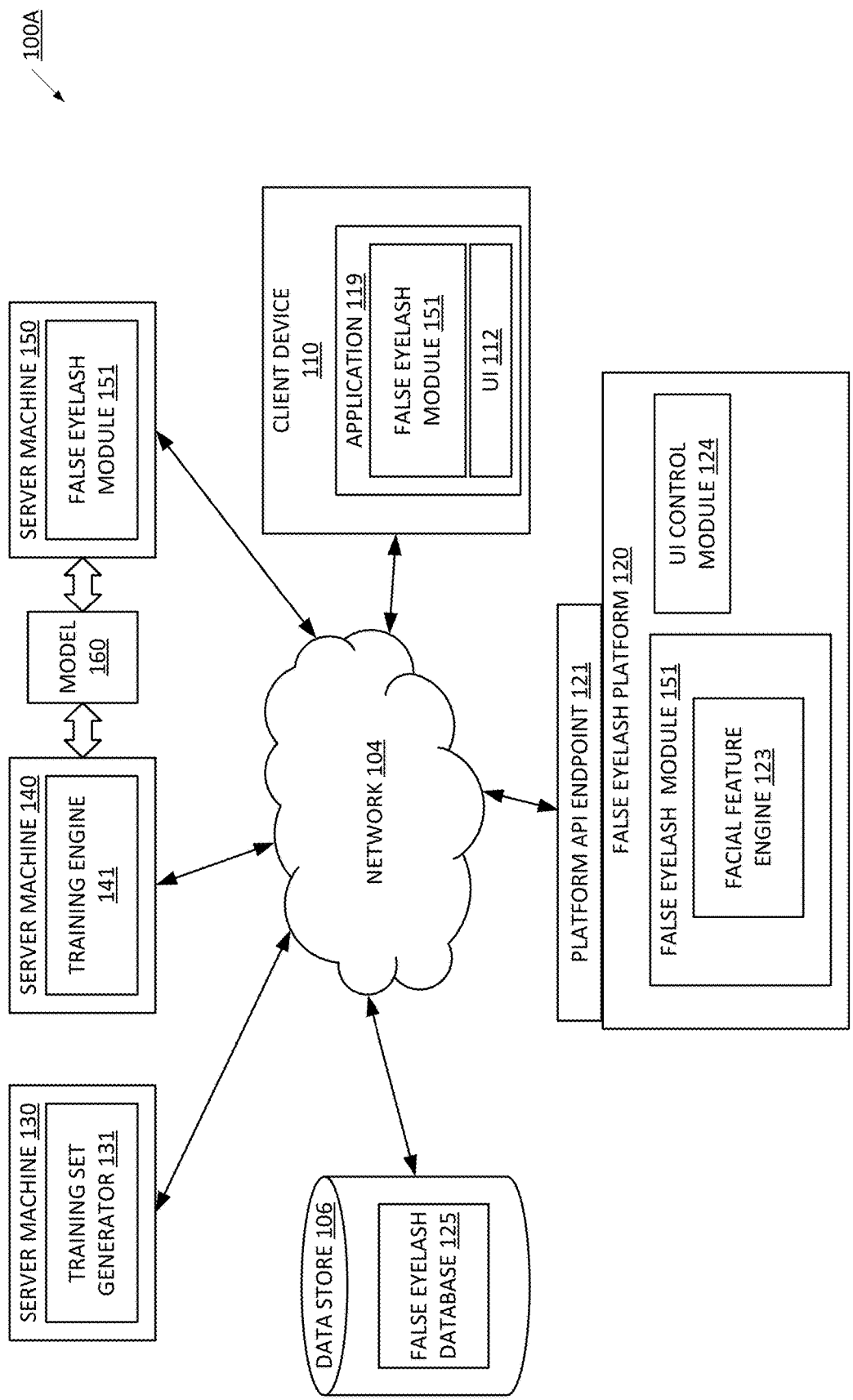
FIG. 1A illustrates an example system architecture, in accordance with some embodiments of the present disclosure.

Embodiments described herein are related to methods and systems related to using image processing and/or machine learning and two dimensional (2D) images for prompt generation related to false eyelashes.

False eyelashes (also referred to as "false lashes" herein) can include one or more artificial hairs that are often used to enhance the appearance of the eye area, and in particular, enhance the appearance of a user's eyes and/or natural lashes. False eyelashes can include strip lashes often applied to a user's eyelids, individual hairs, individual clusters, a set of artificial lash extensions (e.g., applied to the underside of the user's natural eyelashes), among others.

Lash configuration information (also referred to as "false eyelash configuration information") can refer to information associated with artificial lash extension configurations (e.g., lash configurations, etc.) and include information related to the selection of artificial lash extensions (e.g., or false eyelashes, generally) and/or the application of artificial lash extensions (e.g., or false eyelashes, generally) at the eye area of a user. In some embodiments, the lash configuration information can identify one or more artificial lash extensions (e.g., a subset of artificial lash extensions or a subset of false eyelashes) among multiple artificial lash extensions (e.g., or false eyelashes, generally) In some embodiments, lash configuration information can include and/or describe one or more particular artificial lash extensions (e.g., or false eyelashes, generally) of a set of artificial lash extensions (e.g., or false eyelashes, generally). For instance, the lash configuration information can describe one or more characteristics of the particular artificial lash extensions of a set of artificial lash extensions (e.g., length, style, and/or color), a location at the underside of the natural eyelashes at which each particular artificial lash extension of the set of artificial lash extensions is to be applied, and/or the order of each artificial lash extension in the set of artificial lash extensions. In some embodiments and as described further below, lash configuration information can include one or more of style, length, color, placement, or order of artificial lash extensions (e.g., or false eyelashes, generally) for an eye or pair of eyes of a user. Although lash configuration information is described as applied to artificial lash extensions, lash configuration information can similarly apply to false eyelashes, generally.

Because of the wide variety of length, style, color, etc. of false eyelashes generally, and the immense variability in features between human faces (e.g., eye shape, eye size, eye color, etc.), the identification and selection, among the numerous available false eyelashes, of false eyelashes that are tailored or optimal for a particular user and the user's unique facial features and facial geometry (e.g., eye geometry, etc.) can be challenging. To select false eyelashes for use, a user often considers many factors such as face shape, facial feature shape(s) (e.g., such as eye shape, nose shape, eyebrow shape, etc.), and/or the user's own personal style. The user can be left with an overwhelming multitude of options. Additionally, a user may struggle to understand how to apply false eyelashes once the appropriate false eyelashes are selected and obtained.

Some conventional systems may provide a user with a multitude of false eyelash images and descriptions thereof and allow the user to select from the multitude of false eyelashes. In other conventional systems, a user may provide some user preference information, such as desired style or look, and the system can provide a selection of false eyelashes related to the provided user preferences. However, such systems often do not identify false eyelashes or lash configuration information that are relevant or selected for the user's unique facial features.

Aspects of the present disclosure address the above-described and other challenges by performing image processing and/or machine learning techniques (as described below) with image data, such as 2D image data representing a 2D image of a subject's face, to generate one or more textual identifiers that describe a subject's facial features and/or relationships between the subject's facial features. A textual identifier can refer to a textual description related to or describing a subject's facial features and/or relationships between the subject's facial features. A facial feature can refer to a physical characteristic or element that is part of a human face. Facial features can include, but are not limited to the lips, nose, tip of the noise, bridge of the nose, eyes, inner eye, pupil, pupil center, eyelids, eyebrows, inner eyebrow, outer eyebrow, eyebrow apex and/or other facial features. In an example, the textual identifiers can describe the eye shape of the subject (e.g., almond eye shape), an eye angle of the subject's eye (e.g., the angle of line between the corners of the eye and a horizontal axis), and a distance between the subject's eye and an apex of the eyebrow. The textual identifiers (along with other information in some embodiments) can be used to generate a prompt, such as a natural language prompt for input to a generative machine learning model (e.g., generative artificial intelligence (AI)). A prompt (e.g., query) can refer to an input or instruction provided to a generative machine learning model to generate a response. Responsive to receiving the prompt, the generative machine learning model can generate a response (e.g., answer) that includes information (e.g., lash configuration information) about one or more false eyelashes (e.g., a subset of false eyelash among a multitude of false eyelashes selected based on the actual facial features of the subject's face.

For example, responsive to receiving a prompt that includes a textual identifier(s) describing the eye shape of the subject (e.g., almond eye shape), an eye angle of the subject, and a distance between the eye and an apex of the eyebrow, the generative machine learning model can identify a subset of the set of artificial lash extensions (style, length(s)) and describe the specific arrangement of the artificial lash extensions at the underside of the natural eyelashes.

In some embodiments, domain-specific (e.g., biological sciences or false eyelashes) or entity-specific (e.g., company-specific) information can be used as additional information for prompt generation. For example, information about false eyelashes from a particular entity (e.g., type of artificial lash extensions, style of artificial lash extensions, information on how to use and/or apply the artificial lash extensions, etc.) can be added to the prompt to provide additional context. In some instances, the information about false eyelashes can include information that can be used to form at least part of the response (e.g., answer) to the prompt. For example, the additional contextual information can include information on how to select false eyelashes based on particular facial features, relationship(s) between facial features, and/or dimensions thereof that are described at least in part by the textual identifiers.

In some embodiments, the generative machine learning model can identify a subset of false eyelashes among a multitude of false eyelashes (and/or lash configuration information) based on the prompt. In some embodiments, the subset of false eyelashes identified by the generative machine learning model may be further filtered based on one or more criteria, such as user preference(s) (e.g., criteria that may not be identified by an image data, such as a 2D image data). For example, the subset of false eyelashes identified by the generative machine learning model can be filtered based on the subject's preferred style or preferred color. In some embodiments, an indication of the subset of false eyelashes (filtered or unfiltered) may be provided for display at a graphical user interface (GUI) of the client device associated with the subject.

In some embodiments, the generative machine learning model can generate full sentence(s) of information that include one or more of the identified subset of false eyelashes, lash configuration information, among other information. The textual information can be provided to a text-to-voice conversion module that converts the textual information to audio data the can be provided for presentation via a GUI of the client device of the subject.

In some embodiments, the generative machine learning model (e.g., the generative machine learning model used to identify a subset of false eyelashes) may be trained with a training set that includes training input that identifies multiple groups of textual identifiers where each group describes one or more facial features of a human face (and/or relationships thereof). The training output of the generative machine learning model can be compared to target output including a subset of the false eyelashes and/or lash configuration information that corresponds to a respective group of the textual identifiers. The parameters (e.g., values thereof) of the generative machine learning model can be adjusted based on the comparison.

In some embodiments, to generate one or more textual identifiers, 2D image data representing a 2D image of a subject's face (e.g., 2D frontal image of the subject's face) can be captured using a camera. Image processing techniques using the 2D image data can be used to identify one or more facial features and/or relationships between the facial features. Textual identifiers may be applied to the one or more facial features and/or relationships between the facial features. In some embodiments, the image processing techniques can include a machine learning model, such a discriminative machine learning model. In other embodiments, different or additional image processing techniques can be implemented.

In some embodiments, additional information, such as depth, may be helpful in generating one or more textual identifiers. For instance, depth information can be helpful in determining the depth of the eyes. An image processing technique can be used to generate 3D model data of a 3D model representing the subject's face using the 2D image data of the 2D image. In some embodiments, the 3D model can include a mathematical model representing the subject's face. For example, the 3D model can include a 3D morphological model. The 3D model can be a high-accuracy 3D model with estimated measurements within +2 millimeters (mm) of the actual physical measurements.

In some embodiments, a new 3D model can be generated to represent the face, and in particular the eye area, represented in the 2D image. In some embodiments, a 3D model can be generated by using a generic 3D model of a face and fitting the generic 3D model to unique facial features of the subject's face (represented in the 2D image) to create a unique 3D model for the subject's face.

In some embodiments, 3D landmarks (also referred to as "landmarks" herein), which can be included in the 3D model data of the 3D model, can correspond to or represent facial features of the subject's face. In some embodiments, the 3D model data representing the 3D model can be used (e.g., with logic) to identify textual identifiers corresponding to the subject's facial features.

For example and in some embodiments, the 3D landmarks (e.g., landmarks) are identified by identifying one or more points of the 3D model and determining a relationship between the points (e.g., connecting lines or edges). The 3D landmark(s) may be identified based on the determined relationship(s). For instance, a group of 3D points and the edges connecting the 3D points can correspond to a landmark representing the right eye. The textual identifier associated with the landmark can include the text, "right eye." The slope and shape of the right eye can be determined using the group of 3D points and corresponding edges to determine the eye shape of the right eye. The textual identifier associated with the 3D landmark can also the text, "almond shape."

In some embodiments, the 3D landmark(s) may be identified using a trained machine learning model. For example, a trained discriminative machine learning may receive the 3D model representing a subject's face as input and output identifiers of one or more 3D landmarks of the 3D model.

In some embodiments to generate one or more textual identifiers, 2D image data representing a 2D image of a subject's face and/or 3D model data representing a 3D model of the subject's face can be used as input to a machine learning model (discriminative and/or generative machine learning model, such as a visual-language model (VLM)). Based on the input, the machine learning model can generate one or more textual identifiers corresponding to the subject's facial features and/or relationship(s) between the subject's facial features.

As noted, a technical problem addressed by embodiments of the present disclosure is using images, and in particular images of a subject's face, to generate prompts for generative machine learning models.

A technical solution to the above identified technical problem can include performing image processing and/or machine learning techniques with image data to generate textual identifiers which can be used to generate a prompt. In some embodiments, a 2D frontal image of the user's face can be received (e.g., from the user) and image processing can performed to generate, based on a 2D image of the subject's face (e.g., captured by a camera), textual identifiers that describe facial features of and/or relationships between facial features of the subject's face. In some embodiments, the image processing can be performed by one or more of 2D image conversion to 3D model data of a 3D model representing the subject's face, a discriminative machine learning model using input including one or more of 2D image data of a 2D image representing the subject's face or the 3D model data of the 3D model, and/or a generative machine learning model using input including one or more of 2D image data of a 2D image representing the subject's face or the 3D model data of the 3D model. The textual identifiers can be used at least in part to generate a prompt for a generative machine learning model. The generative machine learning model can generate a response that includes an identifier of a subset of the false eyelashes and/or lash configuration information that are identified based on the subject's unique facial features and based on the prompt.

Thus, the technical effect can include improving image processing and prompt generation. In some instance, the improved image processing and prompt generation can be used, for example, for searching and/or filtering with respect to a database containing information associated with false eyelashes. Further, the technical effect can improve a user's ability to identify relevant false eyelashes and/or false eyelashes that can best enhance the user's facial features using image processing and generative machine learning.

FIG. 1A illustrates an example of a system 100A, in accordance with some embodiments of the disclosure. The system 100A includes a false eyelash platform 120, one or more server machines 130-150, a data store 106, and client device 110 connected to network 104. In some embodiments, system 100A can include one or more other platforms (such as those illustrated in FIG. 1B).

A false eyelash (e.g., artificial lash, lash extension, etc.) can refer to any cosmetic accessory designed to enhance the appearance of natural eyelashes. For example, a false eyelash can be a synthetic or natural fiber to be attached to an eyelid or natural eyelash to give the natural eyelash a fuller, and/or more dramatic look. A false eyelash can have a variety of lengths, thicknesses, and/or styles to suit different personal preferences and/or occasions. A false eyelash may be applied to an upper eyelid just above the natural eyelashes using an adhesive specially formulated for this purpose. False eyelashes can be applied to create a fuller, longer, or more dramatic look and are often used to complement makeup styles for special events, performances, or everyday wear. False eyelashes can be strip lashes, which are applied across the entire lash line, or can be individual lashes, which are applied one by one to fill in sparse areas or add volume. False eyelashes can alternatively be a hybrid of the two preceding types, including multiple sub-strips that are applied across the lash line. False eyelashes can be removed easily and are often reusable if properly cared for.

In some embodiments, network 104 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

Data store 106 can be a persistent storage that is capable of storing data such as false eyelash configuration information, 2D image information, 3D model information, machine learning model data, etc. Data store 106 can be hosted by one or more storage devices, such as main memory, magnetic or optical storage based disks, tapes or hard drives, network-attached storage (NAS), storage area network (SAN), and so forth. In some embodiments, data store 106 can be a network-attached file server, while in other embodiments the data store 106 can be another type of persistent storage such as an object-oriented database, a relational database, and so forth, that can be hosted by false eyelash platform 120, or one or more different machines coupled to the server hosting the false eyelash platform 120 via the network 104. In some embodiments, data store 106 can be capable of storing one or more data items, as well as data structures to tag, organize, and index the data items. A data item can include various types of data including structured data, unstructured data, vectorized data, etc., or types of digital files, including text data, audio data, image data, video data, multimedia, interactive media, data objects, and/or any suitable type of digital resource, among other types of data. An example of a data item can include a file, database record, database entry, programming code or document, among others.

In some embodiments, data store 106 can implement false eyelash database 125. In some embodiments, false eyelash database 125 can store information (e.g., data items) related to false eyelash configuration information.

In some embodiments, false eyelash database 125 can include a vector database. In some embodiment, a vector database can index and/or store vector data, such as vector embeddings (e.g., also referred to as vector embedding data). In some embodiments, the vector embedding data can have the same or variable dimensionality. The vector embedding data can include one or more of word embedding data (e.g., vector representation of a word), image embedding data (e.g., vector representation of an image), audio embedding data (e.g., vector representation of audio content), and so forth. In some embodiments, the vector embedding data can represent false eyelash configuration information. Additional details of false eyelash database 125 are further described herein.

The client device(s) 110 may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client device(s) 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client device(s) may also be referred to as a "user device" herein. Although a single client device 110 is shown for purposes of illustration rather than limitation, one or more client devices can be implemented in some embodiments. Client device 110 will be referred to as client device 110 or client devices 110 interchangeably herein.

In some embodiments, a client device, such as client device 110, can implement or include one or more applications, such as application 119 executed at client device 110. In some embodiments, application 119 can be used to communicate (e.g., send and receive information) with false eyelash platform 120. In some embodiments, application 119 can implement user interfaces (UIs) (e.g., graphical user interfaces (GUIs)), such as UI 112 that may be webpages rendered by a web browser and displayed on the client device 110 in a web browser window. In another embodiment, the UIs 112 of client application 119 may be included in a stand-alone application downloaded to the client device 110 and natively running on the client device 110 (also referred to as a "native application" or "native client application" herein). In some embodiments, false eyelash module 151 can be implemented as part of application 119. In other embodiments, false eyelash module 151 can be separate from application 119 and application 119 can interface with false eyelash module 151.

In some embodiments, one or more client devices 110 can be connected to the system 100A. In some embodiments, client devices, under direction of the false eyelash platform 120 when connected, can present (e.g., display) a UI 112 to a user of a respective client device through application 119. The client devices 110 may also collect input from users through input features.

In some embodiments, a UI 112 may include various visual elements (e.g., UI elements) and regions, and may be a mechanism by which the user engages with the false eyelash platform 120, and system 100A at large. In some embodiments, the UI(s) of the client device(s) 110 can include multiple visual elements and regions that enable presentation of information, for decision-making, content delivery, etc. at a client device 110. In some embodiments, the UI 112 may sometimes be referred to as a graphical user interface (GUI)).

In some embodiments, the UI(s) 112 and/or client device 110 can include input features to intake information from a client device 110. In one or more examples, a user of client device 110 can provide input data (e.g., a user query, control commands, etc.) into an input feature of the UI 112 or client device 110, for transmission to the false eyelash platform 120, and system 100A at large. Input features of UI 112 and/or client device 110 can include space, regions, or elements of the UI 112 that accept user inputs. For example, input features may include visual elements (e.g., GUI elements) such as buttons, text-entry spaces, selection lists, drop-down lists, etc. For example, in some embodiments, input features may include a chat box which a user of client device 110 may use to input textual data (e.g., a user query). The application 119 via client device 110 may then transmit that textual data to false eyelash platform 120, and the system 100A at large, for further processing. In other examples, input features may include a selection list, in which a user of client device 110 can input selection data e.g., by selecting, or clicking. The application 119 via client device 110 may then transmit that selection data to false eyelash platform 120, and the system 100A at large, for further processing.

In some embodiments, client device 110 can include a camera (e.g., digital camera) to capture images, such as two-dimensional (2D) images, and video (e.g., sequential video frames of a video item). The images and/or video can be sent to false eyelash platform 120 using application 119. In some embodiments, client device 110 can stream a video item to false eyelash platform 120 using application 119. The video frames of a video item can be arranged (e.g., sequentially arranged) using timestamps. In some embodiments, application 119 can be used to implement augmented reality (AR) or virtual reality (VR) features at client device 110.

In some embodiments, a client device 110 can access the false eyelash platform 120 through network 104 using one or more application programming interface (API) calls via platform API endpoint 121. In some embodiments, false eyelash platform 120 can include multiple platform API endpoints 121 that can expose services, functionality, or information of the false eyelash platform 120 to one or more client devices 110. In some embodiments, a platform API endpoint 121 can be one end of a communication channel, where the other end can be another system, such as a client device 110 associated with a user account. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP or HTTPS methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or information provided by the false eyelash platform 120. The platform API can be used to programmatically obtain services and/or information associated with a request for services and/or information.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the false eyelash platform 120 can expose through the API, a set of API resources which when addressed can be used for requesting different actions, inspecting state or data, and/or otherwise interacting with the false eyelash platform 120. In some embodiments, a REST API and/or another type of API can work according to an application layer request and response model. An application layer request and response model can use HTTP (Hypertext Transfer Protocol), HTTPS (Hypertext Transfer Protocol Secure), SPDY, or any suitable application layer protocol. Herein HTTP-based protocol is described for purposes of illustration, rather than limitation. The disclosure should not be interpreted as being limited to the HTTP protocol. HTTP requests (or any suitable request communication) to the false eyelash platform 120 can observe the principles of a RESTful design or the protocol of the type of API. RESTful is understood in this document to describe a Representational State Transfer architecture. The RESTful HTTP requests can be stateless, thus each message communicated contains all necessary information for processing the request and generating a response. The platform API can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

It can be appreciated that in some embodiments, any element, such as server machine 130, server machine 140, server machine 150, and/or data store 106 may include a corresponding API endpoint for communicating with APIs.

In some embodiments, the false eyelash platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, false eyelash platform 120 may include a plurality of computing devices that together may comprise a hosted computing resource, a grid computing resource or any other distributed computing arrangement. In some embodiments, false eyelash platform 120 may correspond to an elastic computing resource where the allotted capacity of processing, network, storage, or other computing-related resources may vary over time.

In some embodiments, false eyelash platform 120 can implement UI control module 124. In some embodiments, UI control module 124 can receive input from UI 112 of application 119. In some embodiments, UI control module 124 can be used to configure false eyelash module 151, based on inputs received at application 119. UI control module 124 can provide inputs to false eyelash module 151, such as inputs received from application 119 of the client device 110.

In some embodiments, false eyelash platform 120 can implement false eyelash module 151. In some embodiments, false eyelash module 151 can implement one or more features and/or operations as described herein. In some embodiments, false eyelash module 151 can include facial feature engine 123. In some embodiments, facial feature engine 123 can be executed outside of false eyelash module 151. Facial feature engine 123 is further described below with respect to FIG. 2A.

In some embodiments, false eyelash platform 120 and in particular UI control module 124 may perform user-display functionalities of the system such as generating, modifying, and monitoring the client-side UI(s) (e.g., graphical user interface(s) (GUI)) and associated components that are presented to users of the false eyelash platform 120 through UI 112 client devices 110. For example, false eyelash module 151 via UI control module 124 can generate the UI(s) (e.g., UI 112 of client device 110) that users interact with while engaging with the false eyelash platform 120.

In some embodiments, a machine learning model (e.g., also referred to as an "artificial intelligence (AI) model" herein) can include a discriminative machine learning model (also referred to as "discriminative AI model" herein), a generative machine learning model (also referred to as "generative AI model" herein), and/or other machine learning model.

In some embodiments, a discriminative machine learning model can model a conditional probability of an output for given input(s). A discriminative machine learning model can learn the boundaries between different classes of data to make predictions on new data. In some embodiments, a discriminative machine learning model can include a classification model that is designed for classification tasks, such as learning decision boundaries between different classes of data and classifying input data into a particular classification. Examples of discriminative machine learning models include, but are not limited to, support vector machines (SVM) and neural networks.

In some embodiments, a generative machine learning model learns how the input training data is generated and can generate new data (e.g., original data). A generative machine learning model can model the probability distribution (e.g., joint probability distribution) of a dataset and generate new samples that often resemble the training data. Generative machine learning models can be used for tasks involving image generation, text generation and/or data synthesis. Generative machine learning models include, but are not limited to, gaussian mixture models (GMMs), variational autoencoders (VAEs), generative adversarial networks (GANs), large language models (LLMs), vision-language models (VLMs), multi-modal models (e.g., text, images, video, audio, depth, physiological signals, etc.), and so forth.

Training of and inference using discriminative machine learning models and generative machine learning models is described herein. It should be noted that although the training of and inference using discriminative machine learning model and generative machine learning model are described separately for the purposes of clarity, it can be appreciated that elements described with respect to discriminative machine learning models can apply to generative machine learning models, and vice versa, unless otherwise described.

In some embodiments, some elements of FIG. 1A, such as training set generator 131 of sever machine 130, training engine 141 of server machine 140, and model 160 can apply to a discriminative machine learning model, unless otherwise described. In some embodiments, some elements of FIG. 1B can apply to generative machine learning model(s), unless otherwise described.

Server machine 130 includes a training set generator 131 that is capable of generating training data (e.g., a set of training inputs and a set of target outputs) to train a model 160 (e.g., a discriminative machine learning model). In some embodiments, training set generator 131 can generate the training data based on various data (e.g., stored at data store 106 or another data store connected to system 100A via network 104). Data store 106 can store metadata associated with the training data.

Server machine 140 includes a training engine 141 that is capable of training a model 160 using the training data from training set generator 131. The model 160 (also referred to "machine learning model" or "artificial intelligence (AI) model" herein) may refer to the model artifact that is created by the training engine 141 using the training data that includes training inputs (e.g., features) and corresponding target outputs (correct answers for respective training input- s)(e.g., labels). The training engine 141 may find patterns in the training data that map the training input to the target output (the answer to be predicted) and provide the model 160 that captures these patterns. The model 160 may be composed of, e.g., a single level of linear or non-linear operations (e.g., a support vector machine (SVM), or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. Model 160 can use one or more of a support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. For convenience rather than limitation, the remainder of this disclosure describing discriminative machine learning model will refer to the implementation as a neural network, even though some implementations might employ other type of learning machine instead of, or in addition to, a neural network.

In some embodiments, such as with a supervised machine learning model, the one or more training inputs of the set of the training inputs are paired with respective one or more training outputs of the set of training outputs. The training input-output pair(s) can be used as input to the machine learning model to help train the machine learning model to determine, for example, patterns in the data.

In some embodiments, training data, such as training input and/or training output, and/or input data to a trained machine learning model (collectively referred to as "machine learning model data" herein) can be preprocessed before providing the aforementioned data to the (trained or untrained) machine learning model (e.g., discriminative machine learning model and/or generative machine learning model) for execution. Preprocessing as applied to machine learning models (e.g., discriminative machine learning model and/or generative machine learning model) can refer to the preparation and/or transformation of machine learning model data.

In some embodiments, preprocessing can include data scaling. Data scaling can include a process of transforming numerical features in raw machine learning model data such that the preprocessed machine learning model data has a similar scale or range. For example, Min-Max scaling (Normalization) and/or Z-score normalization (Standardization) can be used to scale the raw machine learning model. For instance, if the raw machine learning model data includes feature representing temperatures in Fahrenheit, the raw machine learning model data can be scaled to a range of [0, 1] using Min-Max scaling.

In some embodiments, preprocessing can include data encoding. Encoding data can include a process of converting categorical or text data into a numerical format on which a machine learning model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by machine learning models. In some embodiments embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by machine learning models.

In some embodiments, the training set is obtained from server machine 130. Server machine 150 includes a false eyelash module 151 that provides current data (e.g., 2D image data, etc.) as input to the trained machine learning model (e.g., model 160) and runs the trained machine learning model (e.g., model 160) on the input to obtain one or more outputs.

In some embodiments, confidence data can include or indicate a level of confidence of that a particular output (e.g., output(s)) corresponds to one or more inputs of the machine learning model (e.g., trained machine learning model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using a machine learning model.

In some embodiments, machine learning model, such as model 160, may be (or may correspond to) one or more computer programs executed by processor(s) of server machine 140 and/or server machine 150. In other embodiments, machine learning model may be (or may correspond to) one or more computer programs executed across a number or combination of server machines. For example, in some embodiments, machine learning models may be hosted on the cloud, while in other embodiments, these machine learning models may be hosted and perform operations using the hardware of a client device 110. In some embodiments, the machine learning models may be a self-hosted machine learning model, while in other embodiments, machine learning models may be external machine learning models accessed by an API.

In some embodiments, server machines 130 through 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items of the false eyelash platform 120. The false eyelash platform 120 can also include a website (e.g., a webpage) or application back-end software that can be used to provide users with access to the false eyelash platform 120.

In some embodiments, one or more of server machine 130, server machine 140, model 160, server machine 150 can be part of false eyelash platform 120. In other embodiments, one or more of server machine 130, server machine 140, server machine 150, or model 160 can be separate from false eyelash platform 120 (e.g., provided by a third-party service provider).

Also as noted above, for purpose of illustration, rather than limitation, aspects of the disclosure describe the training of a machine learning model (e.g., model 160) and use of a trained machine learning model (e.g., model 160). In other embodiments, a heuristic model or rule-based model can be used as an alternative. It should be noted that in some other embodiments, one or more of the functions of false eyelash platform 120 can be provided by a greater number of machines. In addition, the functionality attributed to a particular component of the false eyelash platform 120 can be performed by different or multiple components operating together. Although embodiments of the disclosure are discussed in terms of false eyelash platforms, embodiments can also be generally applied to any type of platform or service.

Figure 1B:
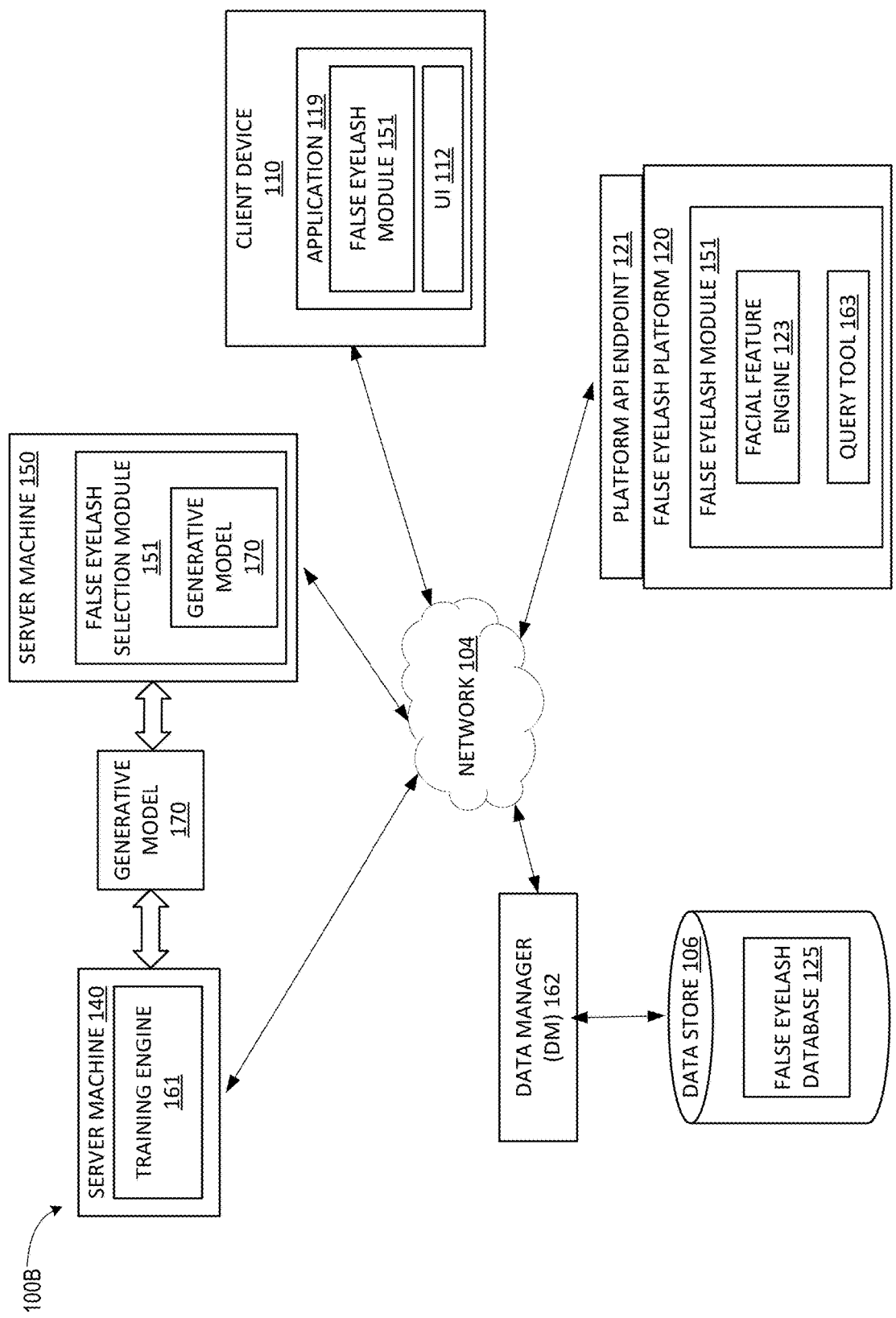
FIG. 1B illustrates a high-level component diagram of an example system architecture for a generative machine learning model, in accordance with some embodiments of the disclosure.

FIG. 1B illustrates a high-level component diagram of an example system architecture 100B for a generative machine learning model, in accordance with some embodiments of the disclosure. It can be noted that elements of system 100A can be used to help describe elements system architecture 100B (also referred to as "system 100B" herein). For the sake of clarity and brevity, the description of elements of FIG. 1A can similarly apply to corresponding elements of FIGS. 1B and 1s not repeated here. It can be further noted the description of FIG. 1A can similarly apply to FIG. 1B, unless otherwise described, and is not repeated here for the sake of clarity and brevity.

The system 100B includes a data store 106, a generative machine learning model 170 trained by server machine 140 and provided to server machine 150, a false eyelash platform 120, one or more client devices 110, data manager 162 and/or other components connected to a network 104. In some embodiments, system 100B can, at least in part, be a part of or can be included in system 100A, as described above.

In some embodiments, the system 100B includes a server machine 150 including a generative machine learning model (GM) 170 (also referred to as "generative AI model" herein). In some embodiments, a generative machine learning model 170 can be trained according based on a corpus of data, as described herein.

In some embodiments, a generative machine learning model 170 can deviate from some machine learning models based on the generative machine learning model's ability to generate new, original data. As described above, a generative machine learning model 170 can include a generative adversarial network (GAN) and/or a variational autoencoder (VAE). In some instances, a GAN, a VAE, and/or other types of generative machine learning models can employ different approaches to training and/or learning the underlying probability distributions of training data, compared to some machine learning models.

For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

In some embodiments, the generative machine learning model 170 can be a generative large language model (LLM). In some embodiments, the generative machine learning model 170 can be a large language model that has been pre-trained on a large corpus of data so as to process, analyze, and generate human-like text based on given input.

In some embodiments, the generative machine learning model 170 may have any architecture for LLMs, including one or more architectures as seen in Generative Pre-trained Transformer series (Chat GPT series LLMs), Google's Bard®, or LaMDA, or leverage a combination of transformer architecture with pre-trained data to create coherent and contextually relevant text.

In some embodiments, a generative machine learning model 170, such as an LLM, can use an encoder-decoder architecture including one or more self-attention mechanisms, and one or more feed-forward mechanisms. In some embodiments, the generative machine learning model 170 can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative machine learning model 170 can also utilize the previously discussed deep learning techniques, including recurrent neural networks (RNNs), convolutional neural networks (CNNs), or transformer networks.

In some embodiments, the generative machine learning model 170 can be a multi-modal generative machine learning model, such as a Vision-Language Model (VLM). In some embodiments, the generative machine learning model 170 can be a VLM that has been pre-trained on a large corpus of data (e.g., textual data and image data) so as to process, analyze, and generate human-like text and/or image data based on given input (e.g., image data and/or natural language text).

With respect to generative machine learning model 170, generative machine learning model 170 can be trained by server machine 140 (or another server or computing device of system 100B), in some embodiments.

In some embodiments, training a generative machine learning model can include providing training input to a generative machine learning model 170, and the generative machine learning model 170 can produce one or more training outputs. The one or more training inputs can be compared to one or more evaluation metrics. An evaluation metric can refer to a measure used to assess the output (e.g., training output(s)) of a machine learning model, such as a generative machine learning model 170. In some embodiments, the evaluation metric can be specific to the task and/or goals of the machine learning model. Based on the comparison, one or more parameters and/or weights of the generative machine learning model 170 can be adjusted (e.g., backpropagation based on computed loss). In some embodiments, and for example, the one or more training outputs can be compared to an evaluation metric such as a ground truth (e.g., target output, such as a correct or better answer). In some embodiments and for example, the one or more training outputs can be evaluated/compared to an evaluation metric and can be rewarded (e.g., evaluated as a positive answer) or penalized (e.g., evaluated as a negative answer) based on the quality of the one or more training outputs (e.g., reinforcement learning).

In some embodiments, a validation engine (not shown) may be capable of validating a generative machine learning model 170 using a corresponding set of features of a validation set from the training set generator. In some embodiments, the validation engine may determine an accuracy of each of the trained generative machine learning models 170 (e.g., accuracy of the training output) based on the corresponding sets of features of the validation set. The validation engine may discard a trained generative machine learning model 170 that has an accuracy that does not meet a threshold accuracy. In some embodiments, a selection engine (not shown) may be capable of selecting a generative machine learning model 170 that has an accuracy that meets a threshold accuracy. In some embodiments, the selection engine may be capable of selecting the trained generative machine learning model 170 that has the highest accuracy of the trained generative machine learning models 170.

A testing engine (not shown) may be capable of testing a trained generative machine learning model 170 using a corresponding set of features of a testing set from the training engine 161. For example, a first trained generative machine learning model 170 that was trained using a first set of features of the training set may be tested using the first set of features of the testing set. The testing engine may determine a trained generative machine learning model 170 that has the highest accuracy of all of the trained machine learning models based on the testing sets.

In some embodiments, a generative machine learning model 170 can be trained on a corpus of data, such textual data and/or image data. In some embodiments, the generative machine learning model 170 can be a model that is first pre-trained on a corpus of text to create a foundational model (e.g., also referred to as "pre-trained model" herein), and afterwards adapted (e.g., fine-tuned or transfer learning) on more data pertaining to a particular set of tasks to create a more task-specific or targeted generative machine learning model (e.g., also referred as an "adapted model" herein.) The foundational model can first be pre-trained using a corpus of data (e.g., text and/or images) that can include text and/or image content in the public domain, licensed content, and/or proprietary content (e.g., proprietary organizational data). Pre-training can be used by the generative machine learning model 170 to learn broad image elements and/or broad language elements including general sentence structure, common phrases, vocabulary, natural language structure, and any other elements commonly associated with natural language in a large corpus of text. In example, the pre-trained model can be fine-tuned to the specific task or domain that the generative machine learning model 170 is to be adapted. In some embodiments, generative machine learning model 170 may include one or more pre-trained models or adapted models.

System 100B may further include a data manager (DM) 162 that may be any application configured to manage data transport to and from data store 106, e.g., retrieval of data and/or storage of new data, indexing data, arranging data by user, time, type of activity to which the data is related, associating the data with keywords, and/or the like. Data manager 162 may collect data associated with various user activities, e.g., content pertaining to user 2D images, user 2D video steams, false eyelash configuration information, applications, internal tools, and/or the like. Data manager 162 may collect, transform, aggregate, and archive such data in data store 106. In some embodiments, data manager 162 can transform data into vector data, such as vector embedding data, and index and store the vector data at data store 106. The data manager 162 can also provide the appropriate vector data to generative machine learning model 160 for training and inference.

In some embodiments, false eyelash platform 120 may include query tool 163 (also referred to as "prompt tool 163" herein) configured to perform automated identification and facilitate retrieval of relevant and timely contextual information for quick and accurate processing of user queries (or queries by false eyelash platform 120) by generative machine learning model 170. In some embodiments, query tool 163 may be implemented by false eyelash module 151. It can be noted that a user's request for an operation pertaining to false eyelash platform 120 can be formed into a query (e.g., prompt) that uses query tool 163, in some embodiments. Via network 104, query tool 163 may be in communication with one or more client devices 110, sever machine 140, server machine 150, and data store 106, e.g., via data manager 162. Communications between query tool 163 and server machine 150 may be facilitated by an API of server machine 150. Communications between query tool 163 and data store 106/data manager 162 may be facilitated by an API of data store 106/data manager 162. In some embodiments, query tool 163 may generate an intermediate query (e.g., query analyzer) and may translate an intermediate query into unstructured natural-language format (e.g., natural language prompt) and, conversely, translate responses received from generative machine learning model 170 into any suitable form (including any structured proprietary format as may be primarily used by query tool 163).

In can be noted that a query as provided to a generative machine learning model can also be referred to as a "prompt" herein. A prompt can refer to an input (e.g., a specific input) or instruction provided to a generative machine learning model 170 to generate a response. In some embodiments, a prompt can be written, at least in part, in natural language. Natural language can refer a language that is expressed in or corresponds to a way that humans communicate using spoken or written language to convey meaning, express thoughts, and/or interact. In some embodiments, the prompt can specify the information or context the generative machine learning model 170 can use to produce an output. For example, a prompt can include one or more of text, image, or other data that serves as the starting point for the generative machine learning model 170 to perform a task.

In some embodiments, query tool 163 may include a query analyzer to support various operations. For example, query analyzer may receive a user input, e.g., user query, and generate one or more intermediate queries corresponding to generative machine learning model 170 to determine what type of data (e.g., user data, false eyelash configuration information data, etc.) generative machine learning model 170 might use to successfully respond to the user input. Responsive to receiving a response from generative machine learning model 170, query analyzer may analyze the response and form a request for relevant contextual data for data manager 162, which may then supply such data. Query analyzer may then generate a final query (e.g., prompt) to generative machine learning model 170 that includes the original user query and the contextual data received from data manager 162. In some embodiments, query analyzer may itself include a lightweight generative machine learning model that may process the intermediate query(ies) and determine what type of contextual data may have to be provided to generative machine learning model 170 together with the original user query to ensure a meaningful response from generative machine learning model 170.

For example and in some embodiments, query tool 163 can implement a retrieval augmented generation (RAG) technique that allows the generative machine learning model 170 to retrieve data from various sources, such as data store 106. For instance and in some embodiments, false eyelash database 125 can include proprietary, domain-specific data and/or organization-specific data, such as data related to false eyelashes and/or lash configuration information of a particular organization. Responsive to a user query, the query analyzer can identify specific instructions related to the user query and that instruct the query analyzer to obtain relevant contextual data from false eyelash database 125. The query analyzer can identify relevant contextual data (e.g., organization-specific false eyelashes, lash configuration information, instruction guides, tutorials etc.) from false eyelash database 125 and generate a final query that includes the user query and the relevant contextual data. The final query can be provided as a prompt to generative machine learning model 170 for execution.

In some embodiments, query tool 163 may include (or may have access to) instructions stored on one or more tangible, machine-readable storage media of false eyelash platform 120 and executable by one or more processing devices of false eyelash platform 120. In some embodiments, false eyelash module 151, query tool 163, and or generative machine learning model 170 may be implemented at false eyelash platform 120. In some embodiments, false eyelash module 151, query tool 163, and/or generative machine learning model 170 may be a combination of a client component and a server component. In some embodiments, false eyelash module 151, query tool 163, and/or generative machine learning model 170 may be executed entirely on the client device(s) 110. Alternatively, some portion of false eyelash module 151, query tool 163, and/or generative machine learning model 170 may be executed on a client device 110 while another portion of false eyelash module 151, query tool 163, and/or generative machine learning model 170 may be executed on false eyelash platform 120.

In some embodiments, UI 112 of client device 110 may allow a user to select from multiple (e.g., specialized in particular knowledge areas) generative models 170. In some embodiments, UI 112 may allow the user to provide consent for query tool 163 and/or generative model 170 to access user data previously stored in data store 106 (and/or any other memory device), process and/or store new data received from the user, and the like. UI 112 may allow the user to withhold consent to provide access to user data to query tool 163 and/or generative model 170.

In situations in which the systems discussed here collect personal information about users, or can make use of personal information, the users of client devices 110 can be provided with an opportunity to control whether or how the false eyelash platform 120 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the false eyelash platform 120.

Figure 2A:
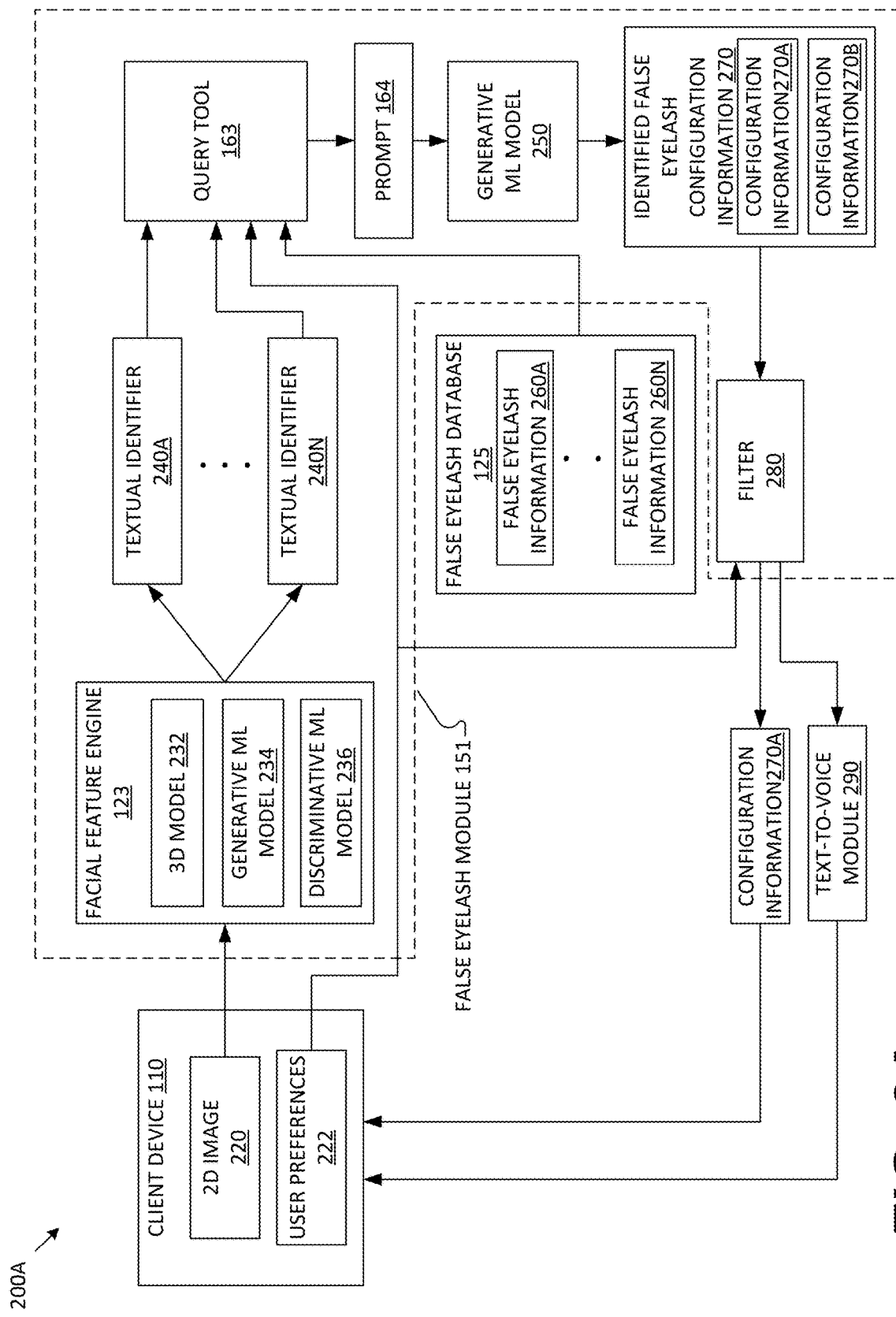
FIG. 2A illustrates an example system implementing a method for identifying false eyelash configuration information based on a 2D image, in accordance with some embodiments of the present disclosure.

FIG. 2A illustrates an example system 200A implementing a method for identifying false eyelash configuration information based on a 2D image, in accordance with some embodiments of the present disclosure. In some embodiments, at least a portion of functionality described with respect to system 200A is performed by the false eyelash module 151. In some embodiments, a user of client device 110 can provide or identify a 2D image 220. The 2D image 220 may be provided by the user by selecting an image stored on the client device 110 and/or by using a camera of the client device 110 to capture the image. In some embodiments, the client device 110 can identify a 2D image stored at a remote location, such as an external storage location, a data store, etc. In some embodiments, the 2D image 220 is a 2D image of a subject's face (e.g., such as the user's face, a human face, etc.) that is captured by a camera. In some embodiments, 2D image 220 can include one or more video frames (associated with timestamps for sequential playback) of a video (e.g., video data representing a subject's face, etc.).

In some embodiments, the user may provide user preferences 222 via the client device 110. In some embodiments, the user preferences 222 can be stored at a data store and associated with the user for later retrieval and use. In some embodiments, user preferences 222 may include non-detectable features such as features that are non-detectable based on the 2D image 220 (e.g., the color preference of the user). In some embodiments, user preferences 222 may include characteristics such as the user's preferred or desired false eyelash style, desired false eyelash color, etc. For example, a user preference can include a bold style rather than a natural look style as pertaining to applied false eyelash configuration information. In some embodiments, user preferences 222 can include other user attributes such as age and/or lifestyle, etc.

In some embodiments, 2D image data representing the 2D image 220 is provided to a facial feature engine 123. In some embodiments, the facial feature engine 123 performs image and/or data processing to determine textual identifiers 240A-N representing facial features of the subject's face and/or relationship(s) between the subject's facial features. For example, the facial feature engine 123 may identify features of the subject's face such as eyes, nose, lips, etc. In some embodiments, the facial feature engine 123 creates textual identifiers for the identified features, the textual identifiers describing the identified features. In some embodiments, the textual identifiers include names of the particular facial features, such as "nose," "right eye," or "left eye," etc. In some embodiments, the facial feature engine 123 may create textual identifiers that describe the geometric features (e.g., size, shape, dimensions, etc.) of the identified features. In some embodiments, the textual identifiers describe relationships between the identified features (e.g., distances, ratios, etc.). In some embodiments, the facial feature engine 123 outputs one or more textual identifiers 240A-240N. The textual identifiers 240A-240N may include text information that describes the identified facial features as described above.

In some embodiments, to generate the textual identifiers 240A-240N, the facial feature engine 123 uses one or more of 2D image 220, 3D model 232, a generative machine learning model 234, and/or a discriminative machine learning model 236.

In some embodiments, the 2D image data representing 2D image 220 can be used to identify one or more textual identifiers 240A-240N. In some embodiments, facial features and/or relationship(s) between facial features can be identified on the 2D image 220. For example, one or more points of the 2D images can be identified as corresponding to one or more facial features. The identified facial features (e.g., 2D facial feature data) identified by one or more 2D points (e.g., pixels) can be associated with one or more textual identifiers such as names of the identified facial features. In some embodiments, the 2D image data can be used to obtain 2D geometric data. In some embodiments, 2D geometric data can be identified for one or more facial features. The 2D geometric data can include measurements of a particular facial feature (e.g., distance between 2D points representing the corners of the right eye). In some embodiments, the 2D geometric data can be included on one or more textual identifiers. In some embodiments, the 2D image data can be used to obtain 2D facial feature relationship data. In some embodiments, 2D facial feature relationship data can include relationships between two or more facial features. In some embodiments, the 2D facial feature relationship data can include measurements and/or ratios between two or more facial features. The 2D facial feature relationship data can be included in one or more textual identifiers. In can be noted the 2D information can include one or more 2D facial feature data, 2D geometric data, and 2D facial feature relationship data. It can be noted that the description 3D information and obtaining textual identifiers using 3D information (as described below) can apply equally to 2D information apart from depth information, unless otherwise described.

In some embodiments, the 2D information can be obtained by one or more image processing techniques. In some embodiments, the 2D image can be used as input to a machine learning model, such as generative machine learning model or discriminative machine learning model, and 2D information and/or textual identifiers reflecting the 2D information can be obtained as output of the machine learning model.

In some embodiments, the textual identifiers 240A-240N are identified from a database of textual identifiers. For example, a database may contain information correlating predetermined facial features with predetermined textual identifiers. The facial feature engine 123 may determine that a face in the 2D image 220 contains one of the predetermined facial features. The facial feature engine 123 may label the facial feature of the 2D image 220 with a corresponding predetermined textual identifier corresponding to the predetermined facial feature.

In some embodiments, the 2D image data of the 2D image 220 is used as input to the facial feature engine 123. In some embodiments, a 3D model 232 representing the subject's face is generated based on the 2D image data representing the 2D image 220. The 3D model 232 may be a 3D representation of the subject's face. In some embodiments, the 3D model 232 is a mathematical model, such as a geometric model. In some embodiments, the 3D model 232 is a 3D morphological model. In some embodiments, the 3D model 232 can be generated using a conversion system, such as conversion system 420 of FIG. 4. More details regarding the construction of the 3D model 232 are discussed herein below with respect to FIG. 4. In some embodiments, 3D model 232 is represented by 3D model data.

In some embodiments, 3D model data of a 3D model 232 can represent a three-dimensional digital representation of a scene or object (e.g., a 3D model). In some embodiments, the 3D model data is derived or generated using the respective 2D image (e.g., the 2D image represented by 2D image data). In some embodiments, the 3D model data of a 3D model 232 can include width information, height information, and depth information of the scene and/or object. The 3D model data can include geometric data that describes the corresponding scene or object. The geometric data can include one or more of vertices (e.g., points), edges, and/or faces. In some embodiments, vertices (e.g., nodes or points) can include points of a 3D model 232. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges). In some embodiments, one or more of vertices, edges and faces can define the geometry of a 3D model 232.

In some embodiments, the 3D model data of the 3D model 232 can include texture information that describes an object's surface texture. In some embodiments, 3D model data does not include texture information. In some embodiments, 3D model data includes material information that can influence the appearance of a 3D model at rendering (e.g., how light reflects from the material). In some embodiments, 3D model data does not include material information. In some embodiments, the 3D model data includes lighting information that describes the interaction of light (and absence of light) with the scene or object. In some embodiments, 3D model data does not include lighting information. In some embodiments, 3D model data includes color information that indicates the colors of surface (e.g., faces) of a 3D model 232.

In some embodiments, 3D model data of 3D model 232 can include and/or be used to generate additional 3D information such as 3D landmark data representing 3D landmarks, 3D geometric data, and/or 3D relationship data. In some embodiments, 3D information can refer to one or more of 3D model data, 3D geometric data, 3D landmark data and/or 3D relationship data.

In some embodiments, the 3D landmark data (also referred to as "landmark data") can include data that represents one or more 3D landmarks (also referred to as "landmarks") corresponding to one or more facial features of the human face. A 3D landmark can represent a facial feature of a subject. A landmark can be described by or be represented by 3D landmark data. In some embodiments, 3D landmark data can correspond to associated 2D facial feature represented in the 2D image 220. In some embodiments, 3D landmark data can identify one or more 3D points (e.g., vertices of the 3D model data 233A) that represent a respective facial feature represented by the 2D image 220 and/or one or more connections between multiple 3D points (e.g., edges). For example, the nose of a subject can be represented by a single 3D point (and corresponding 2D point of the 2D image 220) at the tip of the nose, or by multiple 3D points (and corresponding 2D points of the 2D image 220) along the bridge of the nose, the tip of the nose, and/or outline of the nose.

In some embodiments, the 3D landmark data can include 3D coordinate data that represents the 3D points, such as x-coordinate, y-coordinate, and z-coordinate information identifying the one or more 3D points (e.g., vertices) in three-dimensional space. In some embodiments, the 3D landmark data can include textual identifiers of respective facial features represented by one or more 3D points. For example, a 3D landmark that represents a nose can include or be associated with a textual identifier, e.g., "nose," "eyelid," etc.

In some embodiments, 3D geometric data can describe a 3D landmark represented by the 3D landmark data. In some embodiments, the 3D geometric data can include one or more of vertices (e.g., 3D points), edges, and/or faces. In some embodiments, vertices (e.g., nodes or points, etc.) can include 3D points of a 3D model represented by 3D landmark data. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges).

In some embodiments, the 3D geometric data can include data identifying a relationship between two or more 3D points of a facial feature represented by the 3D landmark data (e.g., between two or more 3D points corresponding to the same facial feature). In some embodiments, the relationship between two or more 2D points can include one or more of distances, angles, positions, areas, or ratios.

In some embodiments, the 3D geometric data can include data identifying a line or curve between two or more 3D points, and the distance therebetween. For example, the 3D geometric data 246A can include data identifying the length of an eyebrow that corresponds to a line or curve between two or more 3D points representing the eyebrow.

In some embodiments, the 3D geometric data 246A can include data identifying two or more lines between three or more 3D points, and the ratio between the length (e.g., magnitude) of each line. For example, the 3D geometric data can include data identifying a ratio between a 3D eye height (represented as a first line between an eye apex and an eye bottom) and a 3D eye width (represented as a second line between an inner eye corner and an outer eye corner).

In some embodiments, the 3D landmark relationship data can include data identifying a relationship between 3D landmark data corresponding to two or more respective facial features. In some embodiments, the 3D landmark relationship data can include data identifying a relationship between 3D geometric data corresponding to two or more facial features. In some embodiments, the relationships between data corresponding to a first facial feature (e.g., 3D landmark data and/or 3D geometric data) and data corresponding to a second facial feature (e.g., second 3D landmark data and/or 3D geometric data) can include one or more of distances, angles, positions, areas, or ratios of 3D information.

In some embodiments, the 3D landmark relationship data can include data identifying a line or curve between one or more 3D points corresponding to a first facial feature and one or more 3D points corresponding to a second facial feature. For example, the 3D landmark relationship data can include data identifying a distance between one or more points representing the left eye and one or more points representing the right eye (e.g., the distance between the left and right eye).

In some embodiments, the 3D landmark relationship data can include data identifying a first line between two or more 3D points of a first facial feature and a second line between two or more 3D points of a second facial feature, and an angle(s) between the first line and the second line. For example, the 3D landmark relationship data can include data identifying angle(s) between a horizontal plane that intersects the 3D points representing the right and left pupils, and a right eye line between 3D points representing the inner corner of the right eye and the outer corner of the right eye.

In some embodiments, the 3D landmark relationship data can include data identifying a first measurement (e.g., size, length, depth, width, area, etc.) corresponding to a first facial feature (corresponding to one or more 3D points) and a second measurement corresponding to a second facial feature (corresponding to one or more 3D points), and a ratio between the first measurement and the second measurement. For example, the 3D landmark relationship data 247A can include data identifying a ratio between an eye size (represented by one or more 3D points representing the eye) and an eyebrow size (represented by one or more 3D points representing the eyebrow).

In some embodiments, the facial feature engine 123 can generate a 3D model 232 that includes 3D model data and one or more of the 3D information as described above. For example, the facial feature engine 123 can generate 3D model data of a 3D model 232, and use logic to determine additional 3D information.

In some embodiments, the facial feature engine 123 can generate 3D model data of a 3D model 232. Subsequently, the 3D model data of the 3D model can be used to generate additional 3D information, such as 3D landmark data, 3D geometric data, and/or 3D landmark relationship data. For example, the 3D model data of the 3D model 232 and/or the 2D image data of the 2D image 220 can be used as input to a machine learning model (e.g., a discriminative machine learning model or a generative machine learning model, etc.) to obtain the 3D information.

In some embodiments, facial feature engine 123 uses a trained machine learning model to identify the 3D landmarks of the 3D model 232. In some embodiments, the trained machine learning model may be a discriminative machine learning model, such as discriminative machine learning model 236. In some embodiments, the input to the trained machine learning model can include 3D model data representing the 3D model 232. In some embodiments, the output of the trained machine learning model can include one or more 3D landmark data, 3D geometric data, 3D landmark relationship data, and textual identifiers thereof.

In some embodiments, the 3D model data of the 3D model 233 and/or additional 3D information is used by the facial feature engine 123 to generate the textual identifiers 240A-240N. In some embodiments, the facial feature engine 123 generates the textual identifiers 240A-240N that describe the 3D information, such as 3D geometric data, 3D landmarks, and/or 3D landmark relationship data. For example, the facial features engine 123 can identify the following textual identifiers using the 3D model data of the 3D model 232 and/or additional 3D information: a first subset of 3D points identified as the "right eye" and a second subset of 3D points identified the "right eyebrow," the width of the right eye (e.g., inner corner to outer corner) measures 25 millimeters (mm) and be upwards slanting (e.g., line through corners of eye slant upwards relative to a horizontal axis) by 10 degrees, and the distance between the pupil of the right eye and apex of the right eyebrow is 25 mm, etc. In some embodiments, any one or more of 2D information is used by the facial feature engine 123 to generate the textual identifiers 240A-240N.

In some embodiments, the facial feature engine 123 can use logic with the 3D model data and/or additional 3D information to generate the textual identifiers 240A-240N. In some embodiments, the 3D model data and/or additional 3D information can be used as the textual identifiers 240A-240N. In some embodiments, the facial feature engine 123 can use the 3D model data and/or additional 3D information as input to a machine learning model (e.g., generative machine learning model and/or discriminative machine learning model) where the machine learning model generates textual identifiers 240A-240N, as further described below.

In some embodiments, facial feature engine 123 uses a trained machine learning model to identify the textual identifiers 240A through 240N. In some embodiments, one or more of the 2D image data representing the 2D image 220 and/or 3D model data representing the 3D model 232 (and/or additional 3D information, etc.) is used as input to the discriminative machine learning model 236. Discriminative machine learning model 236 may correspond to model 160 described herein above with respect to FIG. 1A. In some embodiments, the output of the trained machine learning model can include one or more 2D facial feature data, 2D geometric data, 2D facial feature relationship data, 3D landmark data, 3D geometric data, 3D landmark relationship data, and textual identifiers 240A-240N thereof. The discriminative machine learning model 236 may process one or more of the 2D image data or 3D model data (and/or additional 3D information) to classify facial features and may further generate the textual identifiers 240A-240N based on the classified facial features. For example, the discriminative machine learning model 236 may classify an eye based on the shape of the eye in the 2D image 220. The discriminative machine learning model 236 may then generate a textual identifier to describe the shape of the eye in the 2D image 220. For example, the textual identifier can indicate "the shape of the right eye is an almond shape."

In some embodiments, the 2D image data representing the 2D image 220 and/or 3D model data representing the 3D model 232 (and/or additional 2D information and/or 3D information) can be used as input for the generative machine learning model 234. In some embodiments, generative machine learning model 234 may correspond to generative machine learning model 170 described herein above with respect to FIG. 1B. In some embodiments, the generative machine learning model 234 can include a VLM (vision-language model). In some embodiments, the generative machine learning model 234 generates the textual identifiers 240A-240N based on the 2D image data of the 2D image 220 and/or 3D model data of the 3D model 232. The generative machine learning model 234 may process the 2D image data and/or 3D model data to identify facial features and may further generate the textual identifiers 240A-240N that describe the identified facial features and/or relationships between multiple facial features (as described above). For example, the generative machine learning model 234 may identify an eye in the 2D image 220 and may further identify the shape, size, slant, etc. of the identified eye and geometric relationships between the eye and other facial features such as a corresponding eyelid, eyebrow, etc. The generative machine learning model 234 may generate one or more textual identifiers to describe the features of the eye. In other examples, the generative machine learning model 234 can identify additional facial feature(s) and further identify a geometric characteristic of the facial feature and/or relationships between multiple facial features and generated corresponding textual identifiers.

In some embodiments, the generation of textual identifiers using a machine learning model(s) can occur in multiple stages. For example and in some embodiments, in a first stage the 2D image data representing the 2D image 220 and/or 3D model data representing the 3D model 232 can be used as input for machine learning model (discriminative or generative machine learning model) and the output can include additional 3D information (or corresponding 2D information, such as 2D geometric information, 2D facial feature data, and/or 2D facial feature relationship data). In a second stage, one or more of the 2D image data representing the 2D image 220 (and/or additional 2D information) and 3D information (including 3D model data representing the 3D model 232) can be used by another machine learning model (discriminative or generative machine learning model) as input to generate textual identifiers 240A-240N.

In some embodiments, a textual identifier (such as textual identifiers 240A-N) includes textual information that describes, identifies, and/or is related to facial features and/or relationships between facial features of a subject (e.g., a subject in the 2D image 220). In some embodiments, a textual identifier can describe characteristics or classifications of one or more facial features (e.g., eye shape, eye type, eye size, eye slant, eyelid type, eyelid size, eyelid curvature, eyebrow shape, eyebrow type, eyebrow size, eyelash shape, eyelash type, cheekbone shape, etc.). In some embodiments, a textual identifier describes a relationship between two or more facial features of the human face. In some embodiments, the textual identifier describes a relationship between an eye and an eyebrow of the eye. For example, and in some embodiments, a textual identifier may describe the distance between the pupil of an eye and the apex of an associated eyebrow.

In some embodiments, the textual identifier can identify names of facial features (e.g., nose bridge, forehead, etc.). In some embodiments, the textual identifier can be at least in part composed of natural language. In some embodiments, the textual identifier can describe 2D facial features of the subject. In some embodiments, the textual identifiers can describe and/or include the one or more 3D model data and/or additional 3D information.

In an example, the textual identifier can include a classification of the eye (e.g., "right eye is almond shape"), a description of the 2D or 3D geometric data (e.g., "the width being 25 mm from inner corner to outer corner"), a description of the 2D or 3D relationship data (e.g., "the distance from the pupil to the apex of the right eyebrow being 22 mm"), etc. In another example, the textual identifier can also include 2D or 3D relationship data expressed as ratio, such as e.g., "the ratio of the width of right eye, to the space between the two eyes, and the width of the left eye is 1:1.2:1."

In some embodiments, the facial feature engine 123 can generate the textual identifiers 240A-240N, as described herein. In some embodiments, the textual identifiers 240A-240N can be determined from a database of predetermined textual identifiers described herein above. For example, and in some embodiments, the textual identifiers 240A-240N can be determined based on 2D image data of the 2D image 220. In some embodiments, the facial feature engine 123 can use a model (e.g., 3D model 232, generative ML model 234, discriminative model 236, etc.) to detect (e.g., identify) facial features represented in the 2D image data of the 2D image 220. The facial features may be individual points or groups of points (e.g., such as representing an eyebrow, etc.). In some embodiments, some facial features (e.g., such as an eyebrow, etc.) can be determined using 2D information (e.g., shape, size, etc.). For example, characteristics of an eyebrow (e.g., shape, upturned, downturned, etc.) can be determined based on 2D information. In some embodiments, some points associated with the facial feature(s) may then be projected and/or transformed into a 3D coordinate space. Such points may be associated with facial features that can only be determined using depth, such as eye protrusion.

Each of the textual identifiers 240A-240N may correspond to one or more specific facial feature of the subject's face in the 2D image 220. For example, a first textual identifier 240A may correspond to an eye, a second textual identifier 240B may correspond to a nose, a third textual identifier 240C may correspond to a lip, etc. In some embodiments, each of the textual identifiers 240A-240N describe the corresponding facial feature. Continuing with the preceding example, textual identifier 240A may describe the eye shape, textual identifier 240B may describe the nose size, and the textual identifier 240C may describe the lip color, etc. The textual identifiers 240A-240N can describe any characteristic of the corresponding facial feature and the above example(s) are not meant to be limiting. In some embodiments, text for the textual identifiers 240A-240N are determined from a lookup table storing a variety of textual names that correspond to particular facial features and the associated 2D or 3D points.

In some embodiments, query tool 163 uses various input(s) to generate a prompt 164 for generative machine learning model 250. In some embodiments, one or more of the textual identifiers 240A-240N are used as input into query tool 163 to generate a prompt 164. In some embodiments, query tool 163 can use one or more user preferences 222 as input. In some embodiments, the query tool 163 can use information 260 (also referred to as "false eyelash information 260A-260N," herein) from false eyelash database 125 as input. Using one or more of the textual identifiers 240A-240N, the user preferences 222, and/or information 260 from the false eyelash database 125, the query tool 163 may generate a prompt 164 (e.g., a "query" as described herein above). In some embodiments, the prompt 164 may be a natural language prompt identifying one or more of the textual identifiers 240A-240N, the user preferences 222, and/or false eyelash information 260 from the false eyelash database 125. In some embodiments, the query tool 163 generates the prompt 164 using the textual identifiers 240A-N and the user preferences 222. The query tool may append the textual identifiers 240A-N and the user preferences 222 with information found in the false eyelash database 125 (e.g., information found in the false eyelash database 125 that is relevant to the textual identifiers 240A-N and/or relevant to the user preferences 222) to generate contextual information for the prompt 164. In some embodiments, information included in the prompt 164 from the false eyelash database 125 includes false eyelash configuration information relevant to the textual identifiers 240A-240N. More information regarding false eyelash configuration information (e.g., lash configuration information) is discussed herein below with respect to FIG. 8.

In some embodiments, the prompt 164 further includes a set of instructions. The set of instructions may include instructions for identifying objects (e.g., identified false eyelash configuration information 270) that are associated with textual identifiers 240A-N and corresponding to 2D image data of the 2D image 220 (e.g., of the subject's face). For example, the set of instructions may be to identify false eyelash configuration information (e.g., information about which is stored in the false eyelash database 125) that are relevant to the facial features of the subject's face represented in the 2D image 220 (e.g., and identified and/or described by the textual identifiers 240A-N) and/or take into account the user preferences 222).

In some embodiments, the prompt 164 includes information (e.g., false eyelash information 260 which may include lash configuration information, false eyelash configuration information, etc.) from the false eyelash database 125. The included information from the false eyelash database 125 may be used to add context to the instructions of the prompt 164 (e.g., give context to the instructions, etc.). In some embodiments, the query tool 163 searches the false eyelash database 125 for identifiers of false eyelash configuration information in a false eyelash category of interest to the user. For example, if the user is interested in artificial lash extensions, the query tool 163 can search the false eyelash database 125 for artificial lash extensions. In some embodiments, the query tool 163 can search for information describing how false eyelashes are to be selected based on facial features and relationships between facial features. In some embodiments, the query tool 163 uses the user preferences 222 when searching the database 125. For example, the query tool 163 may filter through data in the database 125 using the preferences 222 as an information filter. For example, the user preferences 222 may indicate the user prefers a "bold" look, so the query tool 163 may filter and/or search information in the false eyelash database 125 that corresponds to a "bold" look. In some embodiments, the query tool 163 searches the false eyelash database 125 for information that is relevant to the facial features described by and/or associated with the textual identifiers 240A-N and/or the user preferences 222. The relevant information (e.g., relevant to the textual identifiers 240A-N and/or relevant to the user preferences 222, etc.) is included by the query tool 163 in the prompt 164.

In some embodiments, the database 125 contains information 260 (e.g., descriptions, metadata, etc.) associated with multiple false eyelashes (e.g., false eyelash configuration information, etc.). In some embodiments, database 125 contains information 260 identifying a catalog of false eyelashes. For example, database 125 may store files and/or documents associated with a catalog of false eyelashes. In some embodiments, the information 260 stored at database 125 include embeddings, such as vectorized embeddings (e.g., database 125 is a vectorized database).

In some embodiments, information 260 stored in the database 125 may include size information, length information, style information, and/or or other geometric information related to false eyelashes (e.g., false eyelash configuration information, etc.). In some embodiments, information 260 may also include information relating particular false eyelashes with information pertaining to one or more facial features (e.g., facial features/landmarks, 2D and 3D geometric data, and 2D and 3D facial feature/landmark relationship data). For example, information 260A associated with a particular false eyelash configuration (e.g., an arrangement of false eyelashes) may indicate that such false eyelash configuration(s) are suitable for a certain eye shape.

In some embodiments, information 260 of database 125 can include information that associates false eyelashes with certain facial features and/or relationships between facial features. Information 260 may be a guide on what false eyelash configurations are to be used with a particular facial feature such as an eye shape, an eyebrow size, eyelid size, etc. In addition, or alternatively, the information 260 may be a guide on what false eyelashes are suited for use with a particular facial feature such as an eye shape, an eyebrow size, an eyelid size, etc., in some embodiments. The information 260 can be used as contextual information for prompt generation for a generative machine learning model (e.g., generative machine learning model 250) that allows the model to provide an output identifying false eyelash configuration information that corresponds to a facial feature of a subject (e.g., a subject of 2D image 220). For example, information 260 stored in the false eyelash database 125 may indicate that a subject having a particular eye shape or a specified distance between the pupil and the center of the eyebrow will look best with artificial lash extensions of a specific length, or a specific arrangement, and/or of a specific style, etc. This information can be used by the generative machine learning model to provide an output identifying false eyelash configuration information associated with false eyelashes (e.g., artificial lash extensions, etc.) having the specific length, arrangement, and/or style.

In some embodiments, the query tool 163 uses at least one of the textual identifiers 240A-240N and/or the user preferences 222 to search the false eyelash database 125 for relevant information 260. Upon finding the relevant false eyelash information 260 in the database 125 (e.g., the relevant information as described herein above, etc.), the query tool 163 incorporates a subset of the information 260 (e.g., a relevant subset of information 260) into the prompt 164. In some embodiments, the prompt 164 includes information associated with the textual identifiers 240A-N, information associated with the user preferences 222, and relevant information 260 from the false eyelash database 125. The information included in the prompt 164 may give context to instructions (e.g., as explained herein above) included in the prompt 164.

For example and in some embodiments, the query tool 163 implements retrieval augmented generation (RAG) techniques to select information 260 from the false eyelash database 125 and generate a prompt 164 using the retrieved information 260 (e.g., the retrieved relevant information 260). In some embodiments, the query tool 163 can search for and retrieve information 260 from the false eyelash database 125 that is related to one or more of the instructions, textual identifiers 240A-240N, and user preferences 222. In some embodiments, query tool 163 can transform one or more of the instructions, textual identifiers 240A-240N, and user preferences 222 into a mathematical equivalent such as vector representation (e.g., vectorized query). The query tool 163 can search the false eyelash database 125 (e.g., vectorized database) for vectors (representing false eyelash information 260) of the false eyelash database 125 that are similar to the vectorized query. The query tool 163 can use a similarity metric to compare the vectorized query to the vectors of the false eyelash database 125 and rank the false eyelash information 260 based on similarity scores reflecting similarity between the information 260 and the vectorized query. The information 260 that satisfies a threshold (e.g., exceeds a threshold) can be selected as relevant information. The selected information 260 can be used raw or transformed (e.g., summarized) for inclusion as contextual information in the prompt.

In an illustrative example, the instruction can include instructions to find false eyelash configuration information, the textual identifiers can include the dimensions of the subject's eyelids, and ratios of the size of the subject's eyelids to other facial features, and the user preference information can include a preference identifier that indicates that user prefers false eyelashes with a bold style. The query tool 163 can convert the instructions, textual identifiers 240, and preference information into a vector representation (e.g., vectorized query) and search the false eyelash database 125 using the vectorized query. The query tool 163 can identify user guides specifying the selection (and possibly application) of false eyelash configuration information based on facial features sizes and identifiers of bold-styled false eyelash products based on the vectorized query. The query tool can retrieve the above information and summarize at least some of the information to generate context (e.g., contextual information) for a prompt 164. The query tool 163 can also generate context and/or instructions based on one or more of the textual identifiers 240A-240B and user preferences 222. The additional context and instructions can be used for generation of the prompt 164.

In some embodiments, prompt 164 is used as input into a generative machine learning model 250. Generative machine learning model 250 may correspond to generative machine learning model 170 described herein above with respect to FIG. 1B. In some embodiments, generative machine learning model 250 is a large language model (LLM).

In some embodiments, generative machine learning model 250 is trained using a training dataset. In some embodiments, the training dataset includes a plurality of prompts that include groups of textual identifiers and/or other information as described herein above. Each group of textual identifiers may include information as described herein above. In some embodiments, the plurality of groups of textual identifiers are generated based on 2D images of human faces. For example, multiple 2D images of human faces can be processed to generate corresponding groups of textual identifiers 240 that are associated with facial features of the human faces. In some embodiments, the training dataset further includes a training subset of false eyelash configuration information. In some embodiments, the training subset of the false eyelash configuration information corresponds to a respective group of textual identifiers 240. For example, a first training subset of false eyelash configuration information corresponds to a prompt including a first group of textual identifiers 240 and a second training subset of false eyelash configuration information corresponds to a second group of textual identifiers 240.

In some embodiments, the generative machine learning model 250 is trained to generate an output that identifies false eyelash configuration information. The false eyelash configuration information may be from a false eyelash database (e.g., identified in the prompt) and may be related to one or more facial features described in one or more textual identifiers received as input by the generative machine learning model. In some embodiments, training of the generative machine learning model 250 includes performing a fine-tuning operation on a foundational generative machine learning model using the training dataset to generate the generative machine learning model 250.

In some embodiments, the generative machine learning model 250 provides an output that identifies identified false eyelash configuration information 270A-B (generally referred to as false eyelash configuration information 270) based on the input prompt 164. In some embodiments, the identified false eyelash configuration information 270 may be relevant to the prompt 164 (e.g., which can include contextualized information from false eyelash database 125). In some embodiments, the generative machine learning model 250 provides an output that instructs how false eyelash(es) associated with identified false eyelash configuration information 270 are to be used and/or applied to the subject's face. The output may include identified false eyelash configuration information 270A-B. In some embodiments, the identified false eyelash configuration information 270 are generated in response to information related to the textual identifiers 240A-N and/or the user preferences 222 included in the prompt 164. The identified false eyelash configuration information 270 may be generated further in response to relevant information (e.g., relevant to the textual identifiers 240A-N and/or the user preferences 222) from the false eyelash database 125 that is additionally included in the prompt 164 as context. For example, the identified false eyelash configuration information 270 may include indications of one or more false eyelashes (e.g., one or more sets of false eyelashes, one or more artificial lash extensions, etc.) that fit one or more facial features and/or are appropriate for particular relationships between facial features identified and/or described by textual identifier(s) 240A-240N while also taking into account the user preferences 222. In an example, the identified false eyelash configuration information 270 may include a selection of false eyelashes (e.g., one or more false eyelashes, one or more artificial lash extensions, etc. suitable for a particular eye shape (e.g., almond shape, etc.), eyelid size, and/or eye size, where the eye/eyelid shape/size is indicated by the textual identifier(s) 240A-240N.

In some embodiments, the identified false eyelash configuration information 270 includes an indication of false eyelashes that are related to or selected based on the facial features (e.g., relationships between facial features) described by the textual identifiers 240A-240N and/or taking into account the user preferences 222. Information indicative of and/or identifying the identified false eyelash configuration information 270 may be generated by the generative machine learning model 250. The identified false eyelash configuration information 270 may be associated with information related to the textual identifiers 240A-240N and/or the relevant information 260 from the database 125. In an illustrative example, upon receiving a prompt 164 that includes information 260 from the false eyelash database 125 associated with configuration information 270A and configuration information 270B, the generative machine learning model 250 provides an output that identifies configuration information 270A and configuration information 270B as being related to one or more facial features described by textual identifiers 240A-240N and/or taking into account with the user preferences 222.

In some embodiments, data identifying the identified false eyelash configuration information 270 is provided to a filter 280 that is capable of filtering the identified false eyelash configuration information 270. The filter 280 may filter the data associated with the identified false eyelash configuration information 270 based on a variety of criteria, such as style, color, purpose, relevance, cost, etc. In some embodiments, the filter 280 filters the data associated with the identified false eyelash configuration information 270. Filtering of the data by the filter 280 may provide an additional layer of filtering after identification of identified artificial lash extension configuration information 270 by generative machine learning model 250. In some embodiments, the query tool 163 does not consider the user preferences 222. Instead, the filter 280 may filter the data associated with the identified false eyelash configuration information 270 based on the user preferences 222. In some embodiments, the filter 280 provides an output identifying false eyelash configuration information that meets the filter criteria. For example, filter 280 may filter data indicative of a set of artificial lash extensions associated with configuration information 270A and configuration information 270B based on the user preferences 222. Upon determining that data associated with configuration information 270A meets the filter criteria, the filter 280 provides an output identifying configuration information 270A to the client device 110. In some embodiments, an indication of the filtered identified false eyelash configuration information is provided for display at a GUI of the client device 110. For example, a GUI on the client device 110 may display an image and/or information related to identified false eyelash configuration information (e.g., configuration information 270A) output from the filter 280. The user may then be able to select one or more false eyelashes (e.g., a set of artificial lash extensions, etc.) associated with the identified false eyelash configuration information using one or more inputs via the GUI.

In some embodiments, the generative machine learning model 250 can generate full sentence(s) of information that include the identified artificial lash extension configuration information 270. In some embodiments, the sentence(s) are filtered by filter 280 (e.g., based on the user preferences 222 as described above). The textual information can be provided to a text-to-voice module 290 that converts the textual information to audio data the can be provided for presentation via a GUI of the client device 110.

Figure 2B:
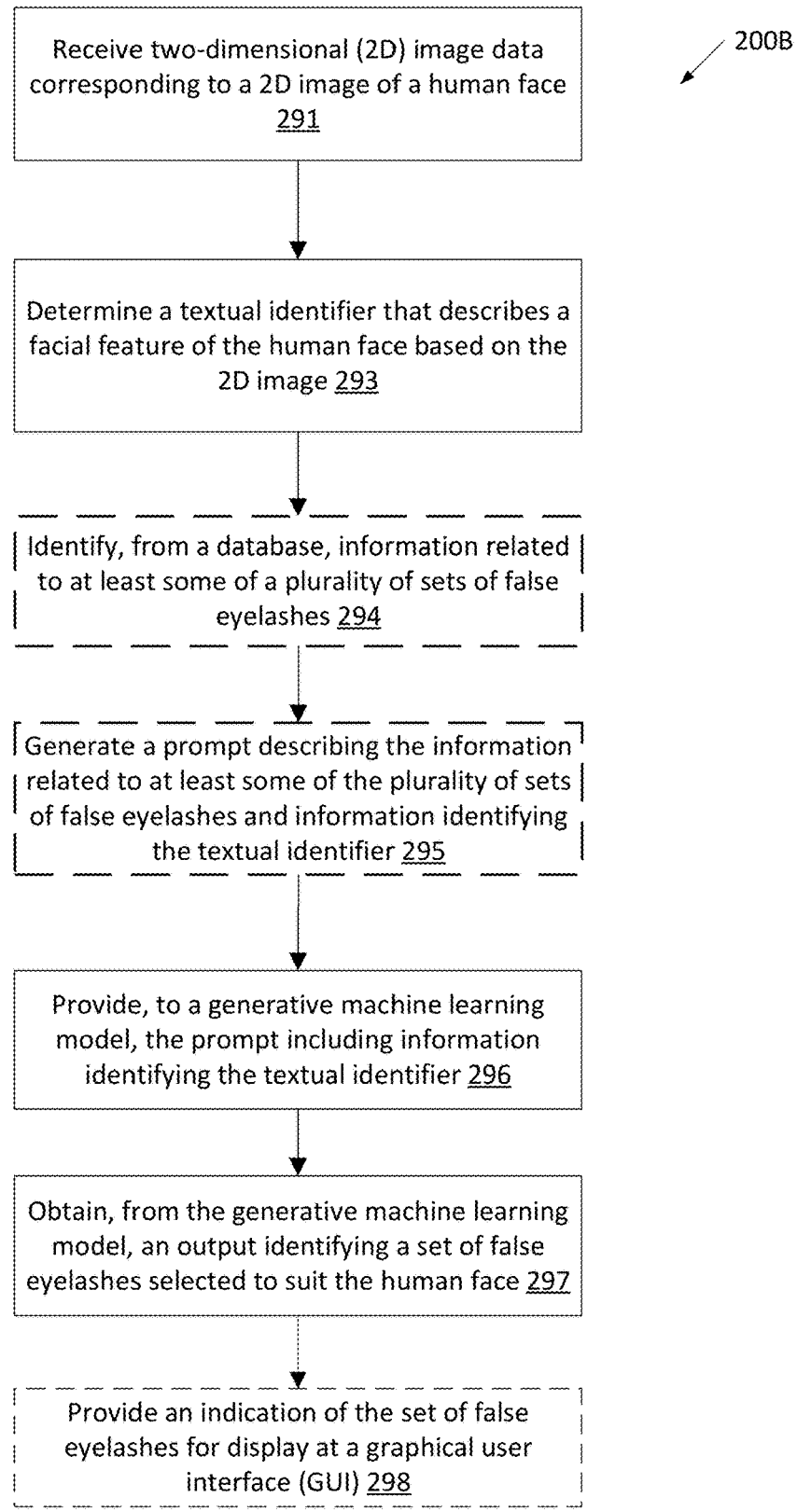
FIG. 2B is a flow diagram of an example method for identifying false eyelash configuration information based on 2D image data using a generative machine learning model, in accordance with some embodiments of the present disclosure.

FIG. 2B is a flow diagram of an example method 200B for identifying false eyelash configuration information based on 2D image data using a generative machine learning model, in accordance with some embodiments of the present disclosure. Method 200B can be performed by processing logic that can include hardware (circuitry, dedicated logic, etc.), software (e.g., instructions run on a processing device, etc.), or a combination thereof. In some embodiments, some or all of the operations of method 200B can be performed by one or more components of system 100A of FIG. 1A and/or system 100B of FIG. 1B. In some embodiments, some or all of the operations of method 200B can be performed by false eyelash platform 120 (e.g., false eyelash module 151) of FIG. 1A and/or FIG. 1B. In some embodiments, some, all, or different operations can be performed in the same or different order.

At block 291, processing logic receives 2D image data corresponding to a 2D image of a human face. In some embodiments, the 2D image is a frontal image of a human face (e.g., the subject's face). The 2D image may be selected (e.g., by a user) from multiple images (e.g., stored on a client device such as a mobile phone, etc.) or may be captured using a camera.

In some embodiments, processing logic determines a 3D model of the human face using the 2D image data. In some embodiments, processing logic assembles a 3D model 232 using identified points on the 2D image. The 3D model may be a mathematical model, such as a geometric model or can be a 3D morphological model.

At block 293, processing logic determines (e.g., generates, etc.), based on the 2D image, a textual identifier that describes a facial feature of the human face. In some embodiments, the textual identifier is determined using the 2D image date of the 2D image representing the subject's face. In some embodiments, the textual identifier is determined based on the 3D model. The textual identifier may include textual information such as information described herein above with respect to FIG. 2A. For example, the textual identifier that describes a facial feature of the human face can describe one or more relationships between two or more facial features of the human face. In some embodiments, processing logic can determine one or more textual identifiers. In some embodiments, processing logic determines a textual identifier by using a generative machine learning model (e.g., generative machine learning model 234 of FIG. 2A) that generates an output identifying the textual identifier based on the 2D image data. In some embodiments, processing logic determines a textual identifier by using a discriminative machine learning model (e.g., discriminative machine learning model 236 of FIG. 2A).

At block 294, processing logic identifies, from a database, information related to at least some of a plurality of sets of false eyelashes (e.g., false eyelash configuration information). In some embodiments, the processing logic searches the database for information related to the textual identifier (e.g., related to the facial feature described and/or identified by the textual identifier, etc.). The processing logic may identify the information based on relevance of the information in relation to the textual identifier.

At block 295, processing logic generates a prompt that describes one or more of the information related to at least some of the plurality of sets of false eyelashes and information identifying the textual identifier. In some embodiments, the prompt includes one or more of textual information corresponding to or describing the textual identifier and the information relevant to the textual identifier identified in the database (e.g., at block 294).

At block 296, processing logic provides, to a generative machine learning model, the prompt including information identifying one or more of the textual identifier and contextual information such as relevant information identified from the database. In some embodiments, information associated with the textual identifier is provided to a generative machine learning model (e.g., generative machine learning model 250 of FIG. 2A). The generative machine learning model may be trained to generate output identifying one or more sets of false eyelashes related to the facial feature described by the textual identifier. In some embodiments, the generative machine learning model may generate output identifying false eyelash configuration information for the one or more sets of false eyelashes. In some embodiments, the generative machine learning model may output an identification of a set of false eyelashes related to the facial feature described by the textual identifier based on the prompt.

At block 297, processing logic obtains, from the generative machine learning model, an output identifying a plurality of sets of false eyelashes selected to suit the human face. In some embodiments, the output identifies a subset of the plurality of sets of false eyelashes. In some embodiments, the plurality of sets of false eyelashes are related to the facial feature identified by the textual identifier. In some embodiments, the sets of false eyelashes includes one or more sets of false eyelashes identified by the generative machine learning model in the false eyelash database. The one or more sets of false eyelashes may be related to the facial feature described by the textual identifier.

At block 298, processing logic provides an indication of at least one set of false eyelashes of the plurality of sets of false eyelashes for display at a GUI. In some embodiments, an indication of a subset of the plurality of sets of false eyelashes is provided for display at a GUI. In some embodiments, the plurality of false eyelashes is filtered, based on one or more criteria, to obtain a subset of false eyelashes. In some embodiments, an indication of the subset of false eyelashes is provided for display at the GUI.

Figure 3A:
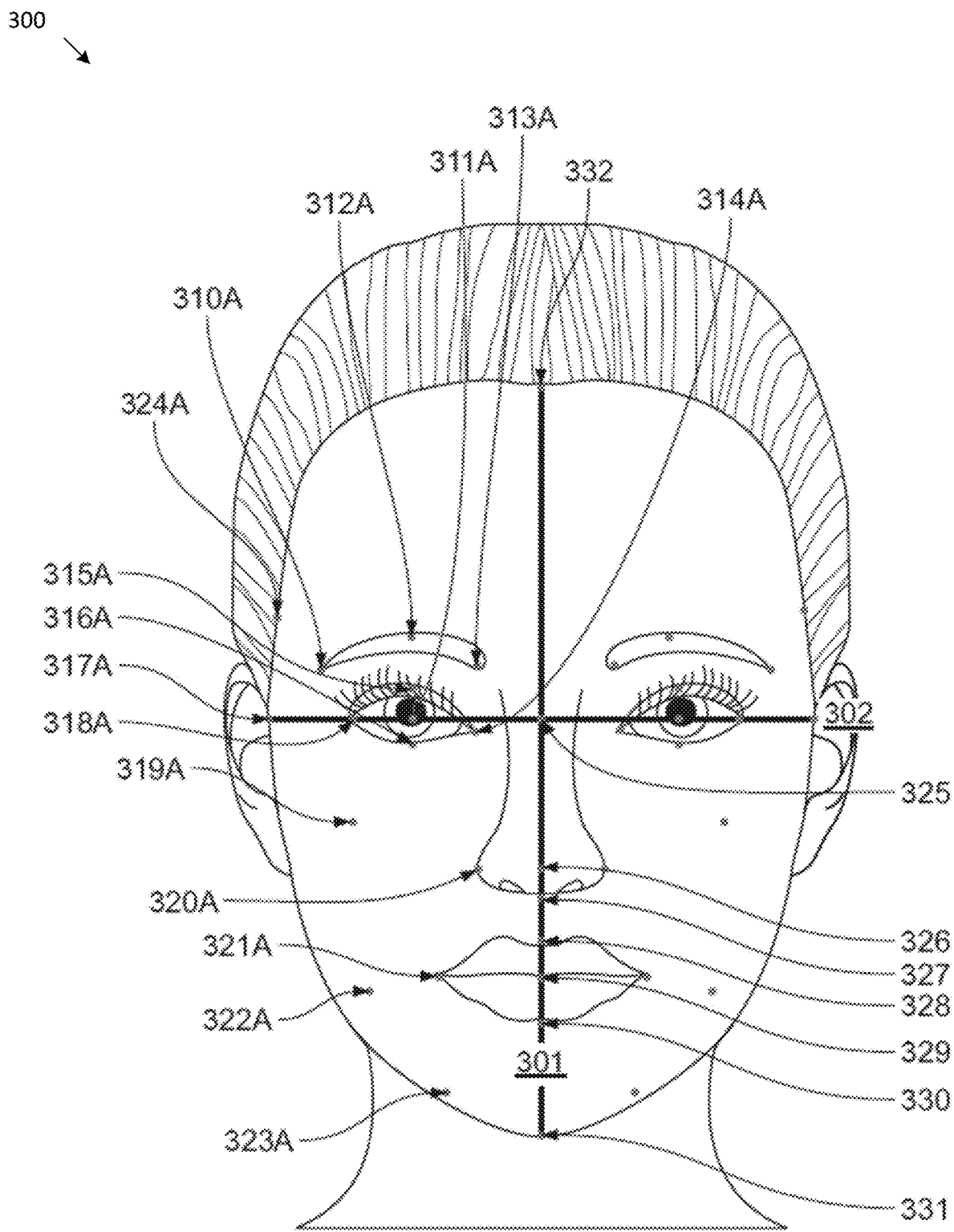
FIG. 3A illustrates an example human face that can be represented by image data, in accordance with aspects of the disclosure.

FIG. 3A illustrates a depiction of a human face 300, in accordance with aspects of the disclosure. Human face 300 is illustrated as a 2D representation of a 3D model for purposes of illustration, rather than limitation. Points on the human face 300 are described here as 3D points of a 3D model, for purposes of illustration rather than limitation. It should be noted that the description of FIG. 3A can apply equally to a 2D image and/or 2D points, unless otherwise described.

In some embodiments, multiple reference points (e.g., 3D points 310-332) can correspond to or represent facial features of the human face 300. In some embodiments, a number of 3D points 310-332 that correspond to each 3D landmark can be the same. For example, the number of 3D points corresponding to the nose can be the same as the number of 3D points corresponding to the mouth. In some embodiments, the number of 3D points 310-332 that correspond to each 3D landmark can be different. In some embodiments, the number of 3D points 310-332 that correspond to each 3D landmark can be based on an importance of the 3D landmark. For example, a machine learning model can determine that the nose has a higher importance than the mouth, and more 3D points can be generated and/or used to correspond to the nose than to the mouth. In some embodiments, the number of 3D points that correspond to each 3D landmark can be determined by the training set generator 131, model 160, generative machine learning model 170 of FIG. 1B, and/or received as input to the model 160 or training set generator 131.

As illustrated in FIG. 3A, 3D points 310A-324A correspond to one half of the face. 3D points 310B-324B (not illustrated) correspond to the other half of the face, but for clarity, are not labeled in FIG. 3A. It can be appreciated that each of the illustrated 3D points 310A-324A corresponds to a respective 3D point 310B-324B opposite the centerline (e.g., symmetric about the centerline). 3D points 325-331 line on, or near the centerline 301. As used herein, 3D points 310-332 can collectively refer to 3D points 310A-324A, 3D points 310B-324B (also, referred to herein as 3D points 310A/B-324A/B), and 3D points 325-331. As used herein, 3D points 310-332 can be referred to individually such as "3D point 310A," or "3D point 310B," or "3D point 310A/B," or "3D point 310," or "3D point 325" respectively as applicable.

It can be appreciated that the 3D points 310-332 do not represent an exhaustive list of 3D reference points for a human face, but are merely illustrative of the types of 3D reference points that can be used by a machine learning model in the process of identifying 3D landmarks that correspond to facial features based on human face data (e.g., 2D image data). In some embodiments, one or more 3D points 310-332 can correspond to one or more 3D landmarks of 3D landmark data. In some embodiments, corresponding 2D points (which may be located at similar x-, y-coordinate positions as respective 3D points 310-332 can correspond to one or more facial features of 2D facial feature data.

3D Landmark Data

In some embodiments, the following illustratively named 3D points and groups of 3D points 310-332 (as described herein below) can represent 3D landmark data of the human face 300. In some embodiments, corresponding 2D points (which may be located at similar x-, y-coordinate positions as respective 3D points 310-332) can represent 2D facial feature data of the human face 300. For example, 3D point 325 can be representative of a "center point of the face," and can correspond to a 3D landmark. In another example, centerline 301 approximately intersects a majority of the 3D points 325-332 and can represent the "centerline of the face," and can represent a 3D landmark of 3D landmark data. In another example, the horizontal line 302 approximately intersects a majority of 3D points 311A/B, 318A/B, 317A/B, and 325, and can be a 3D landmark of 3D landmark data.

In some embodiments, 3D point 310 can be representative of an "outer brow corner."

In some embodiments, 3D point 311 can be representative of a "center of the pupil" or "eye center." As used herein, "pupil" can refer to the adjustable opening in the center of the eye that regulates the amount of light entering the eye. Generally, the pupil can be dark in color (e.g., black), and is surrounded by the iris. As used herein, "iris" can refer to a colored muscular structure that can contract or dilate to control the size of the pupil (e.g., to control the amount of light entering the eye). The iris is surrounded by the sclera. As used herein, "sclera" can refer to a light-colored (e.g., white, or nearly white) outer layer that protects maintains the structural integrity of the eyeball.

In some embodiments, 3D point 312 can be representative of a "brow apex."

In some embodiments, 3D point 313 can be representative of an "inner brow corner."

In some embodiments, 3D point 314 can be representative of an "inner eye corner."

In some embodiments, 3D point 315 can be representative of an "eye apex."

In some embodiments, 3D point 316 can be representative of an "eye bottom (nadir)."

In some embodiments, 3D point 317 can be representative of a "temporomandibular joint (TMJ)."

In some embodiments, 3D point 318 can be representative of an "outer eye corner."

In some embodiments, 3D point 319 can be representative of a "cheekbone," or "upper cheek."

In some embodiments, 3D point 320 can be representative of an "alar wing."

In some embodiments, 3D point 321 can be representative of a "mouth corner."

In some embodiments, 3D point 322 can be representative of a "lower cheek."

In some embodiments, 3D point 323 can be representative of a "chin." As illustrated, in some embodiment, 3D point 323 is located based on the position of 3D point 321 (e.g., the mouth corner) outline of the shape of the human face (e.g., a lower jawline).

In some embodiments, 3D point 324 can be representative of a "temple."

In some embodiments, 3D point 325 can be representative of a "center point," and/or the "center of the bridge of the nose."

In some embodiments, 3D point 326 can be representative of a "nose tip."

In some embodiments, 3D point 327 can be representative of a "nose bottom (nadir)."

In some embodiments, 3D point 328 can be representative of a "lips apex."

In some embodiments, 3D point 329 can be representative of a "lips center."

In some embodiments, 3D point 330 can be representative of a "lips bottom (nadir)."

In some embodiments, 3D point 331 can be representative of a "chin bottom (nadir)."

In some embodiments, 3D point 332 can be representative of a "forehead apex."

In some embodiments, 3D points 310, 312, and 313 can be representative of the "brow" or "eyebrow" facial feature.

In some embodiments, 3D points 311, 314, 315, 316, and 318 can be representative of the "eye" facial feature.

In some embodiments, 3D points 310-313 can be representative of an "eyelid area" facial feature.

In some embodiments, 3D points 310-318 can be representative of the "eye area" facial feature.

In some embodiments, 3D points 320A/B, and 325-327 can be representative of the "nose" facial feature.

In some embodiments, 3D points 321A/B and 328-330 can be representative of the "mouth" facial feature.

In some embodiments, 3D points 319 and 322 can be representative of the "cheek" facial feature.

In some embodiments, 3D points 317A/B, 323A/B and 331 can be representative of the "jawline," or "lower face shape" facial feature.

In some embodiments, 3D points 323A/B and 330-331 can be representative of the "chin" facial feature.

3D Geometric Data

In some embodiments, 3D geometric data can describe a scene or object, and can include one or more vertices (e.g., points), edges, and/or faces of a 3D model represented by 3D model data. In some embodiments, 3D geometric data can be represented by x-, y-, z-coordinate positions of one or more 3D points. For example, an x-, y-, z-coordinate position of the nose tip (e.g., 3D point 326) can represent a portion of 3D geometric data.

In some embodiments, 3D geometric data can be represented as a relationship between two or more 3D points of a particular facial feature. For example, a distance between the 3D point 320A and the 3D point 320B can represent a portion of 3D geometric data. In another example, centerline 301 can represent a relationship (e.g., a distance) between 3D point 331 and 3D point 332 as a "face height." In another instance, horizontal line 302 can represent a relationship (e.g., a distance) between 3D points 317A/B as a "face width." In some embodiments, 2D geometric data can similarly be represented by x-, y-coordinate positions of a 2D point, or a relationship between two or more 2D points.

In some embodiments, a relationship between two or more points (e.g., two or more 2D points or two or more 3D points) can correspond to a facial feature.

In some embodiments, a relationship between 3D point 310A and 3D point 310B can represent an "outer brow width."

In some embodiments, a relationship between 3D point 311A and 3D point 311B can represent an "inner pupillary distance (IPD)."

In some embodiments a relationship between 3D point 313A and 3D point 313B can represent an "inner brow distance."

In some embodiments, a relationship between 3D point 318A and 3D point 314A can represent an "eye width."

In some embodiments, a relationship between 3D point 314A and 3D point 314B can represent an "inner eye corner distance."

In some embodiments, a relationship between 3D point 320A and 3D point 320B can represent a "nose width."

In some embodiments, a relationship between 3D point 325 and 3D point 327 can represent a "nose height."

In some embodiments, a relationship between 3D point 321A and 3D point 321B can represent a "mouth width."

In some embodiments, a relationship between 3D point 328 and 3D point 330 can represent a "mouth height."

3D Landmark Relationship Data

In some embodiments, 3D landmark relationship data (e.g., 3D landmark relationship data 247A) can describe a relationship between first information corresponding to a first facial feature (e.g., 3D landmark data 245A or 3D geometric data 246A) and second information of a second facial feature (e.g., a relationship between two or more facial features). In some embodiments, 3D geometric data can describe relationships between 3D points corresponding to the same facial feature (e.g., lengths, distances, ratios, etc. derived between 3D landmark data and 3D geometric data), 3D landmark relationship data can describe relationships between 3D points corresponding to different facial features. For example, a ratio of the length of the centerline 301 to the length of the horizontal line 302 can represent 3D landmark relationship data. In another example, a difference between a first slope of the horizontal line 302 and a second slope of a line between the inner and outer eye corners (e.g., 3D points 314 and 318 respectively) can be expressed as an angle, and represent 3D landmark relationship data. In another example, a difference in the x-, y-, z-coordinate position of the 3D points representing the nose and 3D points representing an eye can be expressed as a ratio or distance, and represent 3D landmark relationship data. In another example, a relationship between a width of the nose (e.g., first facial feature), and a width of an eye (e.g., second facial feature) can be a portion of 3D landmark relationship data. A specific illustrative example of 3D landmark relationship data is described below with reference to FIG. 3B. In some embodiments, 2D facial feature relationship data can similarly describe relationships between 2D points of two or more (different) facial features.

Figure 3B:
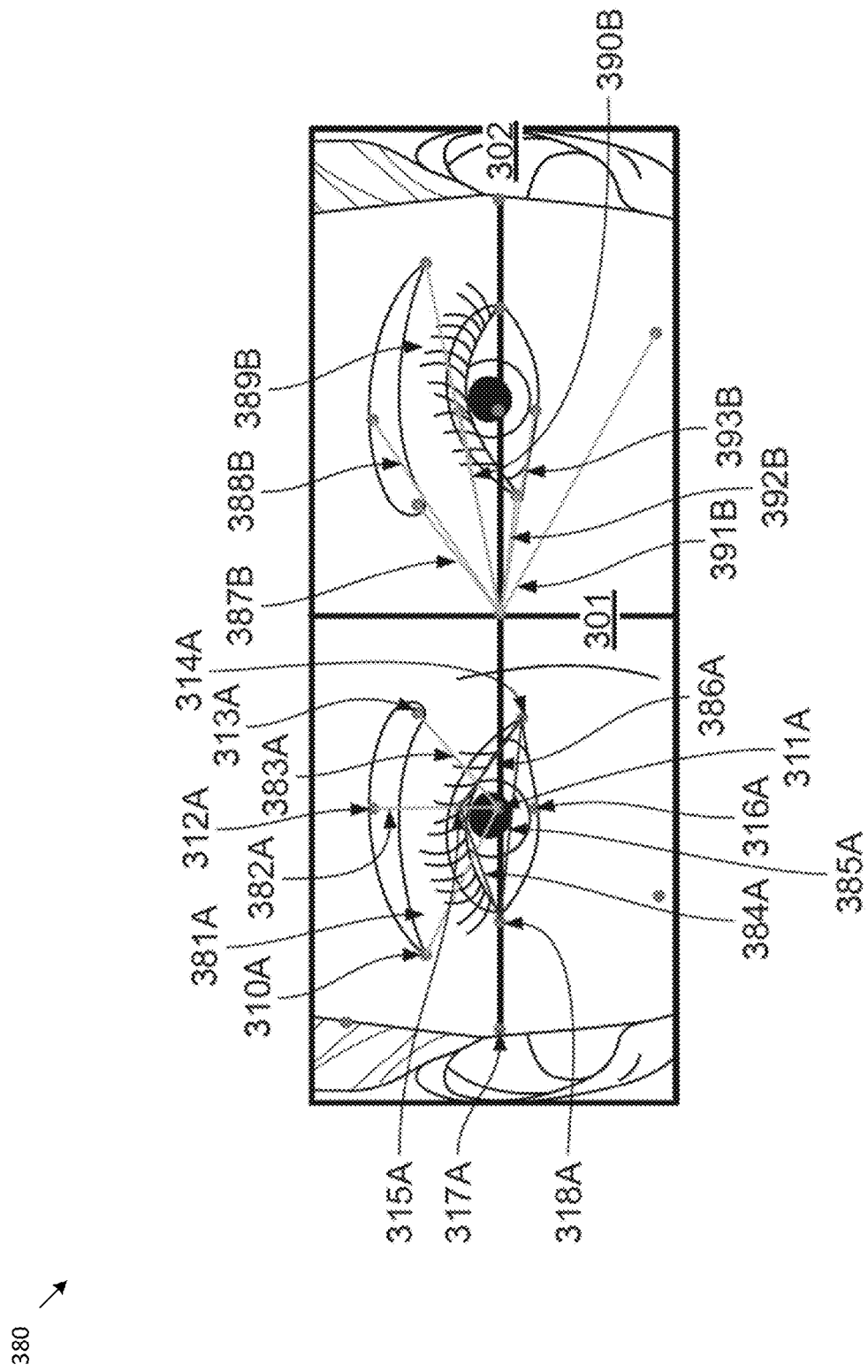
FIG. 3B represents an example eye area of an example human face that can be represented by image data, in accordance with aspects of the disclosure.

FIG. 3B illustrates a depiction of an eye area 380 of a human face, in accordance with aspects of the disclosure. In some embodiments, the human face can be a human face 300 as described with reference to FIG. 3A. Eye area 380 includes 3D relationships 381-386 and 3D relationships 387-393 (also referred to collectively as "3D relationships 381-393") between 3D points 310-319 as illustrated above in FIG. 3A. In some embodiments, the illustrative depictions of 3D relationships 381-393 can represent relationships between 3D points (e.g., 3D geometric data 246A). In some embodiments, the illustrative depictions of 3D relationships 381-393 can represent relationships between 3D landmarks (e.g., 3D landmark relationship data). In some embodiments, 3D relationships, such as 3D relationships 381-393, can represent 3D landmark relationship data.

Eye area 380 is illustrated as a 2D representation of a 3D model for purposes of illustration, rather than limitation. Points on eye area 380 are described here as 3D points of a 3D model, for purposes of illustration rather than limitation. It should be noted that the description of FIG. 3B can apply equally to a 2D image and/or 2D points unless otherwise described.

As illustrated in FIG. 3B, 3D relationships 381-393 correspond to one half of the face. It can be appreciated that for clarity, each of the 3D relationships 381-393 have been illustrated only on one half of the face, but that each of the 3D relationships 381-393 can correspond to either side of the face (not illustrated). It can be appreciated that the 3D relationships 381-393 do not represent an exhaustive list of relationships between reference points for the eye area 380 a human face, but are merely illustrative of the types of relationships that can be used by a machine learning model in the process of identifying 3D landmark relationship data based on image input data. In some embodiments, relationships represented in 2D facial feature relationship data can similarly be identified by a machine learning model based on image input data.

In some embodiments, multiple relationships (e.g., represented by 3D geometric data) between reference points (e.g., 3D points 310-332) can correspond to or represent facial features of the eye area 380. In some embodiments, a number of relationships (e.g., represented by 3D geometric data) that correspond to each facial feature can be the same (e.g., each facial feature has an equal number of relationships), or can be based on an importance of the facial feature (e.g., more important facial features (for example, as determined by an algorithm or machine learning model) have a higher number of relationships than less important facial features). In some embodiments, multiple relationships represented by 2D geometric data can similarly correspond to or represent facial features of the eye area 380.

In some embodiments, multiple relationships (e.g., represented by 3D landmark relationship data) between 3D landmarks represented in the eye area 380 can correspond to facial features of the eye area 380. In some embodiments, a number of relationships can be based on an importance of the facial feature, such as an importance determined by an algorithm or machine learning model (e.g., more important 3D landmarks can have a higher number of relationships to other 3D landmarks than less important 3D landmarks).

In some embodiments, 3D relationship 381A can span between 3D point 310A and 3D point 311A (e.g., between the outer brow corner and the eye, such as the pupil or center of the pupil).

In some embodiments, 3D relationship 382A can span between 3D point 312A and 3D point 311A (e.g., between the brow apex and the eye, such as the pupil or center of the pupil).

In some embodiments, 3D relationship 383A can span between 3D point 313A and 3D point 311A (e.g., between the inner brow corner and the eye, such as the pupil or center of the pupil).

In some embodiments, 3D relationship 384A can span between 3D point 315A and 3D point 318A (e.g., between the eye apex and the outer eye corner).

In some embodiments, 3D relationship 385A can span between 3D point 314A and 3D point 318A (e.g., between the inner eye corner and the outer eye corner).

In some embodiments, 3D relationship 386A can span between 3D point 314A and 3D point 315A (e.g., between the eye apex and the inner eye corner).

In some embodiments, 3D relationships 387-393 can span between 3D point 325 (e.g., the center point) and respective 3D points of the eye area 380.

For example, 3D relationship 387B can span between 3D point 325 and 3D point 313A (e.g., the inner brow corner).

For example, 3D relationship 388B can span between 3D point 325 and 3D point 312A (e.g., brow apex).

For example, 3D relationship 389B can span between 3D point 325 and 3D point 310A (e.g., outer brow corner).

For example, 3D relationship 390B can span between 3D point 325 and 3D point 315A (e.g., eye apex).

For example, 3D relationship 391B can span between 3D point 325 and 3D point 319A (e.g., cheekbone).

For example, 3D relationship 392B can span between 3D point 325 and 3D point 314A (e.g., inner eye corner).

For example, 3D relationship 393B can span between 3D point 325 and 3D point 316A (e.g., eye bottom (nadir)).

In some embodiments, a ratio between two or more 3D relationships 381-393 corresponding to different facial features can represent a relationship between two or more 3D landmarks. Similarly, in some embodiments, a ratio between two or more 2D relationships corresponding to different facial features can represent a relationship between two or more 2D facial features.

For example, for the facial features of the brow (e.g., represented by 3D points 310, 312, and 313) and the eye (represented by 3D points 311, 314, 315, 316, and 318), a ratio between the eye width (e.g., 3D relationship 385A) and the brow height (e.g., 3D relationship 382A) can be 3D landmark relationship data expressed as a ratio of eye-width to brow-height.

In some embodiments, an angle between two or more 3D relationships 381-393 corresponding to different facial features can represent a relationship between two or more 3D landmarks (e.g., 3D landmark relationship data 247A). Similarly, in some embodiments, an angle between two or more 2D relationships corresponding to different facial features can represent a relationship between two or more 2D facial features.

For example, the facial feature of the horizontal line 302 and the eye (represented by 3D points 311, 314, 315, 316, and 318), an angle between the 3D relationship 385A (e.g., the relationship corresponding to the eye width) and the horizontal line 302 can be 3D landmark relationship data expressed as an angle representing "eye slant."

Figure 4:
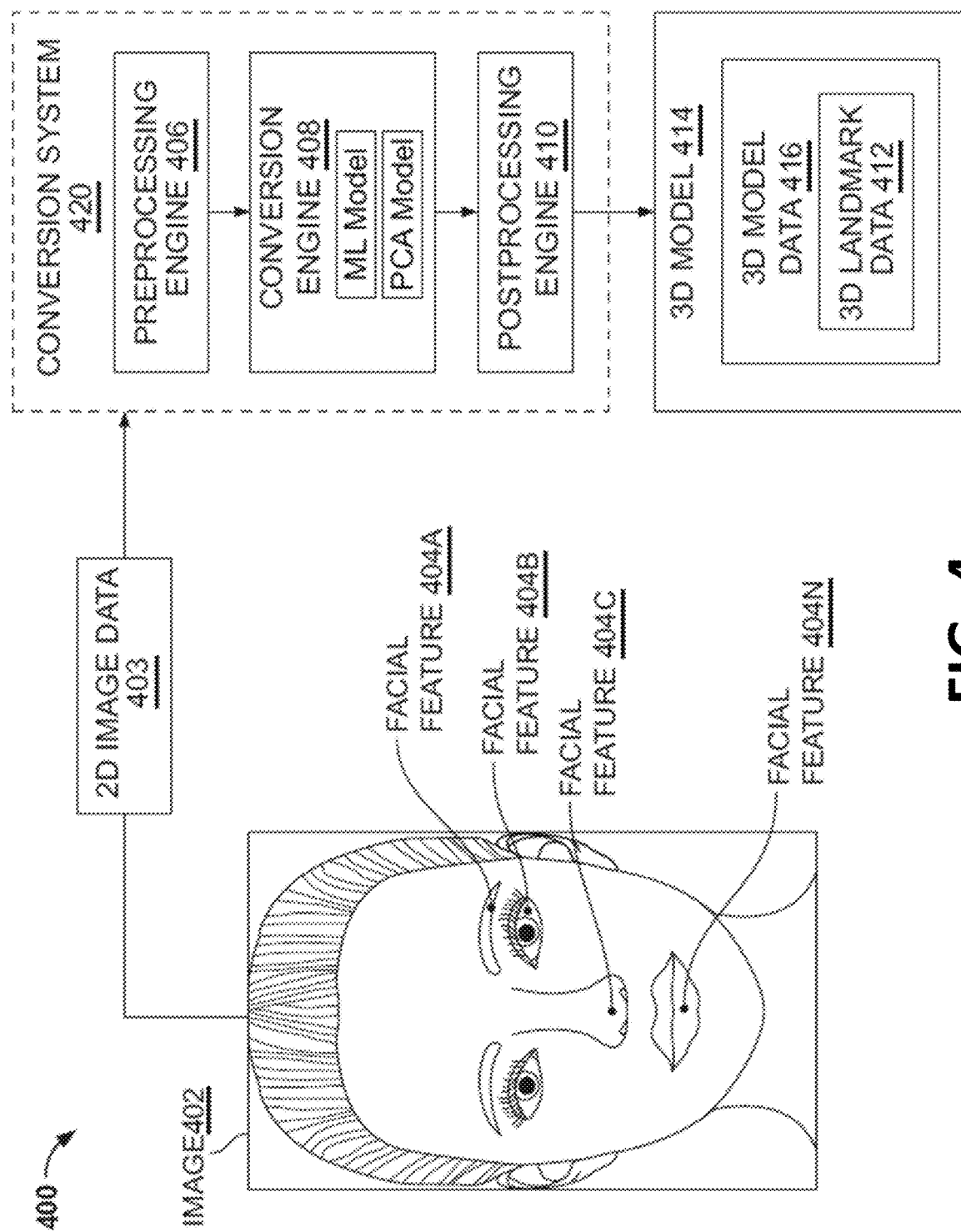
FIG. 4 is a block diagram of an example conversion system architecture for providing conversion of 2D image data corresponding to a 2D image to a corresponding 3D model, in accordance with some embodiments of the present disclosure.

FIG. 4 is a block diagram of an example conversion system architecture 400 for providing conversion of 2D image data corresponding to a 2D image to a corresponding 3D model, in accordance with some embodiments. In some embodiments, conversion system 420 can include one or more of preprocessing engine 406, conversion engine 408, and/or postprocessing engine 410. In some embodiments, conversion system 420 can use 2D image data 403 corresponding to image 402 to generate 3D model data 416 of a 3D model 414.

In some embodiments, image 402 is a 2D image that is represented by 2D image data 403. In some embodiments, a 2D image can include a visual representation that exists in two dimensions, such as width and height. In some embodiments, a 2D image can lack depth information (e.g., depth information measured by a depth camera). In some embodiments, image 402 can be a digital image represented by digital data. Image 402 may be represented in various formats such as joint photographic experts group (JPEG), portable network graphics (PNG), tag image file format (TIFF), etc. Image 402 may include color information by for example, using a color model such as a red, green, blue (RGB) color model or other color model.

In some embodiments, image 402 may be an image of a scene. In some embodiments, the scene can include one or more objects, such as an image of a person. In some embodiments, image 402 can include an image of a user's face or a part of the user's face (e.g., an image of a user's eye area). In some embodiments, image 402 can include a frontal face image. A frontal face image can refer to an image taken from a front-facing perspective. For instance, in a frontal face image the user can look directly at the camera. In some embodiments, image 402 can include a still image. In some embodiments, image 402 can include one or more video images of a video, such as video images of a video stream.

Image 402 may depict one or more facial features, such as facial features 404A-N of the user's face. A facial feature can refer to a physical characteristic or element that is part of a human face. Facial features can include, but are not limited to the lips, nose, tip of the noise, bridge of the nose, eyes, inner eye, pupil, eyelids, eyebrows, inner eyebrow, outer eyebrow, center eyebrow, checks (e.g., check bones, etc.), jaw (e.g., jawline, etc.), and/or other facial features. Examples of facial features that may be depicted in image 402 include eyebrow features (e.g., inner eyebrow, eyebrow apex, center eyebrow, outer eyebrow) represented by facial feature 404A, eye features (e.g., pupil, inner eye, outer eye, upper lid, tightline) represented by facial feature 404B, nose features (e.g., bridge, nostrils) represented by facial feature 404C, lip features (e.g., upper lip, lower lip) represented by facial feature 404N, mouth features (e.g., corner of the mouth), and so forth.

In some embodiments and as noted above, conversion system 420 can use 2D image data 403 corresponding to the image 402 as input to the conversion system 420. In some embodiments, conversion system 420 may use 2D image data 403 having fixed dimensional values (e.g., fixed width, height, and color depth, such as 24-bit). In some embodiments, conversion system 420 may use 2D image data 403 having variable dimensional values. In some embodiments, 2D image data 403 can include depth information. In some embodiments, 2D image data 403 can include metadata such as a timestamp, location information indicating where an image was taken, image sensor specifications, facial feature coordinates and identifiers, etc.

In some embodiments and as noted above, conversion system 420 can use 2D image data 403 of image 402 to generate information corresponding to 3D model 414 (e.g., 3D model data 416). A 3D model 414 can refer to a three-dimensional digital representation of a scene or object. The 4D model can be represented by 3D model data 416. The 3D model data 416 of the 3D model 414 can include width information, height information, and depth information of the scene and/or object(s). The 3D model data 416 can include geometric data that describes the corresponding scene or object(s). The geometric data can include one or more of vertices (e.g., points), edges, and or faces. In some embodiments, vertices (e.g., nodes or points) can include points of a 3D model 414. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges). In some embodiments, one or more of vertices, edges and faces can define the geometry of a 3D model 414.

In some embodiments, the 3D model data 416 of the 3D model 414 can include texture information that describes an object's surface texture. In some embodiments, 3D model data 416 does not include texture information. In some embodiments, 3D model data 416 of the 3D model 414 includes material information that can influence the appearance of the 3D model 414 at rendering (e.g., how light reflects from the material). In some embodiments, 3D model data 416 does not include material information. In some embodiments, the 3D model data 416 of the 3D model 414 includes lighting information that describes the interaction of light (and absence of light) with the scene or object(s). In some embodiments, 3D model data 416 does not include lighting information. In some embodiments, 3D model 414 includes color information that indicates the colors of surface (e.g., faces) of the 3D model 414.

In some embodiments, the 3D model data 416 of the 3D model 414 can include landmark data, such as 3D landmark data 412 (also referred to as "landmark data" herein). In some embodiments, one or more landmarks can be represented by 3D landmark data 412. A landmark can refer to a specific point or a specific grouping of points of a 3D model 414. A landmark can represent or correspond to one or more features, such as one or more facial features of a user's face. The one or more features, such as facial features can be represented in a 3D model 414 by the specific point or specific grouping of points. For example, a landmark can correspond to or represent the right eye, the inner corner of the eyes, the bridge of the nose, a center line of a face, and so forth. The landmark can be represented by the grouping of points of the 3D model 414 that represent the right eye, the inner corner of the eyes, the bridge of the nose, a center line of a face, or some other facial feature. In some embodiments, a landmark can include relationships between one or more points. (e.g., edges, faces, geometric data, such as length, height, and depth, and/or ratios of geometric data). For instance, the landmark can include a distance between the inner corner of the right eye and the outer corner of the right eye. In some embodiments, a landmark can include a combination of facial features and/or relationships between multiple facial features.

In some embodiments, 3D landmark data 412 can include information identifying one or more points of the 3D model 414 (e.g., specific grouping of points and/or 3D coordinate data of the points) that correspond to a feature, such as a facial feature. In some embodiments, 3D landmark data 412 can include information identifying the relationship between one or more points of a landmark. To identify the relationship between the one or more points of a landmark, the 3D landmark data 412 can include information identifying one or more of edges, faces, geometric data, such as length, height, and depth, and/or ratios of geometric data. To identify the relationship between the one or more points of a landmark, the 3D landmark data 412 can include one or more of absolute or relative values (e.g., deviations from average or template values). In some embodiments, 3D landmark data 412 can include information identifying relationships between multiple landmarks. 3D landmark data 412 that identifies relationships between multiple landmarks can identify one or more of edges, faces, geometric data, such as length, height, and depth, ratios of geometric data, and/or absolute or relative values (e.g., deviations from average or template values). For instance, a ratio between the length of the eyebrow and the distance between the eyebrow and a point on the eye can be included on 3D landmark data 412.

In some embodiments, preprocessing engine 406 of conversion system 420 can perform one or more preprocessing operations on 2D image data 403. In some embodiments preprocessing engine can clean, transform, and/or organize 2D image data 403 of image 402 in a manner suitable to be received by conversion engine 408 (also referred to as "preprocessed 2D image data" herein). For example, preprocessing engine 406 may scale or crop image 402 and generate corresponding 2D image data 403 (e.g., preprocessed 2D image data 403). In some embodiments, preprocessing engine 406 can convert image 402 from an RGB color space to a grayscale color space, or vice versa. In some embodiments preprocessing engine 406 can convert image 402 to a common or preferred format (e.g., JPEG).

In some embodiments, preprocessing engine 406 may perform preprocessing with one or more machine learning (ML) models. For example, a machine learning (ML) model may be implemented to identify one or more facial features, such as facial features 404A-N (which may be added to 2D image data 403 (e.g., metadata) of image 402). In another example, an ML model can be used to enhance contrast or resolution of image 402. In some embodiments, an ML model can be used to remove objects or a background element(s) from image 402. For instance, an ML model can be used to remove glasses from a user's face and fill the area where the glasses were removed with color and/or texture that is similar or that appears seamless with the surrounding area.

In an embodiment where conversion engine 408 includes an ML model as described below, preprocessing engine 406 may select or exclude various input images 402 as part of a training procedure to achieve a desired effect in training the ML model of conversion engine 408. In an embodiment, preprocessing engine 406 may not be implemented, and 2D image data 403 (e.g., raw 2D image data) of image 402 may be provided as input to conversion engine 408.

In some embodiments, conversion engine 408 uses 2D image data 403 (e.g., raw or preprocessed) to generate a 3D model 414 (e.g., 3D model data 416 of 3D model 414). In some embodiments, conversion engine 408 can generate 3D model 414 with or without postprocessing engine 410.

In some embodiments, conversion engine 408 can implement one or more techniques to convert 2D image data 403 to a 3D model 414. In some embodiments, conversion engine 408 may include an ML technique (e.g., statistical learning, deep learning, reinforcement learning, etc.) to convert 2D image data 403 into a 3D model 414. For example, conversion engine 408 may include a neural radiance field (NeRF) ML model. In another example, conversion engine 408 may include an ML model based on differential rendering or inverse rendering techniques. ML models of conversion engine 408 may operate in a training mode or an inference mode. In a training mode, 2D and/or 3D training data may be provided as input and/or output of the ML model for supervised or unsupervised training. In an inference mode, 2D image data 403 may be provided as input to the ML model for generation of 3D model data 416 of 3D model 414 in accordance with previous training.

In some embodiments, conversion engine 408 may include a principal component analysis (PCA) model (further described below with reference to FIGS. 6A-6B) to convert 2D image data 403 to a 3D model 414.

In some embodiments, conversion engine 408 may include a non-ML technique for converting 2D image data 403 into 3D model 414. For example, conversion engine 408 may include parametric techniques based on various mathematical or physical principles, heuristics, or similar. In some embodiments, conversion engine 408 may include an ML module and/or a non-ML module for converting 2D image data 403 into 3D model data 416 of 3D model 414.

In some embodiments, postprocessing engine 410 of conversion system 420 can perform one or more postprocessing operations on 3D model data 416 (e.g., also referred to as "postprocessed 3D model data" herein). In some embodiments, postprocessing engine 410 can perform further analysis, refinement, transformations and/or other modifications of 3D model data 416 received from conversion engine 408. For example, postprocessing engine 410 may generate a set of 3D landmark data of one or more landmarks corresponding to facial features by grouping particular vertices of the 3D model 414 that represent respective landmarks. In another example, postprocessing engine 410 can remove or modify 3D model data 416. In some embodiments, postprocessing engine can emphasize particular landmarks (e.g., weighting or PCA techniques) and/or define particular landmarks and/or remove particular landmarks and/or de-emphasize particular landmarks. In some embodiments, postprocessing engine 410 is not implemented, and thus landmark data 412 can be generated by conversion engine 408.

Figure 5:
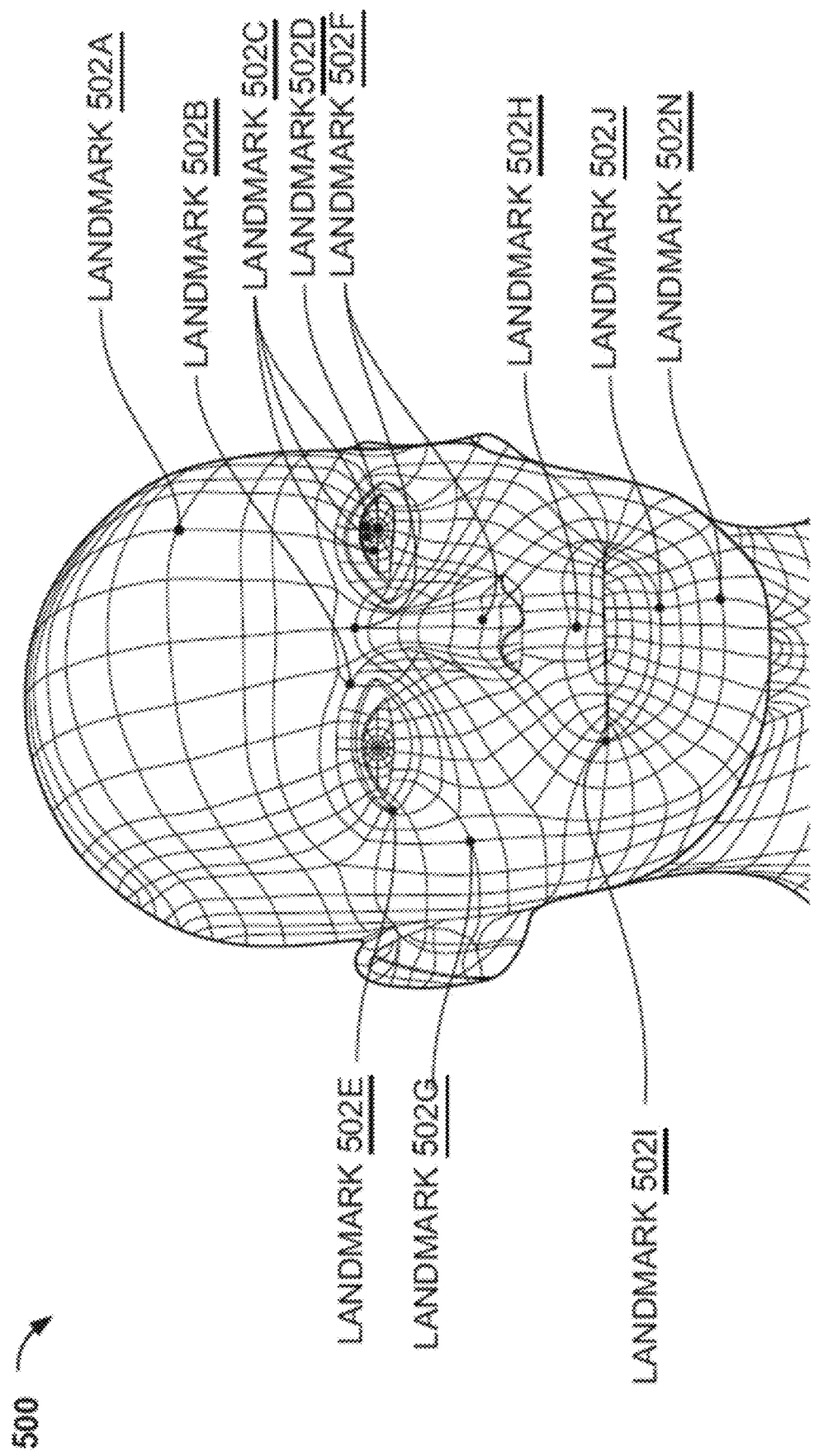
FIG. 5 depicts an example 3D model of a face of a user, in accordance with some embodiments of the present disclosure.

FIG. 5 depicts an example 3D model 500 of a face of a user, in accordance with some embodiments. In some embodiments, 3D model 500 (e.g., rendered 3D model) may, for the sake of illustration and not limitation, correspond to image 402 of FIG. 4.

3D model data 416 may be used to generate, render or modify 3D model 500 to represent the user's face. Landmarks 502A-N of 3D model 500 may correspond to and be represented by 3D landmark data 412 of FIG. 4. As noted herein, landmarks can correspond to features such as facial features. For example, landmark 502F can correspond to the bridge of the nose. Landmark 502C can correspond to the lash line of the left eye. Landmark 502D can correspond to the center point of the pupil of the left eye, and so forth.

In some embodiments, 3D model 500 may correspond to various types of 3D modeling techniques. For example, in an embodiment, 3D model 500 may be a mathematical model. In some embodiments, a mathematical model can include a parametric model where landmarks 502A-N and other 3D features may be represented by mathematical functions such as one or more of points, lines, arcs, Bezier curves, functional manifolds, and so on. In another embodiment, 3D model 500 may be a mesh model, a point cloud model, or similar model comprising multiple objects such as vertices, lines, and faces to represent the user's face. Landmarks 502A-N may correspond to one or more vertices, one or more lines, one or more faces, or sets thereof. In some embodiments, landmarks 502A-N may share or overlap geometry. For example, two overlapping landmarks may share vertices, lines, etc. In another embodiment, 3D model 500 may be an ML model, such as a neural radiance field model trained to produce 2D views of the user's face from multiple positions in 3D space. Landmarks 502A-N may correspond to weights, convolutional filters, or other aspects of the ML model (which can be captured in corresponding 3D model data). In another embodiment, 3D model 500 may comprise multiple model representations, such as a parametric representation combined with a mesh representation or similar.

In an embodiment, 3D model 500 may be a morphological model. A morphological model can represent the shape and structure of objects (e.g., human faces) using morphological data. In some embodiments, morphological data can describe the form and structural relationships between geometry (e.g., vertices, lines, planes and/or landmarks) of the model and enables manipulation of the geometry based on those relationships. In some embodiments, a morphological model may include a template model (e.g., 3D template model) of a human face. The template model may be initialized with template 3D model values (e.g., template landmark data) reflecting average values (e.g., average positions, sizes, colors, etc.) for an object, such as a human face. The template 3D model values may be derived from a representative collection of objects, such as human faces or features thereof. In some embodiments, the template model can be used as a reference model that can be compared to values representing a user's unique face. In some embodiments, the comparison can generate difference information (e.g., metric) reflecting differences (e.g., deltas or deviations) between the template 3D model values, and in particular the template landmark data, and values representing corresponding points and/or facial features of the user's face. Difference information can refer to information reflecting differences between two elements, such as values. The difference information can be stored as part of 3D landmark data 412. To generate the 3D model of the user's face, conversion system 420 may adjust the template model based on the difference information corresponding to a particular user, which can contribute to computational efficiency in generating a 3D model. In some embodiments, a morphological model can be used with a PCA model to generate a 3D model, as described further below.

Figure 6A:
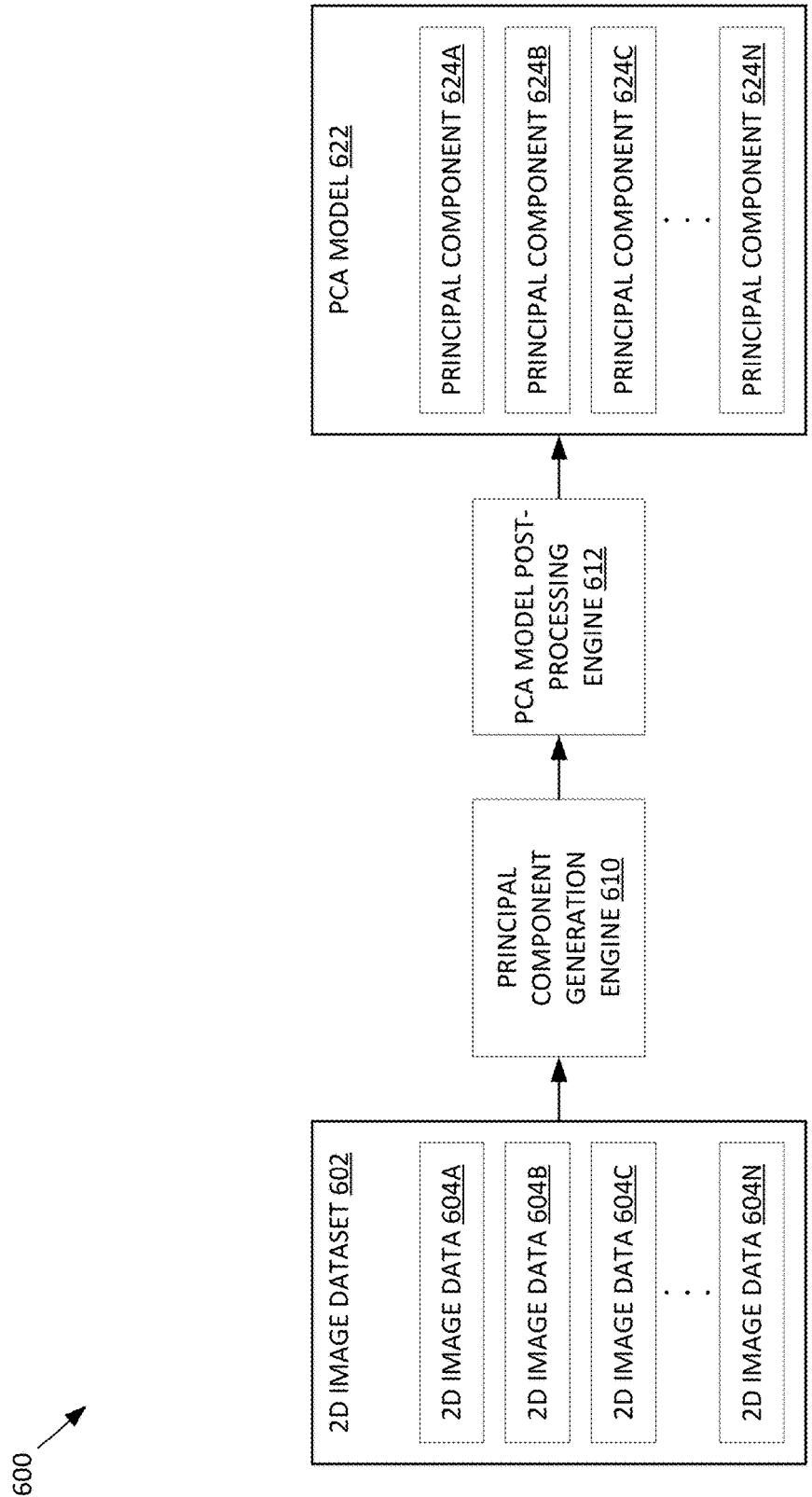
FIG. 6A is a block diagram of an example principal component analysis (PCA) model generation pipeline architecture for training a PCA model of principal components, in accordance with some embodiments of the present disclosure.
Figure 6B:
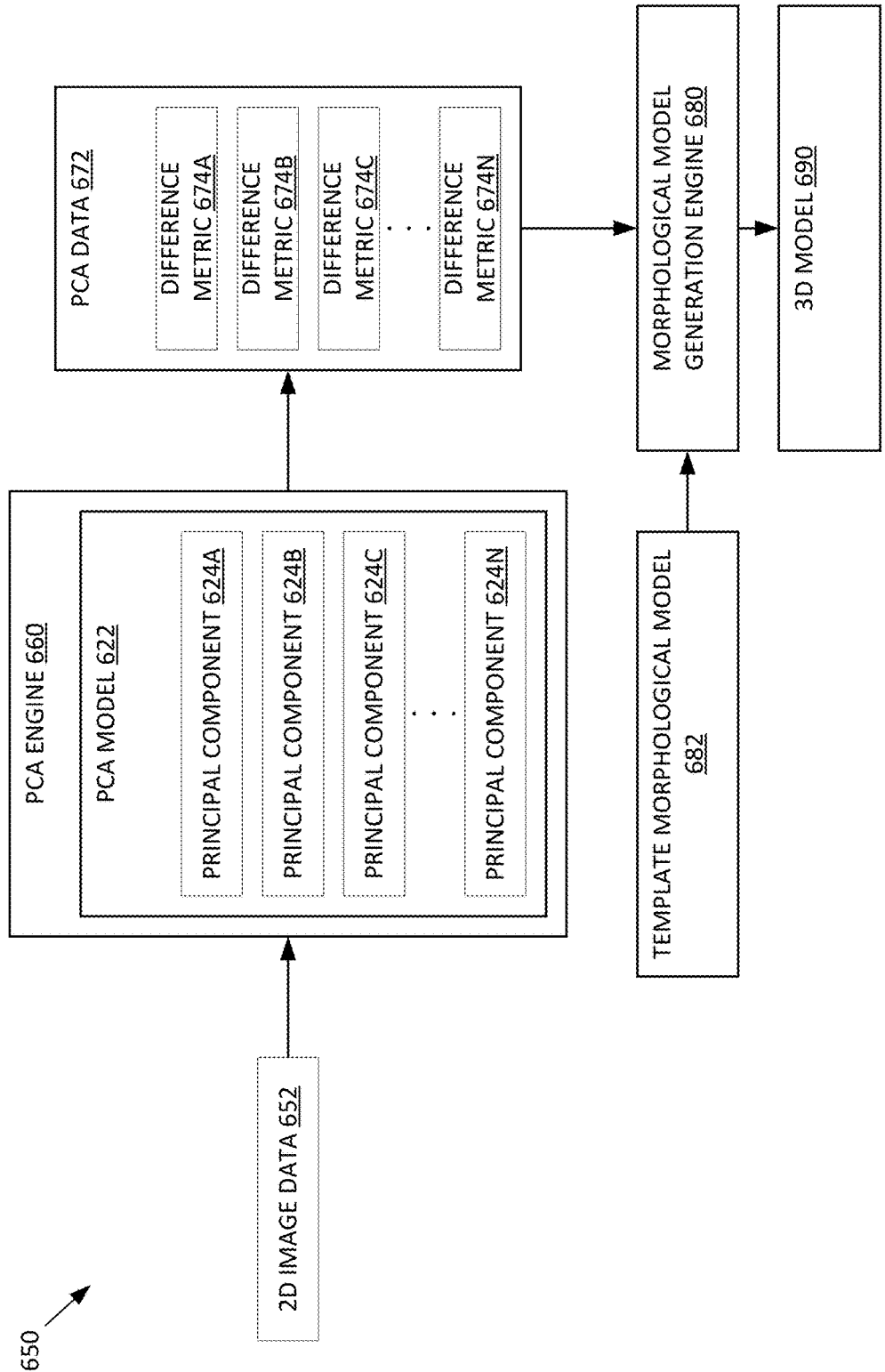
FIG. 6B is a block diagram of an example 3D model generation pipeline architecture for generating a 3D model from 2D image data using a trained PCA model and a morphological model, in accordance with some embodiments of the present disclosure.

FIG. 6A is a block diagram of an example principal component analysis (PCA) model generation pipeline architecture 600 for training a PCA model of principal components, in accordance with some embodiments. FIG. 6B is a block diagram of an example 3D model generation pipeline architecture 650 for generating a 3D model from 2D image data using a trained PCA model and a morphological model.

In some embodiments, PCA can refer to a technique that can be used to transform a dataset into a new set of dimensions (principal components). The principal components may include linear combinations of original data features in the dataset. The combinations can be derived to capture variance (e.g., maximum variance) in the dataset. The principal components may be orthogonal (e.g., uncorrelated) and ranked according to the variance. In some embodiments, the resulting principal components can form, at least in part, a trained PCA model based on the dataset (the training data). The trained PCA model can be used to characterize or transform other data into respective principal components by projecting the other data onto the principal components of the trained PCA model. In some embodiments, PCA techniques can be used to transform features (e.g., facial features) of the original data, such as 2D image data, into a new set of principal components, which may be used to generate 3D models and perform other analyses on the 2D image data.

Referring to FIG. 6A, architecture 600 includes 2D image dataset 602, principal component generation engine 610, PCA model postprocessing engine 612, and PCA model 622. In some embodiments, 2D image dataset 602 includes one or more 2D image data 604A-N each corresponding to a respective 2D image. In some embodiments, each of 2D image data 604A-N may correspond to a 2D image of a human face, such as image 402 of FIG. 4. In some embodiments, 2D image dataset 602 may be derived from a training set of 2D images of human faces, which may be manually or automatically curated. In some embodiments, and as described with respect to FIG. 4, the data of 2D image dataset 602 may be preprocessed with various techniques to change resolutions, adjust color depths, prune undesirable image data, or similar.

In some embodiments, PCA model 622 includes one or more principal components 624A-N each associated with a feature, such as 2D facial feature. In some embodiments, a principal component of principal components 624A-N may correspond to a human-derived facial feature, such as eye color, inner eye distance, eye angle, jaw shape, or similar. A human-derived facial feature can refer to a physical characteristic or element that is part of a human face and that naturally occurs on an individual's face and can be assessed or recognized by a human eye (e.g., human perception). In some embodiments, a principal component of principal components 624A-N may correspond to a computer-derived facial feature, such as a correlation between multiple human-derived facial features (e.g., a correlation between inner eye distance and jaw shape), non-human derived facial features, or a combination thereof.

In some embodiments, a principal component of principal components 624A-N may correspond to a computer-derived facial feature. A computer-derived facial feature can refer to attributes or information about an individual's face that is extracted, analyzed, or recognized by a computer (e.g., processing device implementing digital image processing). A computer-derived facial feature may not be assessed or recognized by a human eye. In some embodiments, the principal components of a trained PCA model 622 (including principal components corresponding to human-derived and/or computer-derived features) may represent an average or template set of facial features based on the variance of facial features present in 2D image dataset 602. A difference (e.g., difference metric) between an individual user's facial feature and the principal component template can thus be expressed as a weight (e.g., a multiplier or a difference) of the corresponding principal component (e.g., the facial features is stronger/weaker than average as indicated by a larger/smaller weight or a positive/negative weight), as described below with respect to FIG. 6B.

In some embodiments, PCA model 622 can be generated or trained by one or more of principal component generation engine 610 or postprocessing engine 612. In some embodiments, principal components 624A-N may be derived from 2D image dataset 602 using PCA training techniques. In some embodiments, 2D image dataset 602 may be modified to elicit select principal components. In some embodiments, 2D image dataset 602 may be modified to elicit principal components corresponding to human-derived facial features. For example, a dataset representing human faces may be manually or automatically chosen (e.g., by preprocessing engine 606) to encourage identification of specific human-derived facial features. A feedback loop may be used with multiple generation cycles in principle component generation engine 610 to refine the dataset and/or resulting principal components. In some embodiments, the principal components may be selected, modified, pruned, or a combination thereof to retain principal components corresponding to one or criteria such as human-derived facial features. For example, principal components corresponding to computer-derived features may be manually or automatically removed (e.g., by postprocessing engines 612 or 610) to obtain PCA model 622. In another example, principal components associated with different 2D image datasets 602 may be combined to form a composite PCA model 622 corresponding to human-derived facial features, where principal components 604A-N of the composite model may not necessarily be orthogonal (e.g., uncorrelated) to each other as would be expected in a set of principal components derived from a single dataset.

Referring to FIG. 6B, architecture 650 includes 2D image data 652, PCA engine 660, PCA data 672, morphological model generation engine 680, template morphological model 682, and 3D model 690. In some embodiments, 2D image data 652 may correspond to an image of a scene or object, such as a user's face (e.g., image 402 of FIG. 4). In some embodiments, PCA engine 660 includes PCA model 622 of FIG. 6A, with each principal component 624A-N corresponding to a facial feature as previously described. In some embodiments, PCA engine 660 can be used to transform or project 2D image data 652 into the facial feature eigenspace of PCA model 622 (or non-eigenspace for a composite PCA model 622 as previously described) to generate PCA data 672. PCA engine 660 may perform a set of operations (e.g., a set of dot product operations) to perform the projection. In some embodiments, PCA engine 660 may correspond to conversion system 420 of FIG. 4.

In some embodiments, PCA data 672 may include difference metrics 674A-N (also referred to as "difference information" herein) representing the projection of 2D image data 652 over each of principal components 624A-N. A difference metric of difference metrics 674A-N may correspond to a deviation (or delta, weight, strength, prominence, or other metric) of a facial feature of 2D image data 652 from an average or template value represented by the corresponding principal component of principal components 624A-N. For example, difference metric 674A may represent a deviation of the user's inner eye distance from the average distance within the images associated with 2D image dataset 602. As previously described, difference metrics 674A-N may correspond to a multiplier, difference, or other operation with respect to the template facial features represented by principal components 624A-N.

In some embodiments, template morphological model 682 may correspond to a generic 3D model of an object, such as a human face (e.g., 3D model 414 of FIG. 4). The 3D landmark data of the generic 3D model can each correspond to a principal component of principal components 624A-N and an average or template value associated with the corresponding principal component. In some embodiments, template morphological model 682 may be generated or configured (e.g., manually or automatically) based on principal components 624A-N such that each landmark represents the average facial feature of the corresponding principal component. In some embodiments, each landmark may correspond to one or more vertices, lines, faces, or other geometry of the model associated with the landmark's facial feature, and landmarks may share geometry. Template morphological model 682 may further be configured such that a landmark may be modified (e.g., morphed) based on a difference metric of PCA data 672. For example, a landmark may be associated with a control variable that modifies the landmark to increase or decrease the prominence (or other metric) of the corresponding facial feature. The geometry associated with the landmark will be modified as a result. In an example, a vertex of template morphological model 682 located at the inner corner of the eye may be associated with both an inner eye distance landmark (corresponding to an inner eye distance facial feature) and an eye angle landmark (corresponding to an eye angle facial feature). Morphing the control variables of either landmark may change the coordinates of the vertex.

In some embodiments, PCA data 672 and template morphological model 682 may be provided as input to morphological model generation engine 680 for generation of 3D model 690. 3D model 690 can be similar to 3D model 414 of FIG. 4, unless otherwise described. Morphological model generation engine 680 may use difference metrics 674A-N of PCA data 672 to modify the corresponding landmarks of template morphological model 682 to generate in 3D model 690 that is representative of the user's face. For example, a control variables of template morphological model 682 may be multiplied by or added to respective ones of difference metrics 674A-N to accurately represent the user's unique facial features in 3D model 690.

Figures 7A, 7B:
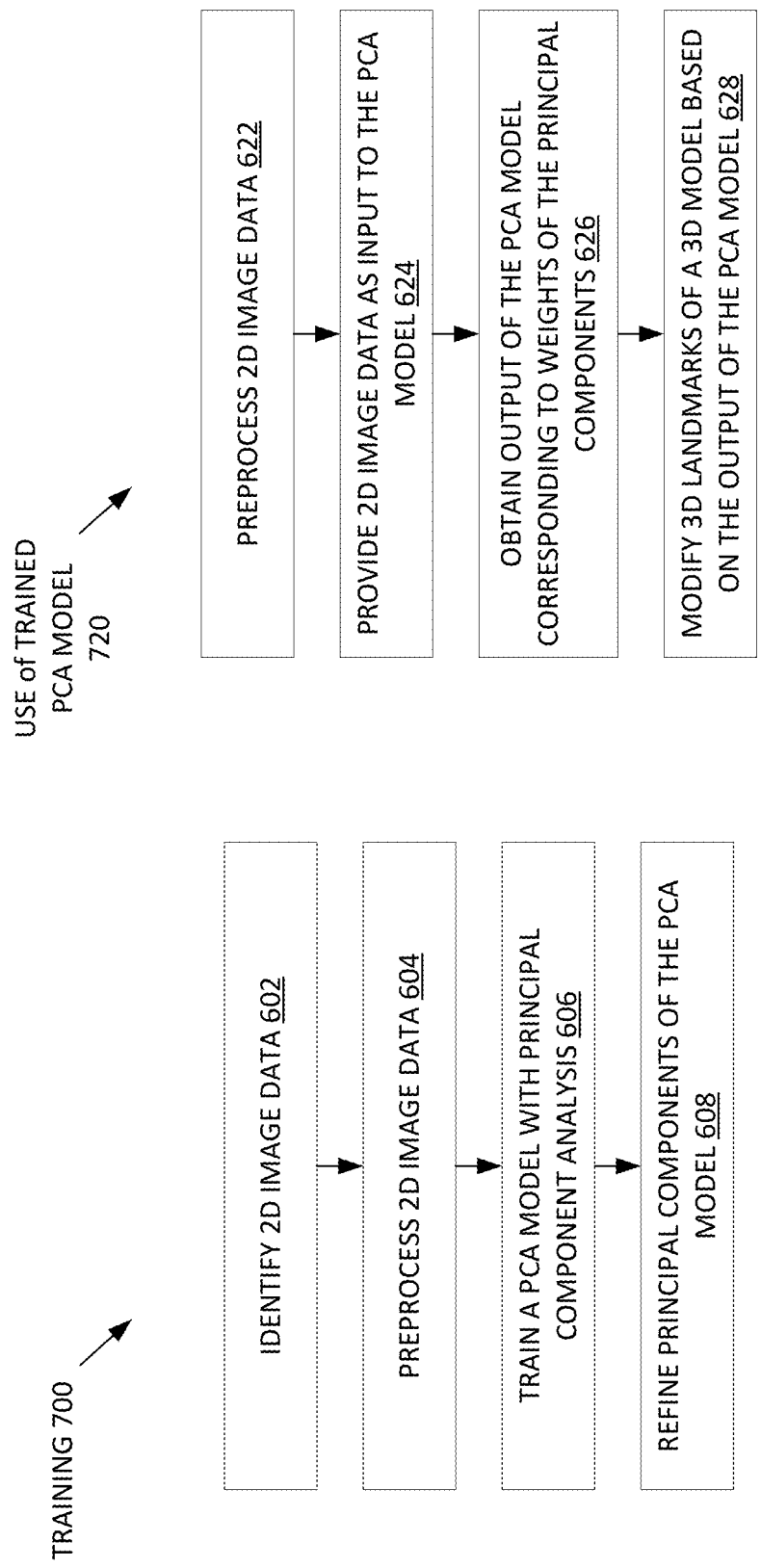
FIG. 7A illustrates a flow diagram of an example method for training a PCA model, in accordance with some embodiments of the present disclosure.
FIG. 7B illustrates a flow diagram of an example method for using a trained PCA model, in accordance with some embodiments of the present disclosure.

FIG. 7A illustrates a flow diagram of an example method 700 for training a PCA model, in accordance with some embodiments. FIG. 7B illustrates a flow diagram of an example method 720 for using a trained PCA model, in accordance with some embodiments. Methods 700 and 720 may be performed by processing logic that may comprise hardware (e.g., circuitry, dedicated logic, etc.), computer-readable instructions such as software or firmware (e.g., run on a general-purpose computing system or a dedicated machine), or a combination thereof. Methods 700 and 720 may also be associated with sets of instructions stored on a non-transitory computer-readable medium (e.g., magnetic or optical disk, etc.). The instructions, when executed by a processing device, may cause the processing device to perform operations comprising the blocks of methods 700 and 720. In an embodiment, methods 700 and 720 are performed by computing system 100A of FIG. 1A and/or computing system 100B of FIG. 1B. In an embodiment, blocks of a particular method depicted in FIGS. 7A-B can be performed simultaneously or in different orders than depicted. Various embodiments may include additional blocks not depicted in FIGS. 7A-B or a subset of blocks depicted in FIGS. 7A-B.

Referring to FIG. 7A, at block 702, processing logic identifies 2D image data, which may correspond to images of human faces. For example, processing logic may identify 2D image data 303 corresponding to one or more images 302. The 2D images of human faces may be images of a training set, which may be manually or automatically curated.

At block 704, the processing logic preprocesses the 2D image data. For example, preprocessing engine 406 may select 2D image data to elicit human-derived principal components corresponding to human-derived facial features as described above with reference to FIG. 4. Other preprocessing may occur at block 704, such as normalizing the 2D image data, cropping the 2D image data to consistent dimensions, augmenting the 2D image data to generate additional training data, etc.

At block 706, the processing logic trains a PCA model with principal component analysis techniques using the 2D image data from the previous blocks. In some embodiments, the resulting principal components of the trained PCA model may correspond to human-derived facial features or computer-derived facial features or a combination thereof. In an embodiment, blocks 704-706 may be repeated in a loop to achieve desired principal components (e.g., corresponding to human-derived facial features) as described above with reference to FIG. 6A-B.

At block 708, processing logic refines the principal components of the PCA model. For example, postprocessing engine 410 may prune or modify non-human-derived principal components or may combine human-derived components from different training blocks 706 (e.g., each associated with a different training set of 2D image data).

Referring to FIG. 7B, at block 722, processing logic preprocesses input 2D image data (e.g., corresponding to an image of a user's face). For example, preprocessing engine 506 may normalize the input 2D image data, flatten it to a vector, or perform other preprocessing operations.

At block 724, processing logic provides the preprocessed 2D image data as input to the trained PCA model.

At block 726, processing logic obtains an output of the PCA model corresponding to weights of the principal components. For example, in blocks 724 and 726, the preprocessed input 2D image data may be projected onto the eigenspace defined by the principal components, and the weights indicating the deviation of the input 2D image data from the training set (e.g., difference metrics) may be obtained from the projection.

At block 728, the processing logic modifies landmarks of a 3D model (e.g., a morphological model of a template face) based on the output of the PCA model. For example, landmarks 502A-N of 3D model 500 may be modified based on a deviation (e.g., difference metrics) from the template model indicated by the weights obtained at block 726.

Figure 8:
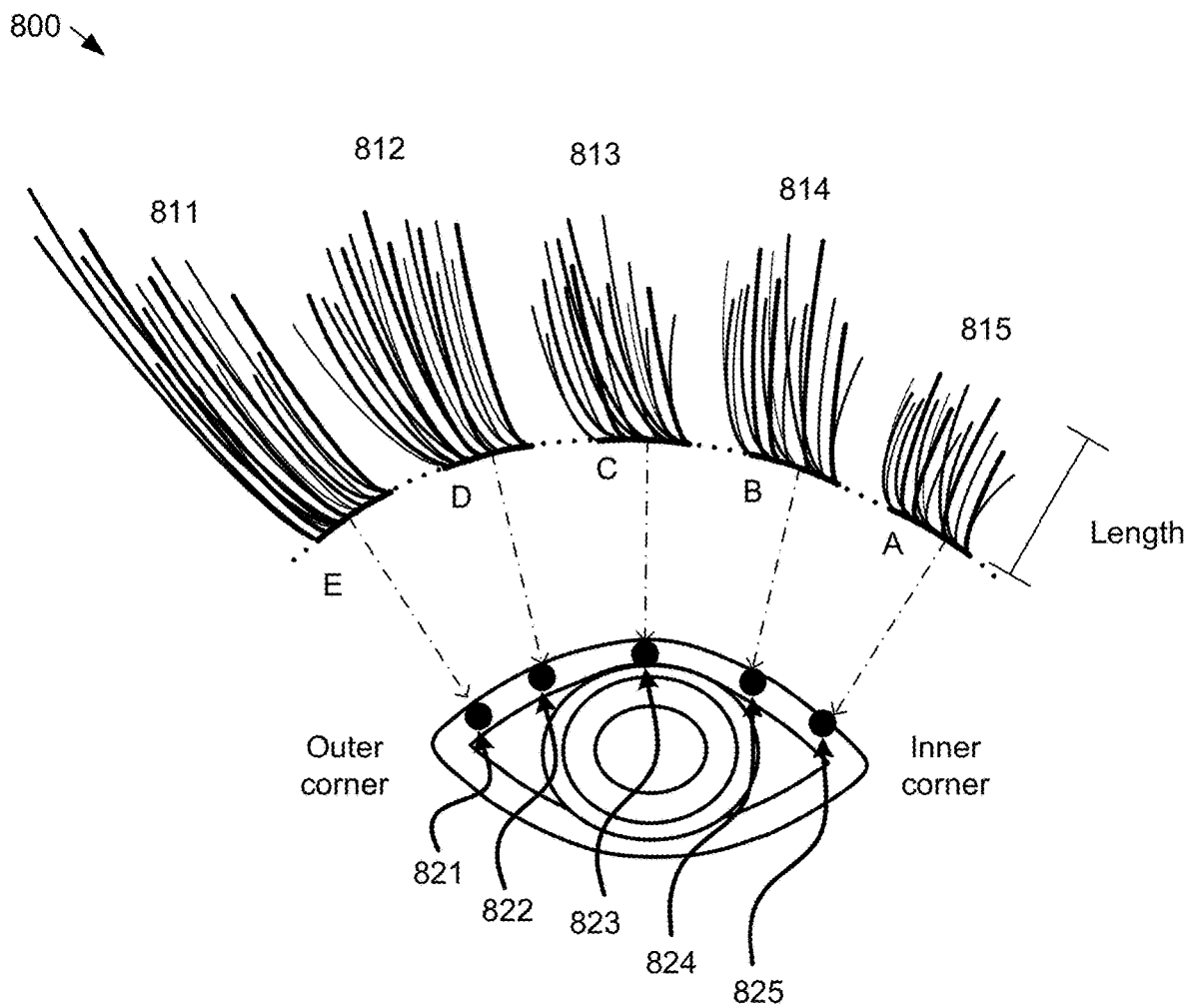
FIG. 8 depicts an arrangement of false lash extensions in accordance with lash configuration information, in accordance with some embodiments.

FIG. 8 depicts an arrangement of artificial lash extensions in accordance with lash configuration information, in accordance with some embodiments. Set of artificial lash extensions 800 illustrates artificial lash extensions 811 through 815. The description of lash configuration information with respect to artificial lash extensions is provided for purposes of illustration, rather than limitation. It can be noted that in other embodiments, lash configuration information can be implemented for false eyelashes, generally. It can be further noted that in other embodiments, a set of artificial lash extensions can have any number of artificial lash extensions. For purposes of illustration, rather than limitation a set of artificial lash extensions with respect to FIG. 8 is described for a single eye. It can also be noted that in other embodiments that a set of artificial lash extensions can be for a pair of eyes, multiple eyes, or object or configurations.

Lash configuration information (also referred to as "lash map" or "false eyelash configuration information" herein) can refer to information related to the selection of artificial lash extensions (e.g. or false eyelashes, generally) and/or the application of artificial lash extensions (e.g. or false eyelashes, generally) at the eye area of a user. In some embodiments, lash configuration information can identify the particular artificial lash extensions of a set of lash extensions (e.g., length, style, and/or color) (e.g. or false eyelashes, generally), a location at the underside of the natural lashes at which each particular artificial lash extension of the set of artificial lash extensions is to be applied, and/or the order of each artificial lash extension in the set of artificial lash extensions (e.g. or false eyelashes, generally). In some embodiments and as described further below, lash configuration information can include one or more of style information, length information, color information, placement information, or order information for an eye or pair of eyes of a user. An example of lash configuration information is illustrated in element 835.

In some embodiments, lash configuration information can be specific to a particular user. In some embodiments, lash configuration information can pertain to single eye where each eye of a pair of eyes can have different lash configuration information. In some embodiments, lash configuration information can pertain to a pair of eyes where each eye has the same or similar lash configuration information. In some embodiments, a set of artificial lash extension can include multiple artificial lash extensions for a single eye or a pair of eyes.

In some embodiments, lash configuration information includes style information. In some embodiments, style information can identify a style of one or more artificial lash extensions in a set of artificial lash extension. The style of an artificial lash extension can refer to a particular design of an artificial lash extension and/or a desired appearance of an arranged set of artificial lash extensions. In some embodiments, style or design of an artificial lash extension can be include a particular arrangement or pattern of artificial hairs of an artificial lash extension.

For example, artificial lash extensions 811 through 815 show artificial lash extensions of the set of artificial lash extensions 800 in a same style, style X (e.g., style information is style X). The artificial lash extensions of style X can have the same or similar arrangement (e.g., pattern) of artificial hairs. In other examples, one or more artificial lash extensions of a set of artificial lash extensions can be of different styles from other artificial lash extensions of the set of artificial lash extensions. For instance, artificial lash extension 813 can be of style P that is pointed at the ends (not shown) and the remaining artificial lash extensions 811, 812, 814 and 815 can be of style X.

In some embodiments, the style of the artificial lash extensions in a set of artificial lash extensions can be the same or similar. In some embodiments, the style among at least some of the artificial lash extensions in a set of artificial lash extensions can be of one or more different styles. Styles can include, for example, natural style (e.g., moderate curl and volume), volume style (e.g., extra volume and pronounced curl), mega-volume style (e.g., deep curl and densely packed volume), classic style (e.g., moderate curl and balanced volume), wispy style (e.g., feathered, fine extensions that create a textured and soft appearance), spiky style (e.g., separated, uneven extensions with a jagged, textured look), crimped style (e.g., extensions that are intentionally crimped or zigzagged), etc.

In some embodiments, lash configuration information includes length information. Length information can refer to the length of an artificial lash extension. In some instances, length can be measured from the base to tip of the artificial hairs of the artificial lash extension (e.g., the tip of the longest artificial hair of the artificial lash extension). In some embodiments, the lengths of the artificial lash extensions in a set of artificial lash extensions can be the same length. In some embodiments, the lengths of the set of artificial lash extensions in a set of artificial lash extensions can be varying lengths. In some embodiments, the lengths of an artificial lash extension can range from 6 millimeters (mm) to 25 mm or 8 mm to 20 mm.

For example, artificial lash extension 811 can be 12 mm in length, artificial lash extension 812 can be 11 mm in length, artificial lash extension 813 can be 10 mm in length, artificial lash extension 814 can be 9 mm in length, and artificial lash extension 815 can be 8 mm in length. The length information can be 8 mm, 9 mm, 10 mm, 11 mm, 12 mm for the set of artificial lash extensions 800, for instance. In another example, the artificial lash extensions in a set of artificial lash extensions can be the same length and the corresponding length information can be 9 mm, 9 mm, 9 mm, 9 mm, 9 mm, for instance.

In some embodiments, varying lengths of the artificial lash extension within a lash configuration can be strategically used to create different desired appearances (e.g., looks). Varying lengths can be used to achieve, for example, a natural, textured appearance with mixed lengths or to add dimension by incorporating longer and shorter lashes within the same set of artificial lash extensions. In further examples, varying lengths can be used to achieve appearances such as a cat-eye appearance (e.g., longer extensions towards the outer corners of the eyes, creating an uplifted and elongated effect reminiscent of the eye shape of a cat), a doll-eye appearance (e.g., longer lashes at the center of the eye, producing a wide-eyed look), textured appearance (e.g., a mix of different lash lengths and types for a multidimensional look), cleopatra appearance (e.g., extended, winged extensions at the outer corners of the eye), etc.

In some embodiments, lash configuration information includes color information. Color information can refer to the color(s) of an artificial lash extension. In some embodiments, artificial lash extensions in a set of artificial lash extensions 800 can be the same color. In some embodiments, artificial lash extensions in a set of artificial lash extensions 800 can be different colors. Colors can include, for example, black, blonde, auburn, blue, green, purple, pink, and so forth. In some embodiments, an artificial lash extension can include multiple colors. For example, multi-colored lash extensions can include ombre (e.g., gradual transition of color from base to tip of the artificial hairs of dark to light or one color to another), rainbow (e.g., designed with multiple colors in a spectrum), sunset (e.g., warm and fiery hues of a sunset, blending colors like red, orange, and pink), etc. In some embodiments, a user can match the color of the artificial lash extensions of set of artificial lash extensions 800 with the color of the user's eyebrows, head hair or other feature.

In some embodiments, lash configuration information includes order information. Order information can refer to information identifying for an artificial lash extension of a set of artificial lash extensions a position in an order (e.g., sequence) of an arrangement of the set of artificial lash extensions. The order information can identify relative position of each artificial lash extension of the set of artificial lash extensions 800 with respect to one another. For example, artificial lash extensions 815, 814, 813, 812, and 811 are to be ordered as A, B, C, D, E respectively. The order information for artificial lash extension 815 can reflect position A in the order of the arrangement. The order information for artificial lash extension 814 can reflect position B, and so forth.

In some embodiments, lash configuration information includes location information. Location information can include information identifying a location of the eye area where an artificial lash extension of a set of artificial lash extensions is to be applied. For example, artificial lash extensions 815, 814, 813, 812, and 811 are to be located at points 825, 824, 823, 822, and 821 respectively. In some embodiments, the location information can include information that identifies a location on the natural lashes (e.g., a location at the underside of the natural lashes) at which an artificial lash extension of the set of artificial lash extension is to be applied. In some embodiments, location information can help guide a user on applying the set of artificial lash extension at the natural lashes. In some embodiments, the location information can include a visible guide (e.g., picture of identifying location(s) at which to apply one or more artificial lash extensions). In some embodiments, the location information can include descriptive information, such as textual information, describing a location at which to apply an artificial lash extension. For instance, location information for artificial lash extension 815 can include information that artificial lash extension 815 is to be applied at the inner corner of the right eye. Location information for artificial lash extension 814 can include information indicating that artificial lash extension 814 is to be applied directly adjacent to artificial lash extension 815, and so forth.

Figure 9:
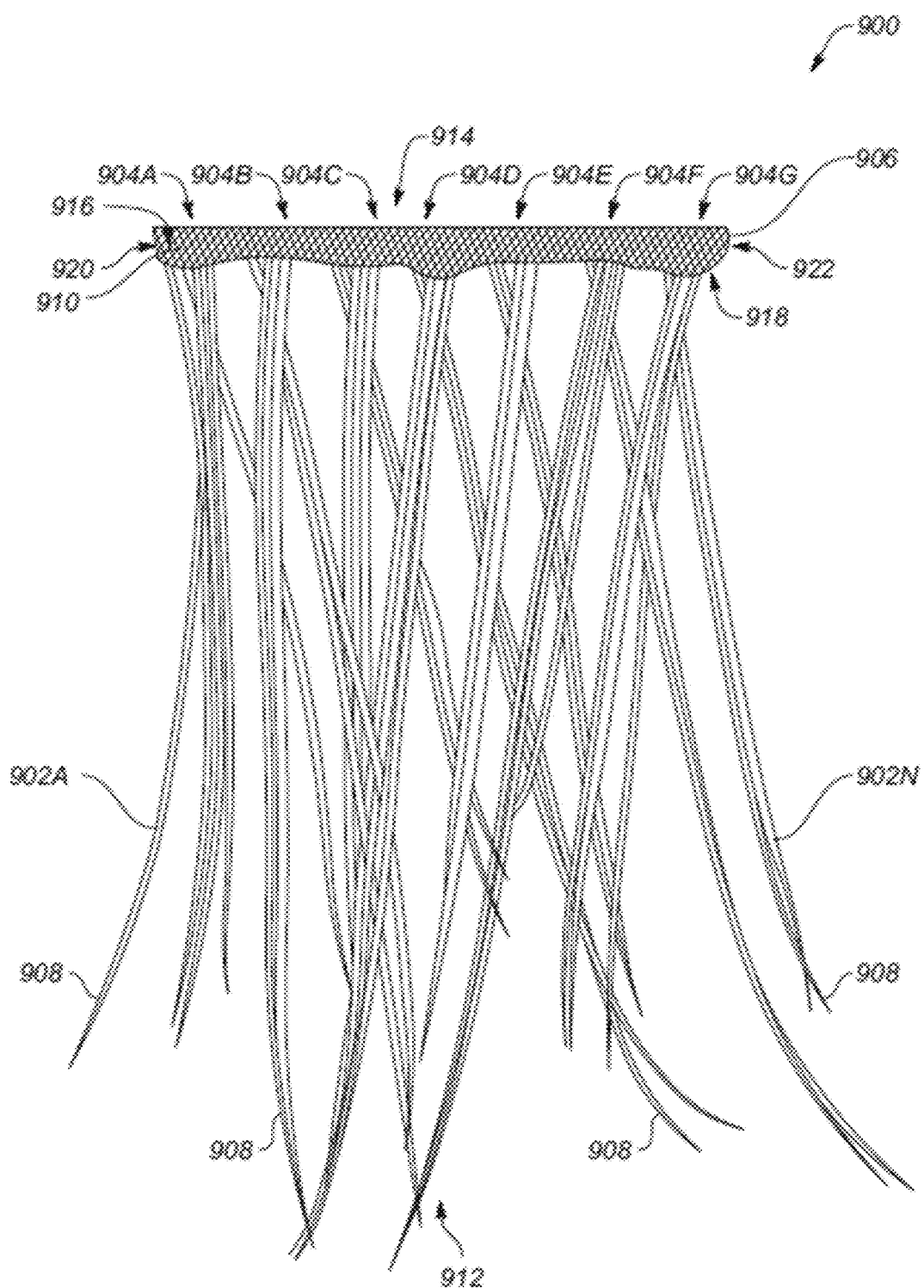
FIG. 9 is an illustration of an exemplary artificial lash extension with a textured base, in accordance with some embodiments of the disclosure.
Figure 10:
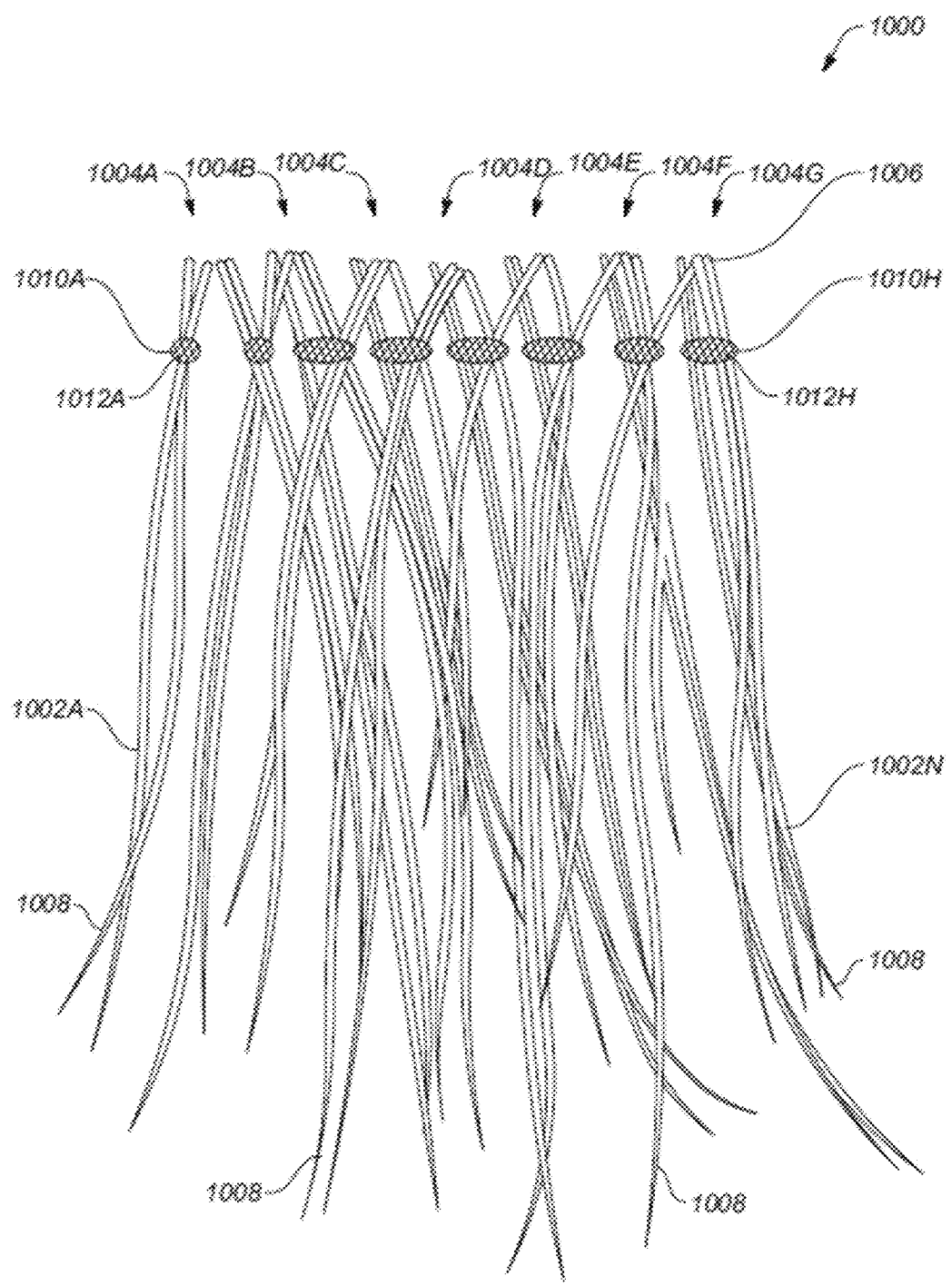
FIG. 10 is an illustration of another exemplary artificial lash extension with a textured base, in accordance with some embodiments of the disclosure.

FIG. 9 is an illustration of an exemplary artificial lash extension with a textured base, in accordance with some embodiments of the disclosure. FIG. 10 is an illustration of another exemplary artificial lash extension with a textured base, in accordance with some embodiments of the disclosure.

In some embodiments, one or more of artificial lash extension 900 or artificial lash extension 1000 (both also referred to as "lash extension," "artificial eyelash extension," "lash segment" or "artificial lash segment" herein) are designed or configured for application at the underside of the natural eyelashes of the user, or alternatively, even the top side of the natural eyelashes of a user. In some embodiments, one or more of artificial lash extension 900 or artificial lash extension 1000 can be part of a set of multiple artificial lash extensions. In some embodiments, one or more of artificial lash extension 900 or artificial lash extension 900 can be a segment of a "full" artificial lash extension such that when multiple artificial lash extensions are arranged adjacent to one another at the underside of natural eyelashes the arranged artificial lash extensions span the length of the natural eyelashes to form a full artificial lash extension. In some embodiments, the artificial lash extensions (e.g., segments) can be shorter than the horizontal length of the natural eyelashes (e.g., length of the lash line). In some embodiments, 3-5 artificial lash extensions can be arranged adjacent to one another at the underside of the natural eyelashes so that the set of arranged artificial lash extensions span the length of the natural eyelashes. In other embodiments, an artificial lash extension can be longer such that the artificial lash extension is a "full" artificial lash extension that substantially spans the horizontal length of the natural eyelashes. The artificial lash extension can be arranged to substantially align with the lash line of the user. In some embodiments, using artificial lash extensions that are independent segments can allow an individual artificial lash extension to move independently when bonded to the underside of a natural lash, which mimics the movement of the natural lash and can improve the feel, comfort, and longevity of the artificial lash extensions.

Artificial lash extension 900 and artificial lash extension 1000 respectively depict artificial hairs 902A-902N (collectively referred to as "artificial hairs 902" herein) and 1002A-1002N (collectively referred to as "artificial hairs 1003" herein). In some embodiments, the artificial hairs of an artificial lash extension, such as artificial lash extension 900 or artificial lash extension 1000, can be formed from one or more synthetic materials, including but not limited to polybutylene terephthalate (PBT), acrylic resin, polyester (e.g., polyethylene terephthalate (PET)), other polymers, other synthetic material, or a combination thereof. In alternative embodiments, a natural material such as natural hair (e.g., human hair or mink hair) can be used. In some embodiments, the artificial hairs of a particular artificial lash extension can have one or more lengths and/or one or more diameters. In some embodiments, the diameter of an artificial hair can be between approximately 0.0075 millimeters (mm) (e.g., 0.0075 mm+/−0.0025 mm) to 0.3 mm (e.g., 0.3 mm+/−0.05 mm). In some embodiments, the ends of one or more of the artificial hairs can be tapered. In some embodiments, the one or more of artificial hairs can be curled or shaped in a particular direction. For example, the ends 908 of artificial hairs 902 or the ends 1008 of artificial hairs 1002 can be tapered or curled or both. In another example, the ends 908 of artificial hairs 902 can be curled upwards in the direction of the top side of the artificial lash extension 900. In some embodiments, the artificial hairs can range from 3 mm to 30 mm in length, or in some instances even longer.

In some embodiments, artificial lash extension 900 of FIG. 9 and artificial lash extension 1000 FIG. 10 can include multiple sides, such a front side, a rear side, a top side, a bottom side, a first end, and a second end opposite the first end. The sides are described relative to an orientation of an artificial lash extension when attached to a user's natural eyelashes, for the sake of illustration, rather than limitation. Referring to artificial lash extension 900 of FIG. 9, the front side 912 can refer to a side that is a forward part of the artificial lash extension. For example, the front side 912 of artificial lash extension 900 faces opposite the user when attached to a user's natural eyelashes. The back side 914 can refer to a side that is opposite the front side 912 and faces the user's face when attached to a user's natural eyelashes. The top side 916 can refer to an uppermost part and faces towards the top of the user's head when attached to a user's natural eyelashes. The bottom side 918 is opposite the top side 916 and faces towards the user's feet when attached to a user's natural eyelashes. The first end 920 and the second end 922 can refer to lateral parts or lateral sides of an artificial lash extension. For example, the first end 920 can be a left side and the second end 922 can be a right side (or vice versa) when the artificial lash extension is attached to the user's natural eyelashes. Although multiple sides are described with respect to artificial lash extension 900, artificial false eyelashes and other artificial lash extensions, such as artificial lash extension 1000 can be described having similar sides. Additionally, the sides as described with respect to an artificial lash extension 900 can also be used to describe sides of a base of an artificial lash extension, as further described below.

In some embodiments, an artificial lash extension can include a base. For example, artificial lash extension 900 includes base 906. In some embodiments, artificial lash extension 1000 may or may not (as illustrated) include a base similar to base 906 of artificial lash extension 900. The base can include a top side (e.g., facing out of the page and towards the reader), a bottom side, a back side, a front side, and two ends (e.g., two lateral sides). In some embodiments, one or more of the multiple artificial hairs of artificial lash extension protrude out the front side of the base. When arranged at the underside of a natural lash, the backside of the artificial lash extension can point towards the user's eye. The thickness (e.g., between the top side and bottom side of the base) can be between approximately 0.05 millimeters (mm) and approximately 0.15 mm (e.g., 0.05 mm+/−0.01 mm). In some embodiments, the thickness of the base can be less than 0.05 mm. In some embodiments, the low profile of the base is designed to allow the artificial lash extension to be light-weight to better adhere to the underside of the natural lash and prevent obstruction of a user's view. The low profile of the base can at least in part be attributed to an attachment operation that forms the base and/or attaches clusters of artificial hairs to the base. For example, the attachment operation can include an application of heat that, at least in part, creates a base with a low profile.

In some embodiments, one or more of the top side or bottom side (e.g., surface) of the base is substantially flat (e.g., having a flatness control tolerance value of +/−0.03 mm or +/−0.015 mm). In some embodiments, the flatness of the base of the artificial lash extension 900 is designed to allow improved contact and adhesion to a surface, such as the underside of a natural eyelash or the opposing surface of another artificial lash extension. The flatness of the base can at least in part be attributed to the attachment operation.

In some embodiments, one or more of artificial lash extension 900 of FIG. 9 and artificial lash extension 1000 FIG. 10 include artificial hairs 902 and 1002 that are respectively configured into clusters of artificial hairs 904A-204G (collectively referred to as "clusters 904" or "clusters of artificial hairs 904" herein) and clusters of artificial hairs 1004A-1004G (collectively referred to as "clusters 1004" or "clusters of artificial hairs 1004" herein). In some embodiments, a cluster of artificial hairs can refer to two or more artificial hairs that are grouped together. In some embodiments, one or more artificial hairs of a cluster of artificial hairs contact one another at or near the base. In some embodiments, two or more artificial hairs of a cluster can contact one another before and/or after an attachment operation, such as an application of heat. In some embodiments, 2-30 artificial hairs can be included in a cluster.

In some embodiments, the clusters of artificial hairs can be connected to or at the base with an application of heat in a similar manner as described herein (e.g., attachment operation). In some embodiments, the application of heat can at least partially melt at least some of the artificial hairs of one or more clusters of the artificial lash extension. In some embodiments, the application of heat can at least partially melt at least some of the artificial hairs of at least one cluster so that at least some of the artificial hairs of the cluster connect to one another. In some embodiments, the application of heat can at least partially melt at least some of the artificial hairs of at least one cluster so that at least some of the artificial hairs of the cluster connect to the base of the artificial lash extension (and/or form, at least in part, the base of the artificial lash extension). In some embodiments, at least some of the artificial hairs of at least one clusters are connected to one another at a respective part of the base by at least the application of heat.

In some embodiments, the clusters are connected to one another at the base by the application of heat. In some embodiments, one or more of the clusters of the artificial lash extension are directly connected to at least one adjacent cluster at the base. In some embodiments, one or more of the clusters of the artificial lash extension are indirectly connected to at least one adjacent cluster of the artificial lash extension at the base.

In some embodiments, at least two artificial hairs of an artificial lash extension crisscross each other. For example, two artificial hairs of a particular cluster can crisscross one another. In some embodiments, one or more individual clusters of artificial hairs can be formed using an application of heat as described above. Thus, the clusters can have a base (e.g., cluster base). The clusters can be arranged, and heat can be applied, as described above, to the cluster bases to form at least in part the base (e.g., base 906) of the artificial lash extension. In some embodiments, artificial lash extensions 900 or 1000 may be 4-10 mm wide. In some embodiments, artificial lash extension 900 or 1000 may be 5-6 mm wide. In some embodiments, the width of an artificial lash extension is much wider than a single cluster that is typically 1-2 mm wide.

Artificial lash extension 1000 of FIG. 10 further illustrates adjacent artificial hairs (or adjacent clusters 1004) that are coupled or secured to one another at connecting portions 1010A-1010H (collectively referred to as "connecting portions 1010" herein) of the crisscrossing artificial hairs 1002. For example, at least one hair of a particular cluster can be secured (e.g., directly or indirectly) to one or more hairs of an adjacent cluster at a connecting portion. In some embodiments, connecting portions 1010 can connect artificial hairs (e.g., clusters) of an artificial lash extension together at areas between the two ends of the artificial hairs such that the artificial hairs of the artificial lash extension are connected directly or indirectly to one another to form an artificial lash extension and both ends of the artificial hairs not connected together (e.g., open ended).

In some embodiments, the connecting portions 1010 (also referred to "base 1010" herein) can be considered a base, as described herein. In some embodiments, the connecting portions 1010 can be formed by an attachment operation, as described herein. In some embodiments, the connecting portions 1010 can be formed by an attachment operation that includes an application of heat in a similar manner as described herein. In some embodiments, the connecting portions 1010 can be formed by an attachment operation that includes an application of pressure in a similar manner as described herein. In some embodiments, the connecting portions 1010 can be formed using one or more of an application of heat, an application of adhesive, an application of pressure, or a chemical process as described herein. For example, the crisscrossing artificial hairs 1002 are connected or secured together approximately 1 mm to approximately 5 mm (+/−0.5 mm) above the ends 1006 of the artificial hairs 1002 (e.g., the ends 1006 that are opposite the ends 1008) using an attachment operation.

In some embodiments, the clusters can be secured to one another above ends 1006 using an attachment operation that includes an artificial material to form connecting portions 1010. In some embodiments, additional artificial material such as one or more artificial hairs or other material(s) can be placed or connected horizontally with respect to the lengthwise direction of the artificial hairs (e.g., across the area designated by the connecting portions 1010). The artificial hairs or clusters of artificial hairs can be connected to the additional artificial material using an attachment operation that includes one or more of an application of heat, an application of adhesive, an application of pressure, a chemical process, or a thread as described herein. In some embodiments, the application of the additional artificial material that is used to connect the artificial hairs of artificial lash extension 1000 can be similar to the application of additional artificial material used to form a base as described herein.

In some embodiments, the base (similar to base 906 of artificial lash extension 900) can be formed and subsequently removed after the formation of the connecting portions 1010, such that the artificial lash extension 1000 does not include the base similar to base 906. In some embodiments, the secured connecting portions 1010 can hold artificial hairs 1002 of the artificial lash extension 1000 together in the absence of a base similar to base 906. In some embodiments, the connecting portions 1010 of the crisscrossing artificial hairs 1002 can be formed without forming a base that similar to base 906 of artificial lash extension 900.

It should be appreciated that artificial lash extension 900 and 1000 are provided for purposes of illustration, rather than limitation.

In some embodiments, each artificial lash extension in a set of lash extensions can include multiple clusters of artificial hairs and a base (e.g., such as base 906 or a base including connecting portions 1010). In some embodiments, at least the base of the artificial lash extension can include a surface that is textured, such as texture 910 of base 906 or texture 1012A through 1012H (generally referred to as "texture 1012" herein) of connecting portions 1010 (also referred to as a base). In some embodiments, the texture, such as texture 910 or texture 1012 of a base can promote adhesion to a surface, such as an underside of natural eyelashes, using an adhesive.

In other embodiments, different parts of the artificial lash extension can be textured (including or not including the textured base) to help promote adhesion to a surface using an adhesive.

In some embodiments, the texture can have a pattern. A patterned texture can have at least some repeating features and/or a repeating arrangement of features. In some embodiments, the pattern texture is symmetrical. In some embodiments, the texture can be unpatterned. A patterned texture can also result from, for example, pressing, molding, or stamping the artificial lash extension such that the pressing, molding, or stamping results in a roughened or indented surface on the artificial lash extension. An unpatterned texture can have non-repeating features and/or a non-repeating arrangement of features.

In some embodiments, the surface of the top side of the base is textured, and the surface of the bottom side of the base (opposite the top side of the base) is untextured (e.g., substantially smooth, or at least not intentionally textured). In some embodiments, the surface of the top side of the base is textured, and the surface of the bottom side of the base is different from the textured surface of the top side of the base.

In some embodiments, the base of an artificial lash extension can be a single unit (e.g., monolithic) formed of a first material, such as PBT or polyester. In some embodiments, the texture, such as texture 910 and 1012, and can be formed in the first material and be part of the single unit. Artificial lash extension 900 and artificial lash extension 1000 illustrate example artificial lash extensions having a base and a texture thereon formed as a single unit. In some embodiments, the texture of the base is intentionally or deliberately formed to promote adhesion to a surface, such as the underside of natural eyelashes. In some embodiments, the texture of the base is intentionally or deliberately formed using a texturing operation.

Figure 11:
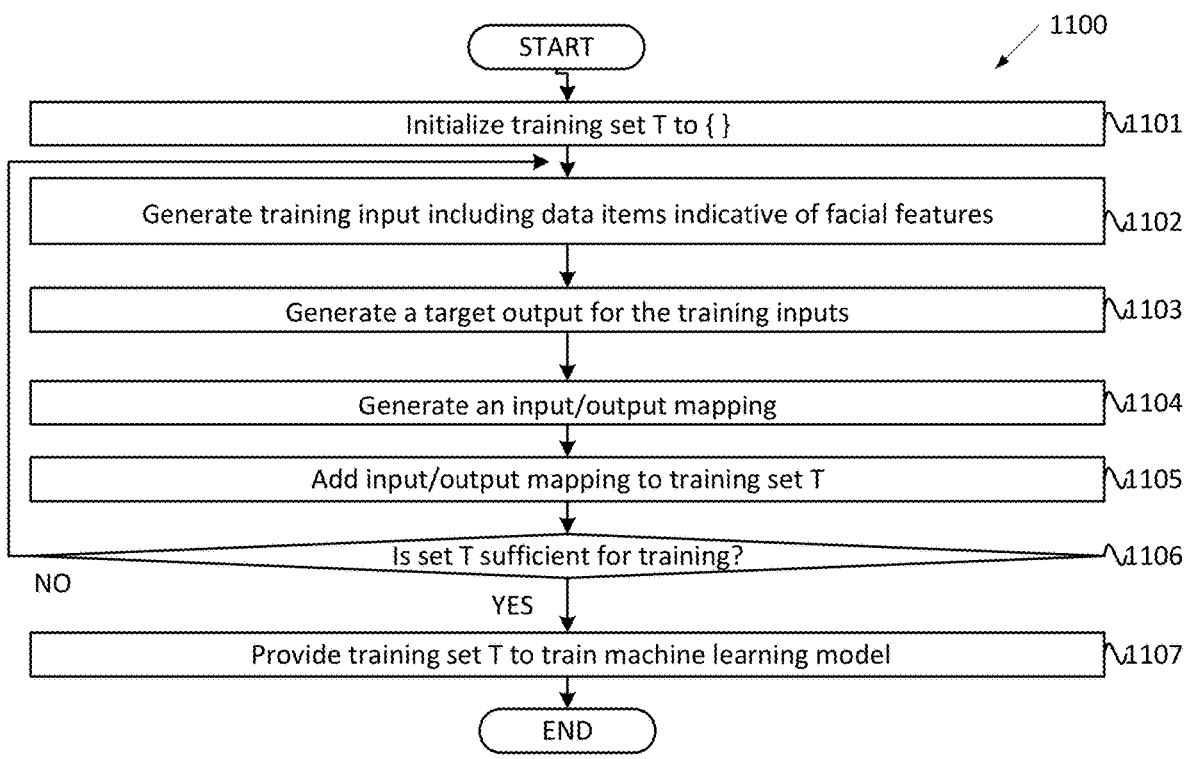
FIG. 11 depicts a flow diagram of one example of a method for training a machine learning model, in accordance with some embodiments of the disclosure.

FIG. 11 depicts a flow diagram of one example of a method 1100 for training a machine learning model, in accordance with some embodiments of the disclosure. The method 1100 may be performed by processing logic that can include hardware (circuitry, dedicated logic, etc.), software (e.g., instructions run on a processing device), or a combination thereof. In some embodiments, some or all the operations of method 1100 can be performed by one or more components of system 100A of FIG. 1A and/or system 100B of FIG. 1B. In some embodiments, one or more operations of method 1100 can be performed by training set generator 131 of server machine 130 as described with respect to FIG. 1A. It can be noted that components described with respect to FIG. 1A can be used to illustrate some embodiments of FIG. 11. In some embodiments, the operations (e.g., blocks 1101-1107) can be the same, different, fewer, or greater. For instance, in some embodiments one or more training inputs can be generated or one or more target outputs can be generated, and the one or more training inputs and one or more training outputs can be used as input-output pairs (for input) to train the machine learning model.

Method 1100 generates training data for a machine learning model. In some embodiments, at block 1101, processing logic implementing the method 1100 initializes the training set "T" to an empty set (e.g., "{ }").

At block 1102, processing logic generates training input including data items indicative of facial features such as 2D image data corresponding to a 2D image of a human face or 3D model data corresponding to a 3D model of a human face.

At block 1103, processing logic generates a target output for the training input. The target output identifies an indication of a textual identifier associated with the information representing the 2D image of the human face or the 3D model of the human face. In some embodiments, the textual identifier may be indicative of i) one or more facial features and/or ii) one or more relationships between facial features. In some embodiments, the textual identifier may be indicative of a 3D landmark corresponding to a geometric feature of the 3D model associated with a facial feature of the human face.

At block 1104, processing logic generates mapping data that is indicative of an input/output mapping. The input/output mapping (or mapping data) may refer to the training input, the set of target outputs for the training input, and an association between the training input(s) and the target output(s). At block 1105, processing logic adds the mapping data generated at block 1104 to training set T.

At block 1106, processing logic branches based on whether training set T is sufficient for training the model 160. If so, execution proceeds to block 1107, otherwise, execution continues back at block 1102. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At block 1107, processing logic provides training set T to train the machine learning model (e.g., model 160). In one embodiment, training set T is provided to training engine 141 of server machine 140 to perform the training. In the case of a neural network, for example, input values of a given input/output mapping (e.g., numerical values associated with training inputs) are input to the neural network, and output values (e.g., numerical values associated with target outputs) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 1107, the machine learning model (e.g., model 160) can be trained using training engine 141 of server machine 140. The trained machine learning model (e.g., model 160) can be implemented by false eyelash module 151 (of server machine 150 or false eyelash platform 120) to determine a textual identifier that describes a facial feature of the human face.

Figure 12:
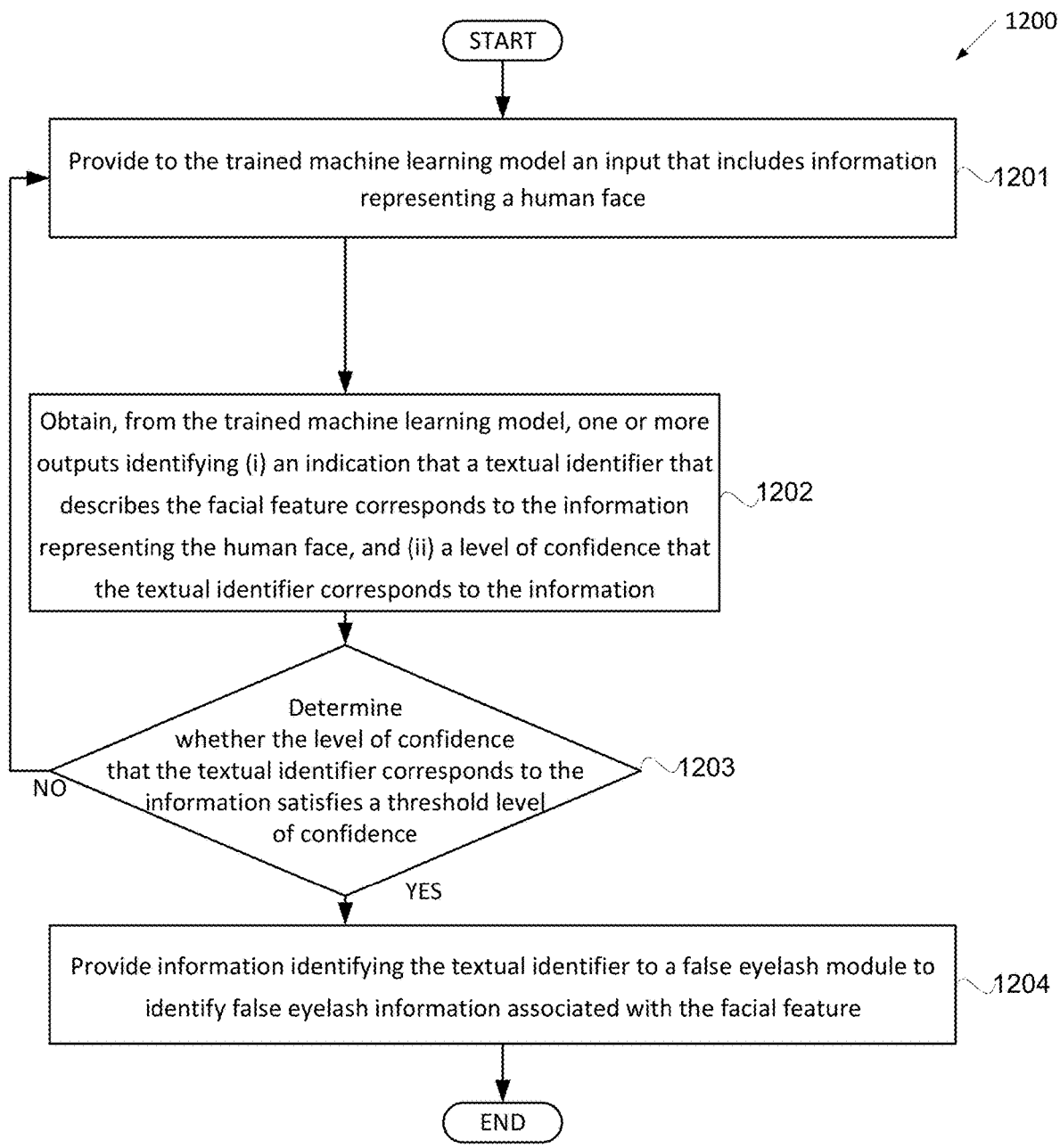
FIG. 12 depicts a flow diagram of one example of a method for using a trained machine learning model to obtain a textual identifier describing a facial feature using information pertaining to a 3D model of a human face, in accordance with some embodiments of the disclosure.

FIG. 12 depicts a flow diagram of one example of a method 1200 for using a trained machine learning model to obtain a textual identifier describing a facial feature using information pertaining to a 3D model of a human face, in accordance with some embodiments of the disclosure. The method 1200 is performed by processing logic that can include hardware (circuitry, dedicated logic, etc.), software (e.g., instructions run on a processing device), or a combination thereof. In one embodiment, some or all the operations of method 1200 can be performed by one or more components of system 100A of FIG. 1A and/or system 100B of FIG. 1B. In other embodiments, one or more operations of method 1200 can be performed by training set generator 131 of server machine 130 as described with respect to FIG. 1A. In some embodiments, the operations (e.g., blocks 1201-1204) can be the same, different, fewer, or greater. For instance, in some embodiments one or more training inputs can be generated or one or more target outputs can be generated. Method 1200 uses the trained machine learning model to predict an indication that a textual identifier that describes a facial feature corresponds to a landmark on a 3D model based on information representing a 3D model of a human face.

At operation 1201, processing logic implementing the method 1200 provides to the trained machine learning model an input that includes information, such as 2D image data, 3D model data, etc., representing a human face.

At operation 1202, after performing operation 1201, processing logic obtains, from the trained machine learning model, one or more outputs identifying (i) an indication of a textual identifier that describes a facial feature corresponding to the information representing the human face, and (ii) a level of confidence that the textual identifier corresponds to information.

At operation 1203, processing logic determines whether the level of confidence that the textual identifier corresponds to the information representing the human face satisfies a threshold level of confidence. If the level of confidence does not satisfy the threshold level of confidence, processing logic returns to operation 1201. If the level of confidence does satisfy the threshold level of confidence, processing logic proceeds to operation 1204. In some embodiments, processing logic determines whether the level of confidence that textual identifier corresponds to the information representing the human face satisfies a threshold level of confidence. If the level of confidence does not satisfy the threshold level of confidence, processing logic returns to operation 1201. If the level of confidence does satisfy the threshold level of confidence, processing logic proceeds to operation 1204.

In some embodiments, responsive to determining the level of confidence satisfies the threshold level of confidence, processing logic can save in a data structure, an indication of an association between the textual identifier and the information. In some embodiments, processing logic can generate machine learning model refinement training data for training the trained machine learning model based on the indication of the association between the textual identifier and the information.

At operation 1204, processing logic provides information identifying the textual identifier to a false eyelash module to identify false eyelash information associated with the facial feature described by the textual identifier. In some embodiments, the information identifying the textual identifier is included in a prompt (e.g., prompt 164 of FIG. 2A) that may be provided to a generative machine learning model (e.g., generative machine learning model 250 of FIG. 2A).

In some embodiments, the method 1200 for using the trained machine learning model can be performed by a system including one or more components. The system can be configured to use the trained machine learning model to identify false eyelash information based on information pertaining to identified facial features. The system can include a memory and a processing device operatively coupled to the memory, the processing device to perform the operations of method 1200. The memory can store the operations of method 1200 as one or more commands (e.g., processing logic) that, when performed by the processing device, cause the system to perform the operations of method 1200 as described above. Additionally, in some embodiments, the operations of method 1200 can be stored as one or more processing commands in a computer-readable storage medium, that when executed cause the method 1200 to be performed.

Figure 13:
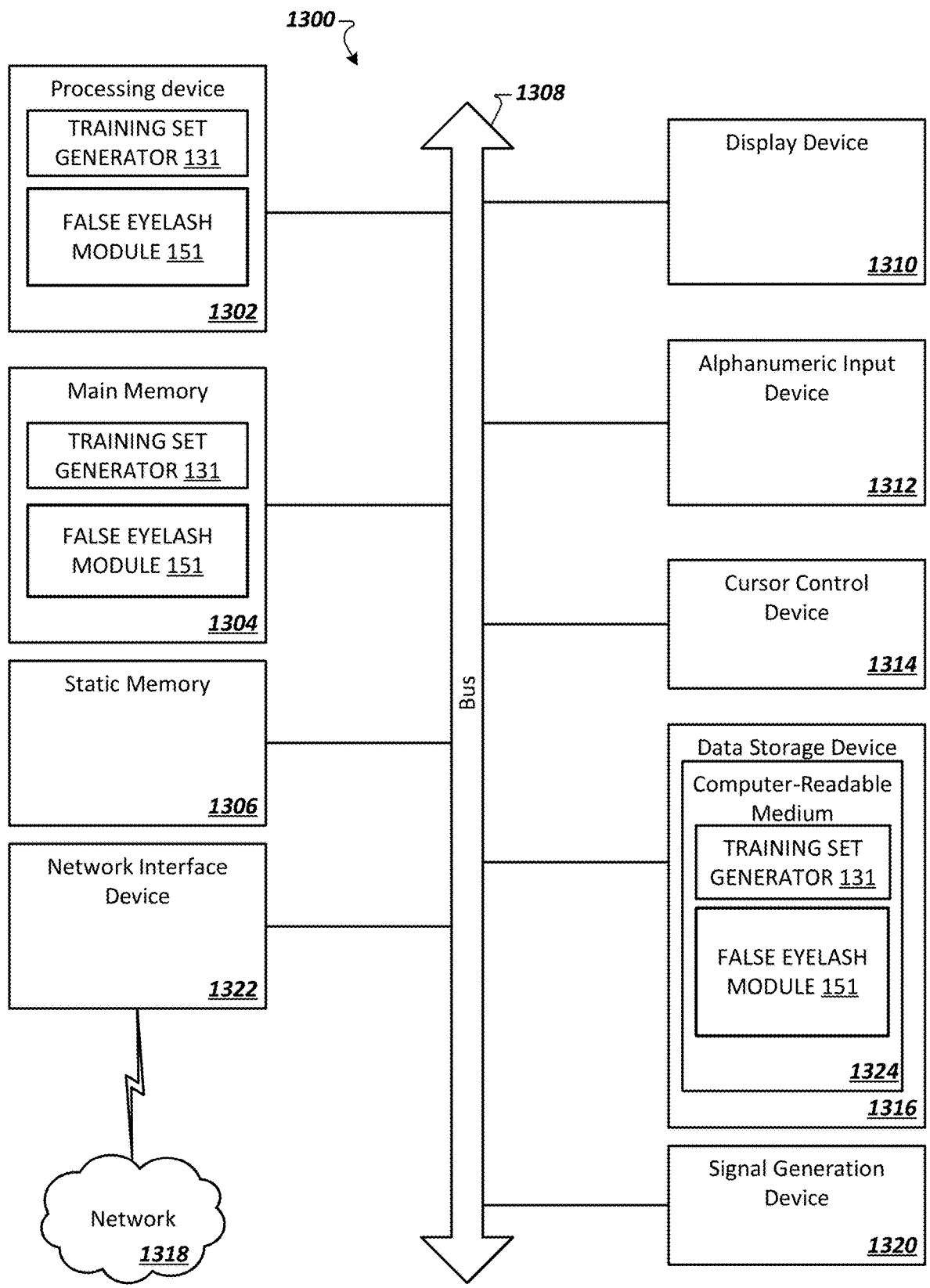
FIG. 13 is a block diagram illustrating an exemplary computer system, in accordance with some embodiments of the disclosure.

FIG. 13 is a block diagram illustrating an exemplary computer system, system 1300, in accordance with some embodiments of the disclosure. The system 1300 executes one or more sets of instructions that cause the machine to perform any one or more of the methodologies discussed herein. Set of instructions, instructions, and the like can refer to instructions that, when executed system 1300, cause the system 1300 to perform one or more operations of training set generator 131 or false eyelash module 151. The machine can operate in the capacity of a server or a client device in client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a data storage device 1316, which communicate with each other via a bus 1308.

The processing device 1302 represents one or more general-purpose processing devices such as a microprocessor, central processing unit, or the like. More particularly, the processing device 1302 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 1302 can also be one or more special-purpose processing devices such as an application specific integrated circuit (ASIC), a field programmable gate array (FPGA), a digital signal processor (DSP), network processor, or the like. The processing device 1302 is configured to execute instructions of the system 130A and/or system 130B and the training set generator 131 or false eyelash module 151 for performing the operations discussed herein.

The system 1300 can further include a network interface device 1322 that provides communication with other machines over a network 1318, such as a local area network (LAN), an intranet, an extranet, or the Internet. The system 1300 also can include a display device 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The data storage device 1316 can include a computer-readable storage medium 1324 on which is stored the sets of instructions of the system 100A and/or system 100B and of training set generator 131 or of false eyelash module 151 embodying any one or more of the methodologies or functions described herein. The computer-readable storage medium 1324 can be a non-transitory computer-readable storage medium. The sets of instructions of the system 100A, system 100B and of training set generator 131 or of false eyelash module 151 can also reside, completely or at least partially, within the main memory 1304 and/or within the processing device 1302 during execution thereof by the system 1300, the main memory 1304 and the processing device 1302 also constituting computer-readable storage media. The sets of instructions can further be transmitted or received over the network 1318 via the network interface device 1322.

While the example of the computer-readable storage medium 1324 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding, or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "obtaining", "identifying", "determining", "measuring", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and can not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions that, responsive to execution by a processing device, cause the processing device to perform the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method, comprising:
   receiving two-dimensional (2D) image data corresponding to a 2D image of a human face of a subject;
   determining a textual identifier that describes a facial feature of the human face represented by the 2D image;
   providing, to a first generative machine learning model, a first prompt comprising information identifying the textual identifier that describes the facial feature of the human face; and
   obtaining, from the first generative machine learning model, a first output identifying, among a plurality of sets of false eyelashes, a set of false eyelashes selected to suit the human face of the subject based on the facial feature.

2. The method of claim 1, wherein the textual identifier further describes a relationship between two or more facial features of the human face.

3. The method of claim 2, wherein the relationship between two or more facial features comprises a relationship between an eye and an eyebrow of the eye.

4. The method of claim 1, further comprising:
   identifying, from a database, information related to at least some of the plurality of sets of false eyelashes; and
   generating the first prompt comprising the information related to at least some of the plurality of sets of false eyelashes and the information identifying the textual identifier that describes the facial feature of the human face.

5. The method of claim 1, wherein the set of false eyelashes comprises a set of artificial lash extensions designed for an application at an underside of natural eyelashes of the subject.

6. The method of claim 1, further comprising:

providing, to a first trained machine learning model, a
second input comprising information identifying 2D
image data corresponding to the 2D image of the
human face; and
wherein determining the textual identifier that describes
the facial feature of the human face comprises:
obtaining, from the first trained machine learning
model, a second output identifying the textual identifier that describes the facial feature of the human
face.

7. The method of claim 6, wherein the first trained machine learning model is a second generative machine learning model.

8. The method of claim 7, wherein the second generative machine learning model comprises a visual language model (VLM).

9. The method of claim 1, further comprising providing an indication of the set of false eyelashes for display at a graphical user interface (GUI) of a client device.

10. The method of claim 1, further comprising:
determining, using the 2D image data, a three-dimensional (3D) model of the human face, wherein the determining the textual identifier is based at least in part on the 3D model.

11. The method of claim 10, further comprising:
identifying a landmark on the 3D model, the landmark identifying the facial feature of the human face.

12. The method of claim 11, wherein determining the textual identifier that describes the facial feature of the human face based at least in part on the 3D model, comprises:
determining the textual identifier that corresponds to the landmark on the 3D model.

13. The method of claim 11, wherein determining the textual identifier that describes the facial feature of the human face based at least in part on the 3D model, comprises:
identifying a subset of a plurality of points of the 3D model;
determining one or more relationships between the subset of points of the 3D model;
identifying the landmark on the 3D model based on the one or more relationships; and
measuring one or more geometric features represented in the 3D model to generate one or more geometric measurements, wherein the textual identifier is created based on the one or more geometric measurements.

14. The method of claim 10, wherein determining the textual identifier that describes the facial feature of the human face based at least in part on the 3D model, comprises:
providing, to a second trained machine learning model, a first input, the first input comprising information representing the 3D model of the human face; and
obtaining, from the second trained machine learning model, one or more outputs identifying (i) an indication that the textual identifier that describes the facial feature of the human face corresponds to a landmark on the 3D model, and (ii) a level of confidence that the textual identifier corresponds to the landmark on the 3D model.

15. A system, comprising:
a memory; and
a processing device operatively coupled with the memory, the processing device to:
receive two-dimensional (2D) image data corresponding to a 2D image of a human face of a subject;
determine a textual identifier that describes a facial feature of the human face represented by the 2D image;
provide, to a first generative machine learning model, a first prompt comprising information identifying the textual identifier that describes the facial feature of the human face; and
obtain, from the first generative machine learning model, a first output identifying, among a plurality of sets of false eyelashes, a set of false eyelashes selected to sui the human face of the subject based on the facial feature.

16. The system of claim 15, wherein the textual identifier further describes a relationship between two or more facial features of the human face.

17. The system of claim 16, wherein the relationship between two or more facial features comprises a relationship between an eye and an eyebrow of the eye.

18. The system of claim 15, wherein the processing device is further to:
identify, from a database, information related to at least some of the plurality of sets of false eyelashes; and
generate the first prompt comprising the information related to at least some of the plurality of sets of false eyelashes and the information identifying the textual identifier that describes the facial feature of the human face.

19. The system of claim 15, wherein the set of false eyelashes comprises a set of artificial lash extensions designed for an application at an underside of natural eyelashes of the subject.

20. The system of claim 15, wherein the processing device is further to:
provide, to a first trained machine learning model, a second input comprising information identifying 2D image data corresponding to the 2D image of the human face; and
wherein determining the textual identifier that describes the facial feature of the human face comprises:
obtaining, from the first trained machine learning model, a second output identifying the textual identifier that describes the facial feature of the human face.

21. The system of claim 15, wherein the processing device is further to:
determine, using the 2D image data, a three-dimensional (3D) model of the human face, wherein the determining the textual identifier is based at least in part on the 3D model.

22. The system of claim 21, wherein the processing device is further to:
identify a landmark on the 3D model, the landmark identifying the facial feature of the human face, wherein to determine the textual identifier that describes the facial feature of the human face based at least in part on the 3D model, the processing device is to:
determine the textual identifier that corresponds to the landmark on the 3D model.

23. The system of claim 21, wherein to determine the textual identifier that describes the facial feature of the human face based at least in part on the 3D model, the processing device is to:
provide, to a second trained machine learning model, a first input, the first input comprising information representing the 3D model of the human face; and obtain, from the second trained machine learning model, one or more outputs identifying (i) an indication that the textual identifier that describes the facial feature of the human face corresponds to a landmark on the 3D model, and (ii) a level of confidence that the textual identifier corresponds to the landmark on the 3D model.

24. A non-transitory computer-readable storage medium comprising instructions that, responsive to execution by a processing device, cause the processing device to perform operations, comprising:
receiving two-dimensional (2D) image data corresponding to a 2D image of a human face of a subject;
determining a textual identifier that describes a facial feature of the human face represented by the 2D image;
providing, to a first generative machine learning model, a first prompt comprising information identifying the textual identifier that describes the facial feature of the human face; and
obtaining, from the first generative machine learning model, a first output identifying, among a plurality of sets of false eyelashes, a set of false eyelashes selected to suit the human face of the subject based on the facial feature.

25. The non-transitory computer-readable storage medium of claim 24, wherein the textual identifier further describes a relationship between two or more facial features of the human face.

26. The non-transitory computer-readable storage medium of claim 25, wherein the relationship between two or more facial features comprises a relationship between an eye and an eyebrow of the eye.

27. The non-transitory computer-readable storage medium of claim 24, wherein the operations further comprise:
identifying, from a database, information related to at least some of the plurality of sets of false eyelashes; and
generating the first prompt comprising the information related to at least some of the plurality of sets of false eyelashes and the information identifying the textual identifier that describes the facial feature of the human face.

28. The non-transitory computer-readable storage medium of claim 24, wherein the set of false eyelashes comprises a set of artificial lash extensions designed for an application at an underside of natural eyelashes of the subject.

29. The non-transitory computer-readable storage medium of claim 24, wherein the operations further comprise:
providing, to a first trained machine learning model, a second input comprising information identifying 2D image data corresponding to the 2D image of the human face; and
wherein determining the textual identifier that describes the facial feature of the human face comprises:
obtaining, from the first trained machine learning model, a second output identifying the textual identifier that describes the facial feature of the human face.

30. The non-transitory computer-readable storage medium of claim 24, wherein the operations further comprise:
determining, using the 2D image data, a three-dimensional (3D) model of the human face, wherein the determining the textual identifier is based at least in part on the 3D model;
identifying a subset of a plurality of points of the 3D model;
determining one or more relationships between the subset of points of the 3D model;
identifying a landmark on the 3D model based on the one or more relationships; and
measuring one or more geometric features represented in the 3D model to generate one or more geometric measurements, wherein the textual identifier is created based on the one or more geometric measurements.

* * * * *